Sept. 16, 1952  W. S. TOUCHMAN  2,610,550
FABRICATING MECHANISM
Filed Jan. 28, 1947  16 Sheets-Sheet 4
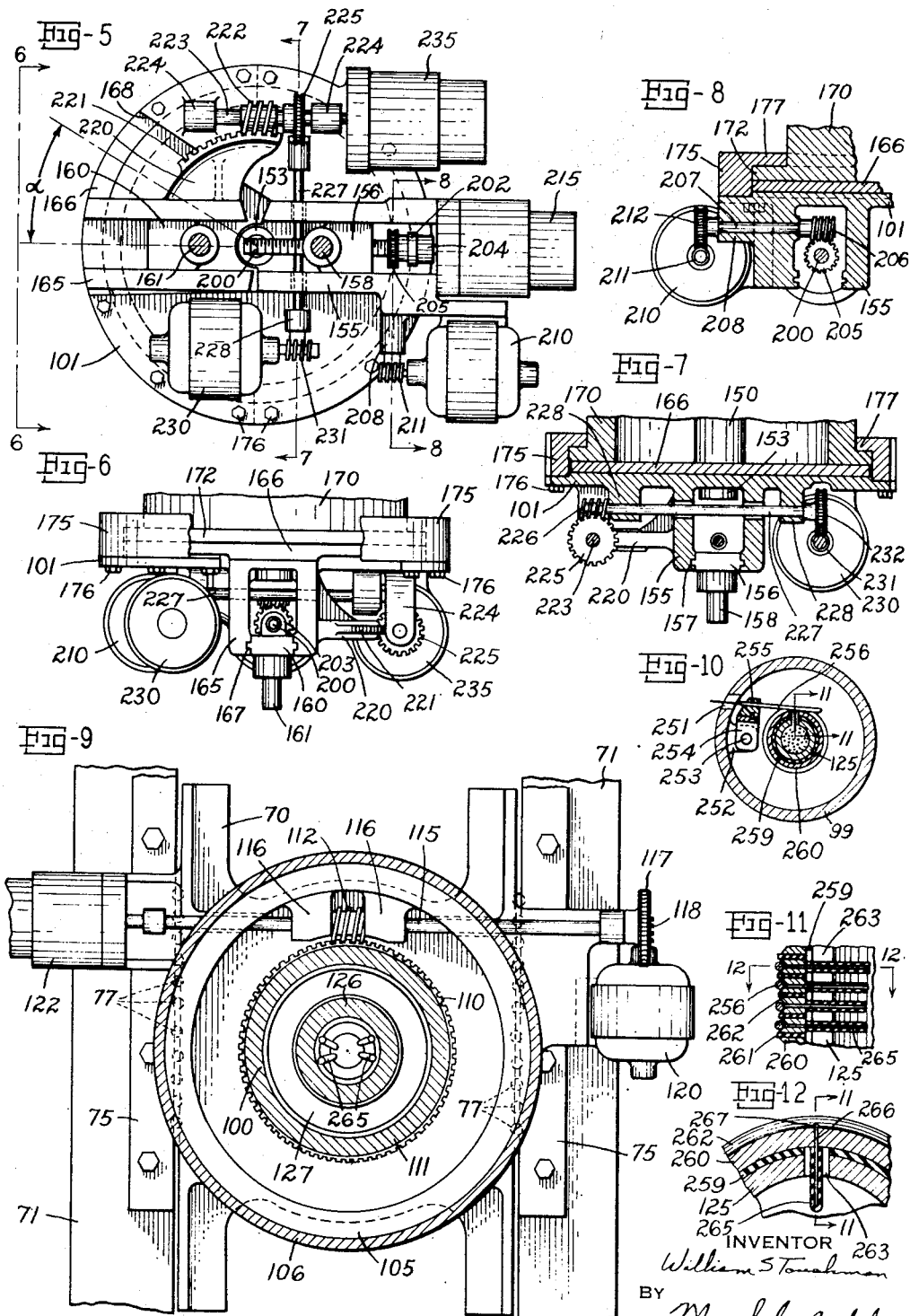
INVENTOR
William S Touchman
BY Marechal & Biebel
ATTORNEYS

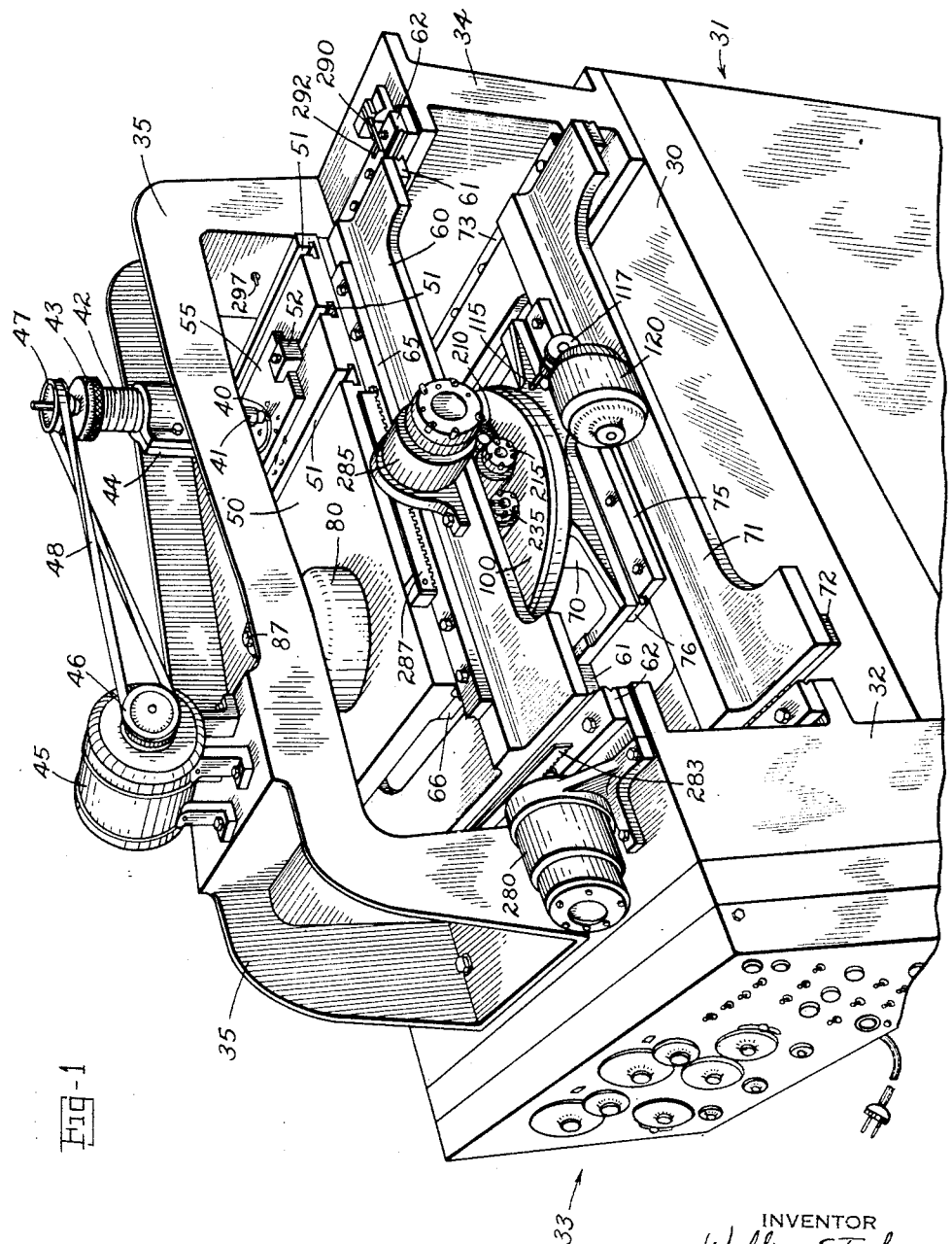

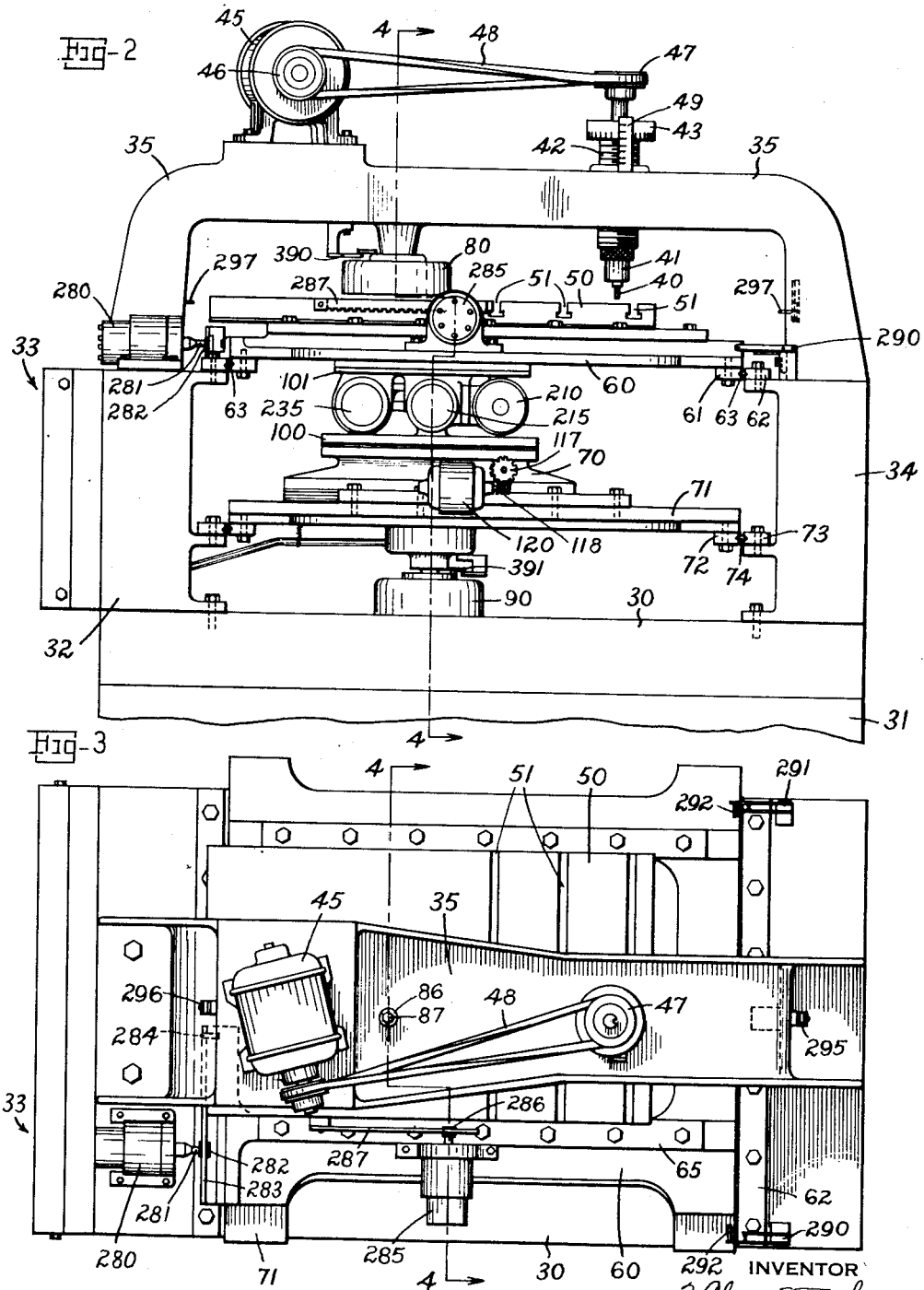

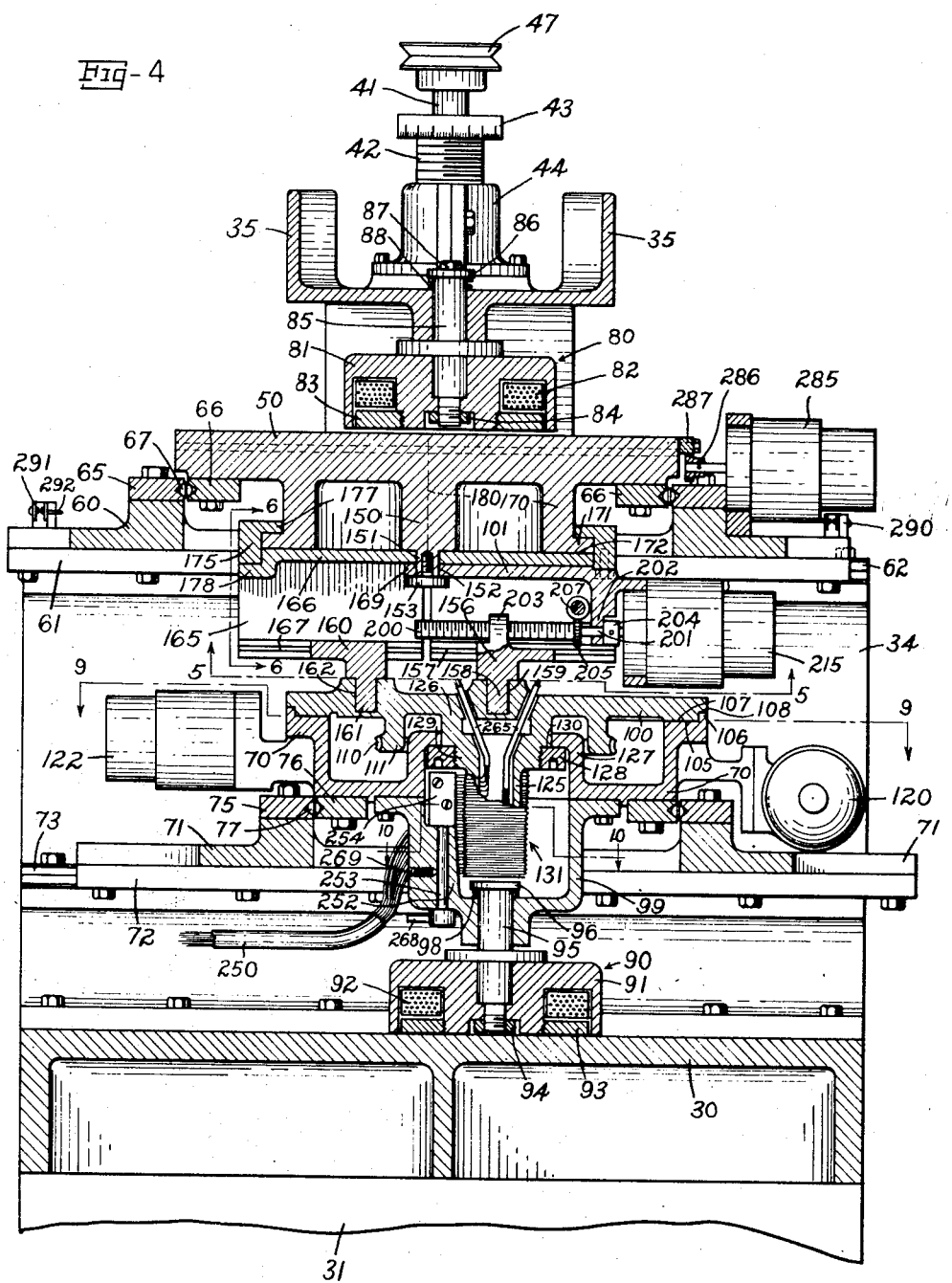

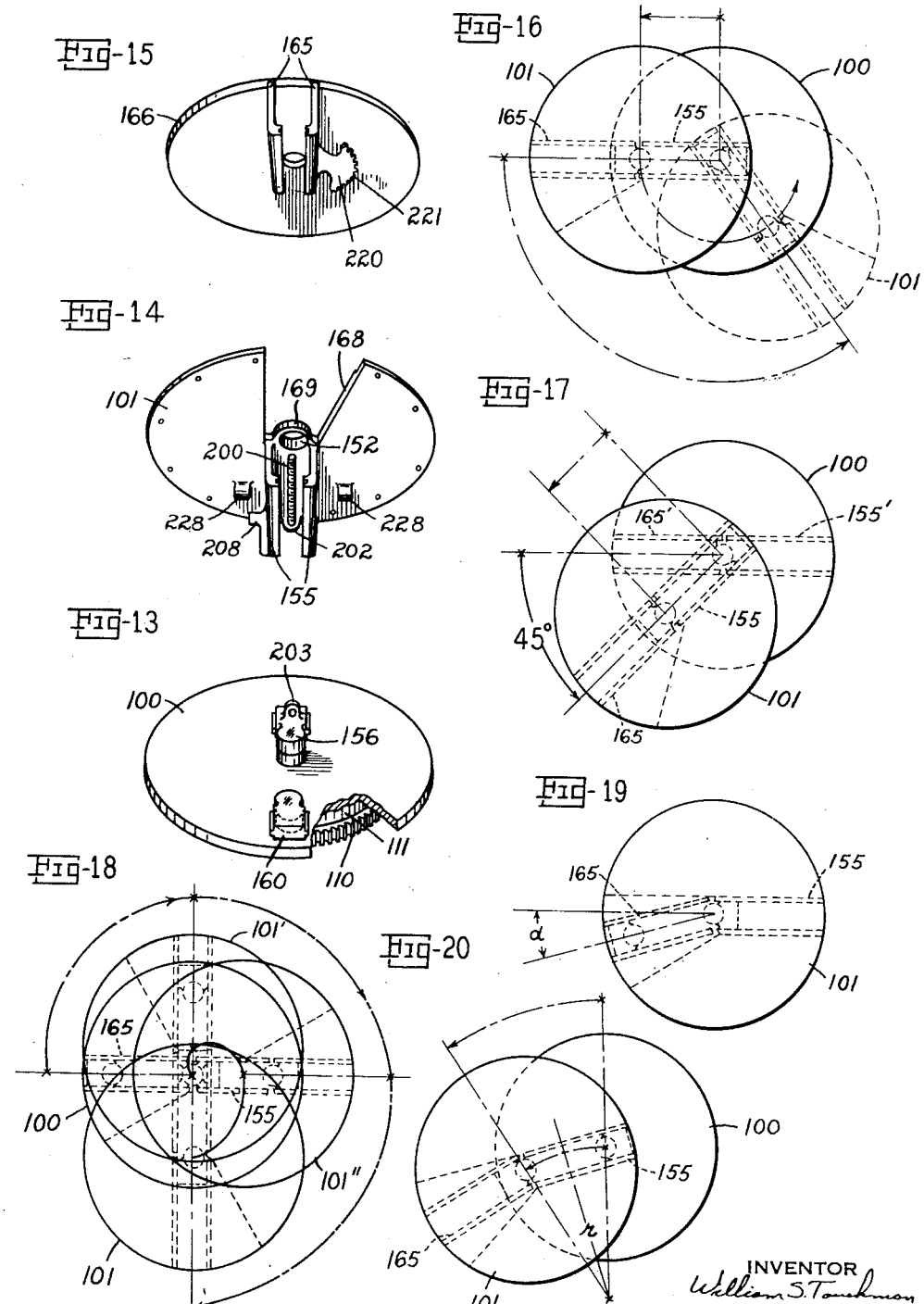

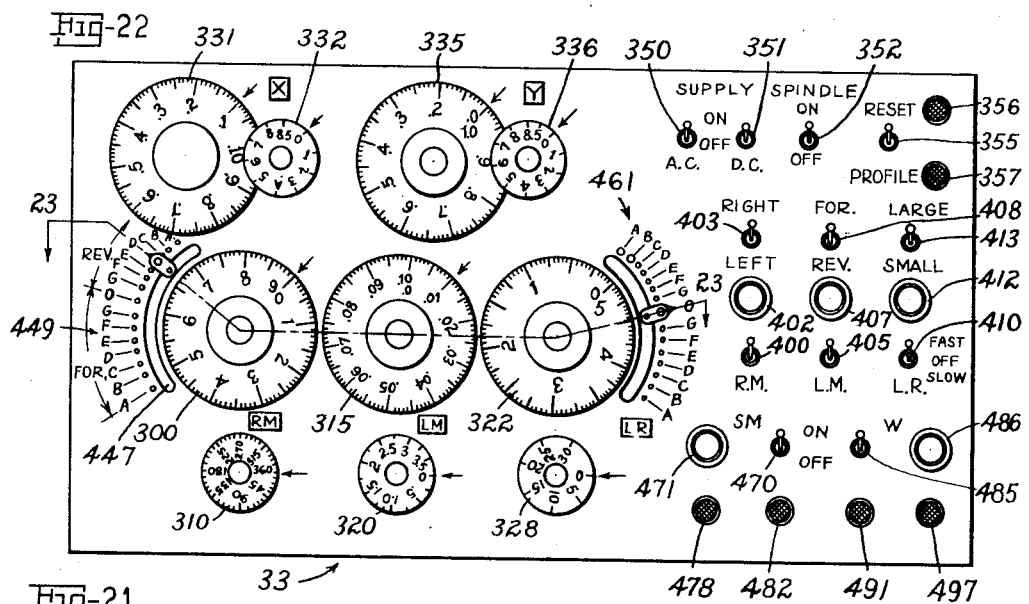

Sept. 16, 1952 W. S. TOUCHMAN 2,610,550
FABRICATING MECHANISM
Filed Jan. 28, 1947 16 Sheets-Sheet 7
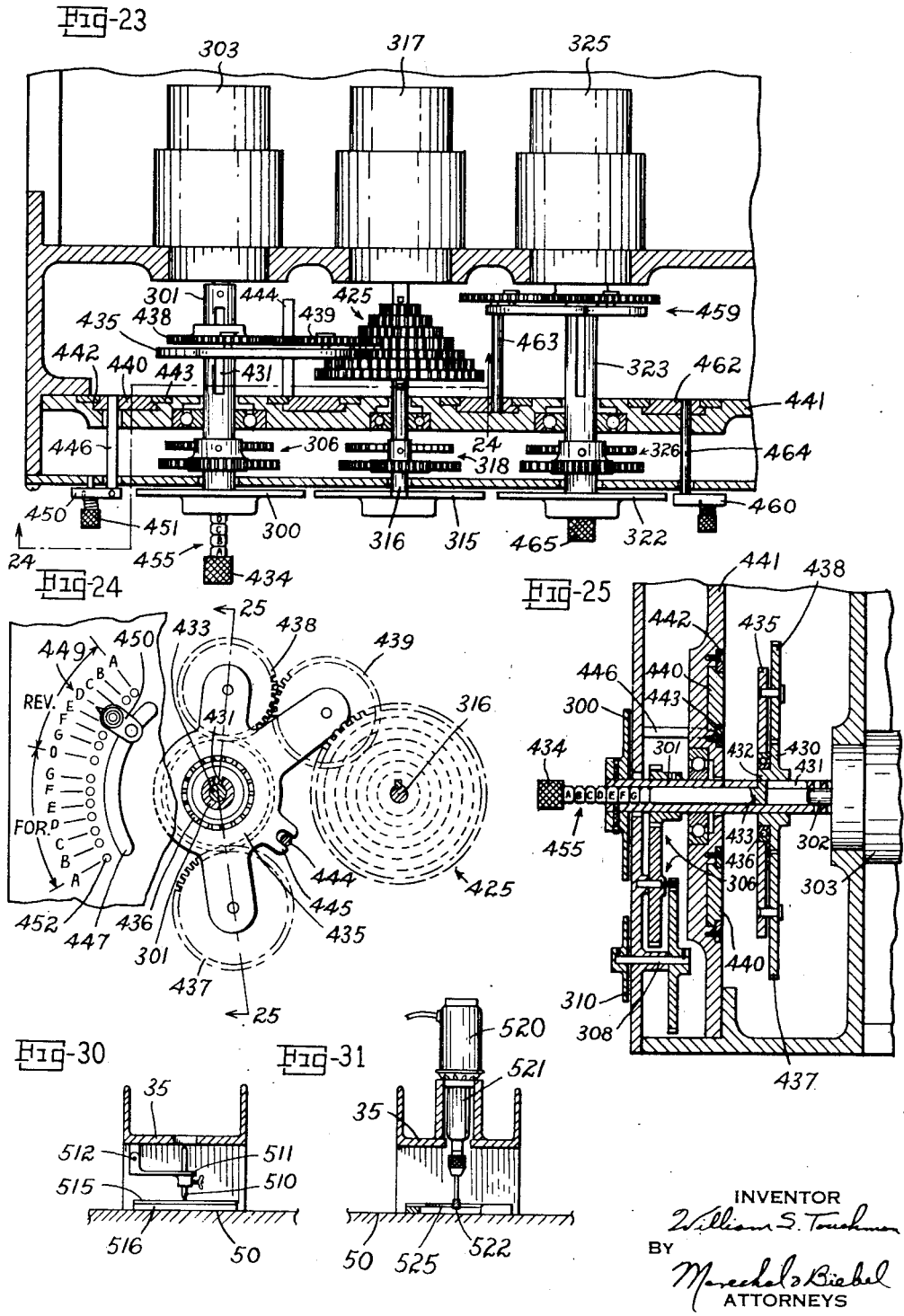
INVENTOR
William S. Touchman
BY
Marechal & Biebel
ATTORNEYS

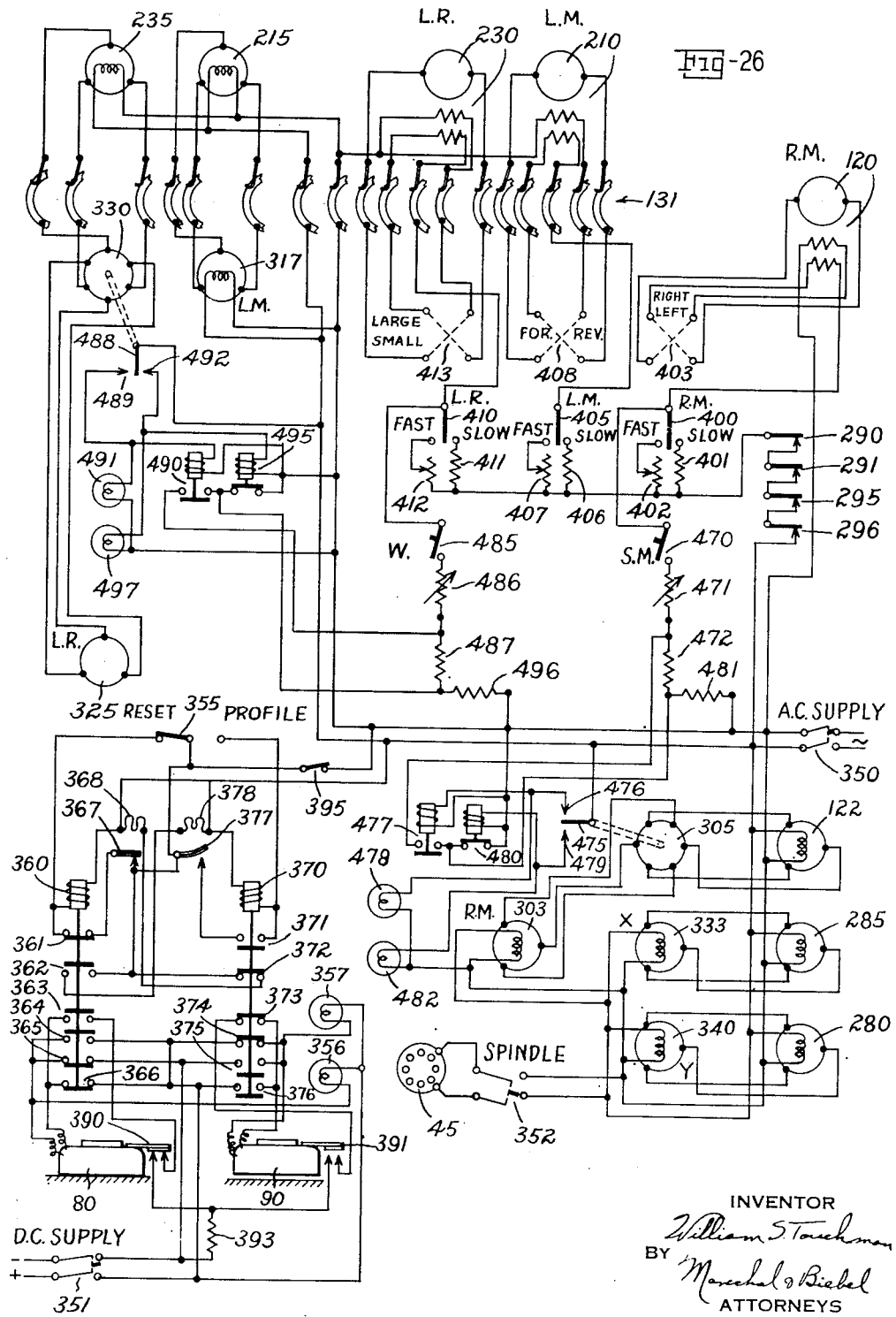

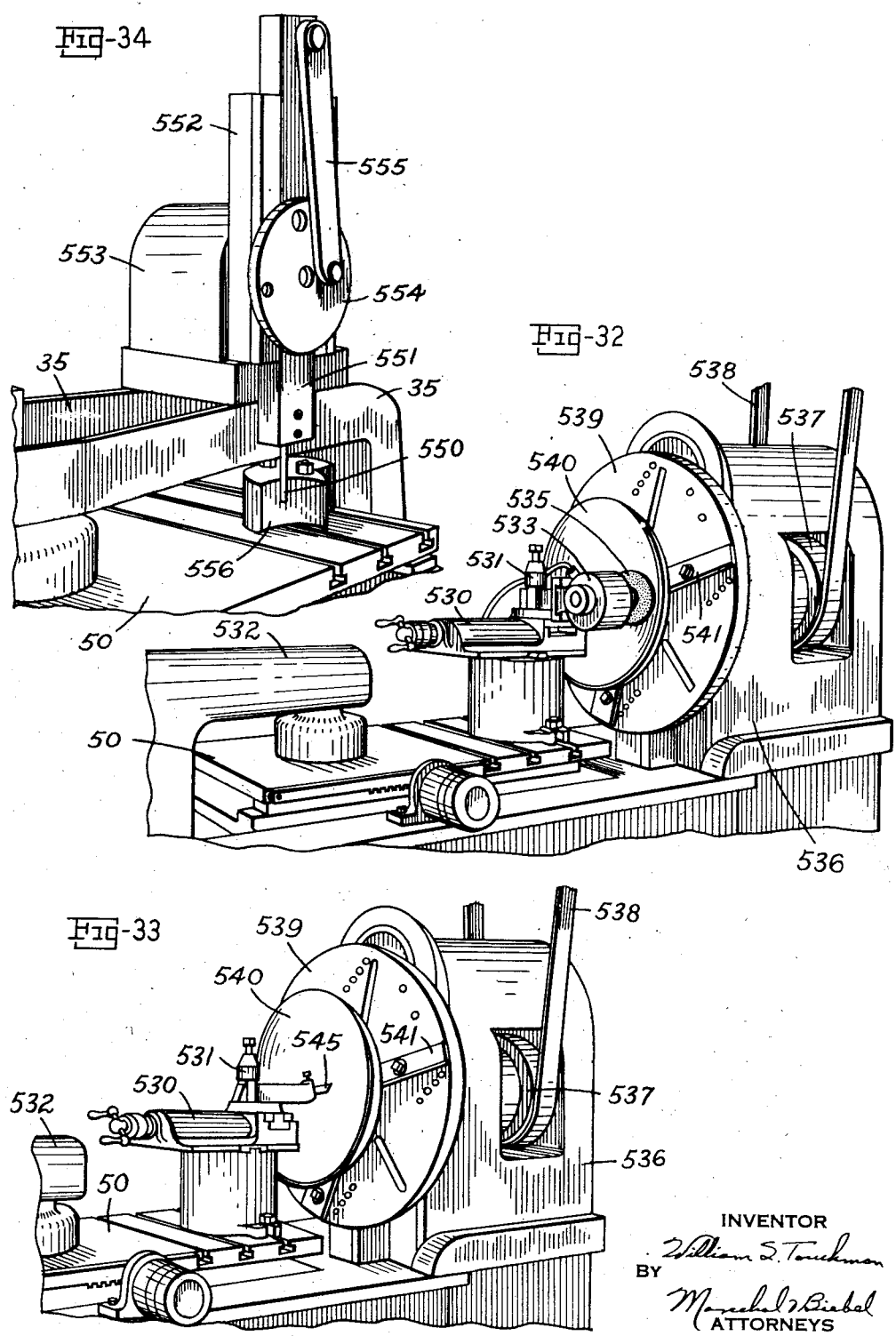

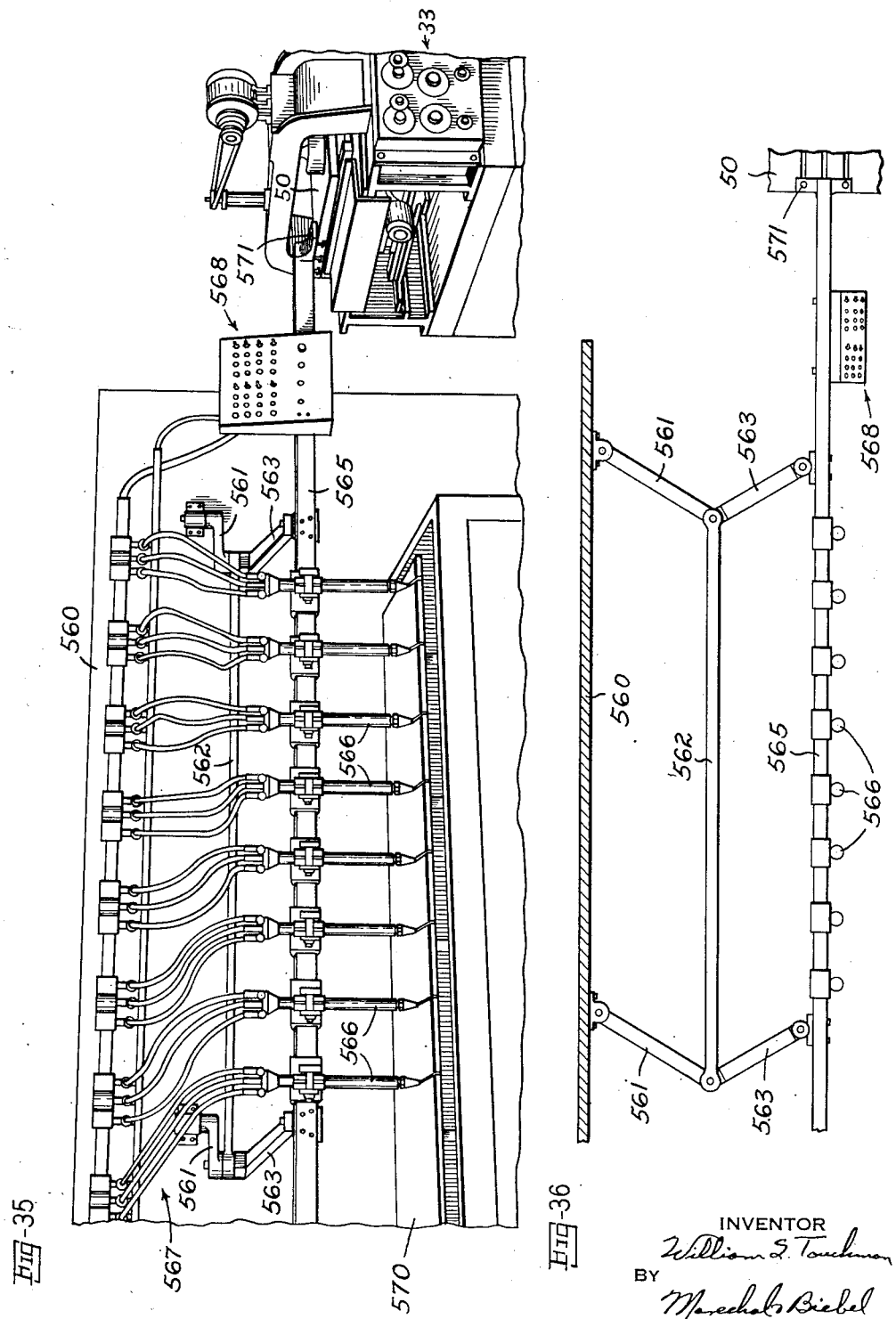

Sept. 16, 1952  W. S. TOUCHMAN  2,610,550
FABRICATING MECHANISM
Filed Jan. 28, 1947  16 Sheets-Sheet 11
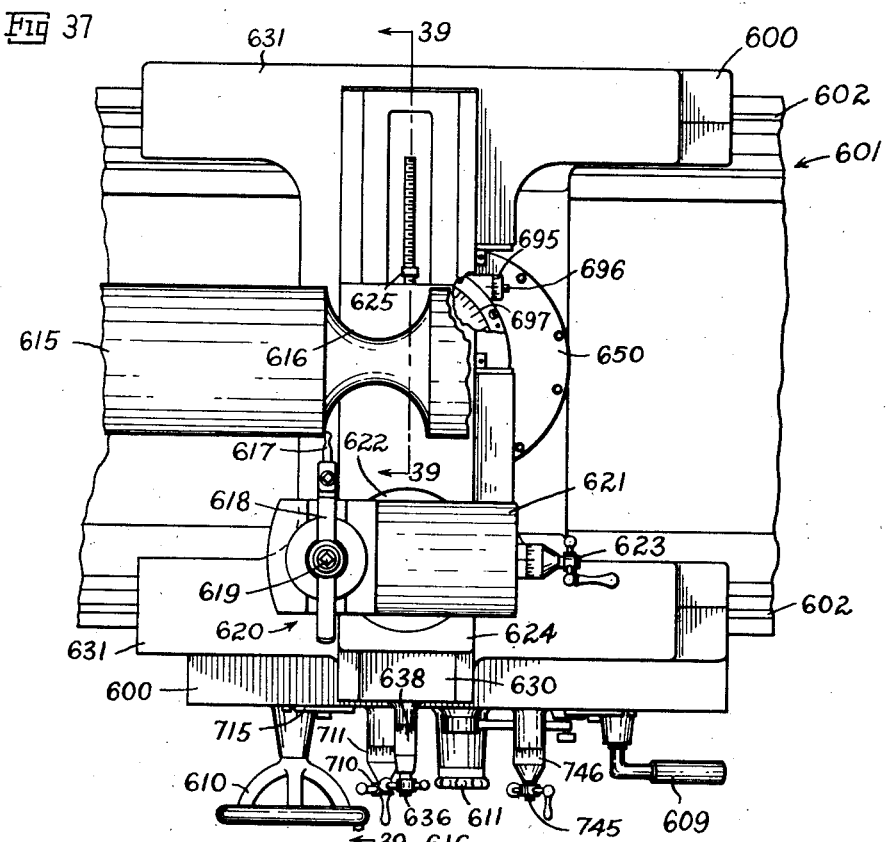
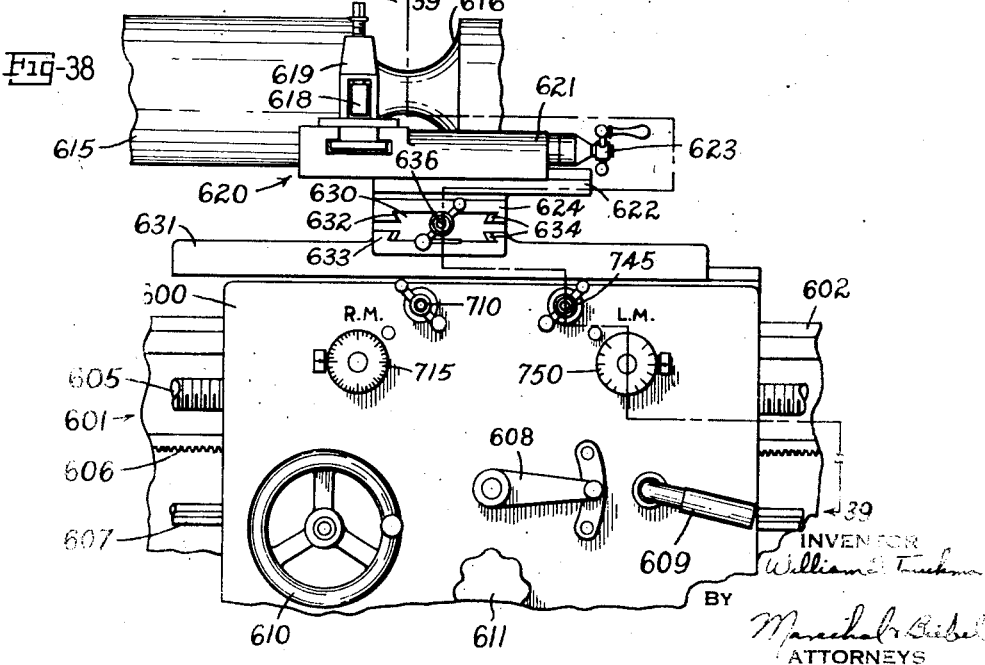
INVENTOR
William S. Touchman
BY
Marshall & Biebel
ATTORNEYS

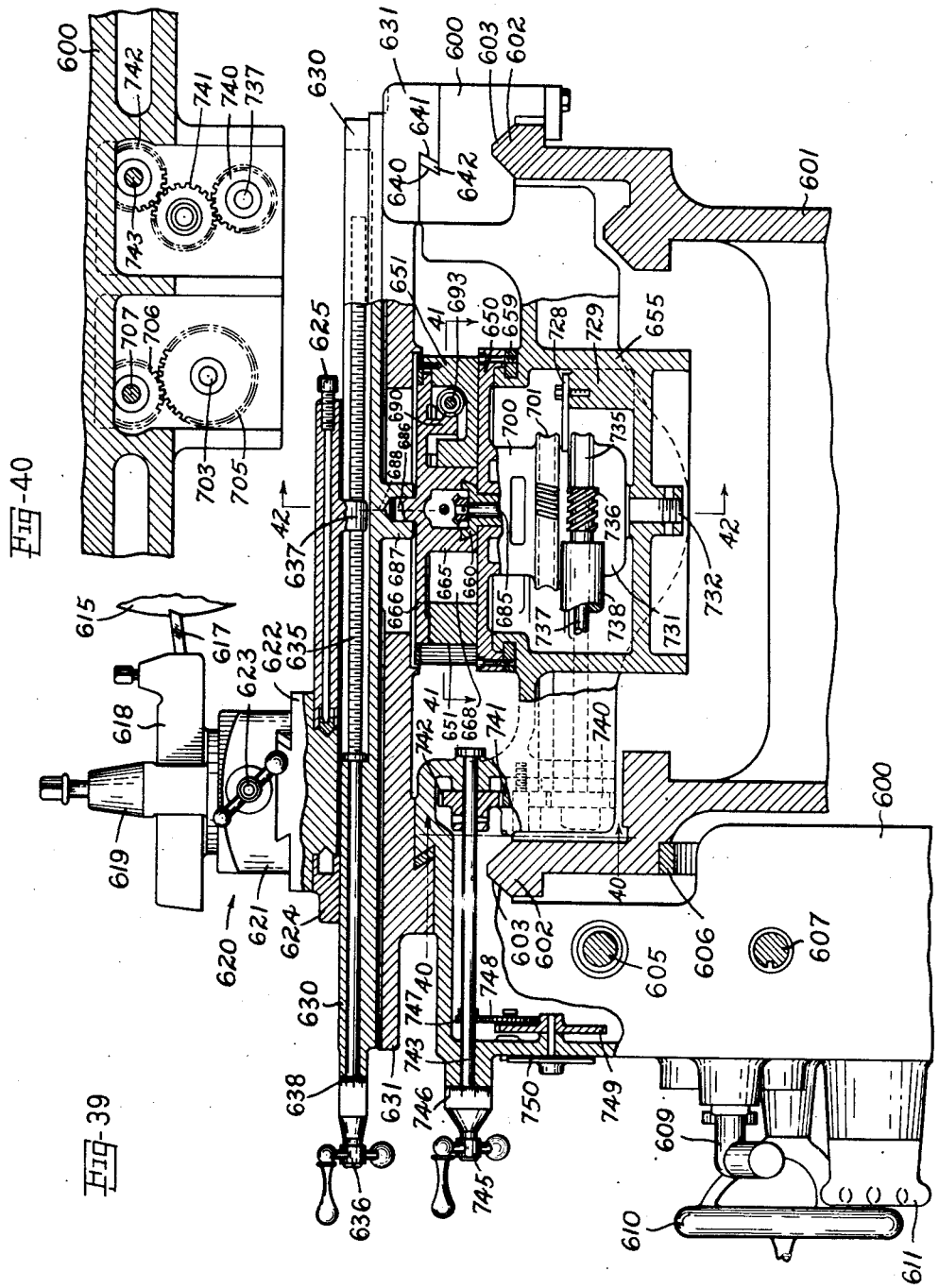

Sept. 16, 1952 W. S. TOUCHMAN 2,610,550
FABRICATING MECHANISM
Filed Jan. 28, 1947 16 Sheets-Sheet 13
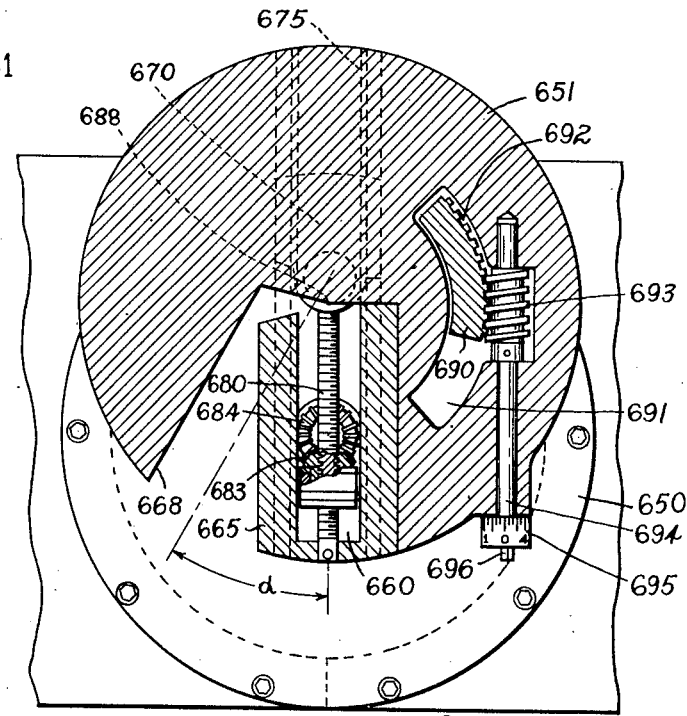
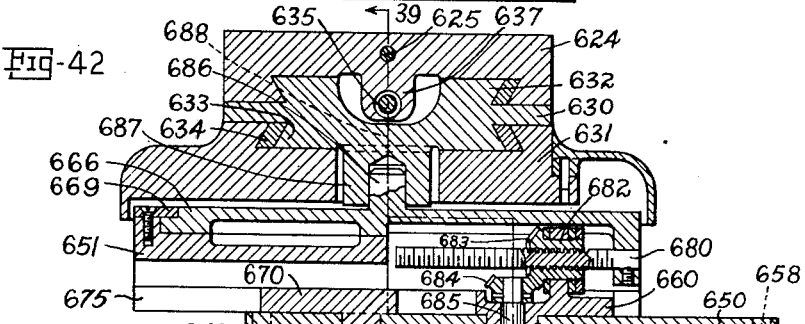
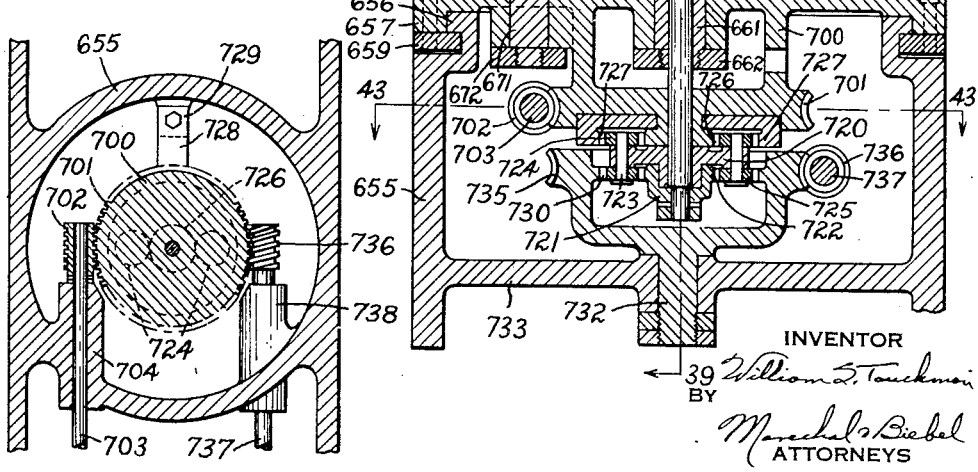
INVENTOR
William S. Touchman
BY
Marechal & Biebel
ATTORNEYS

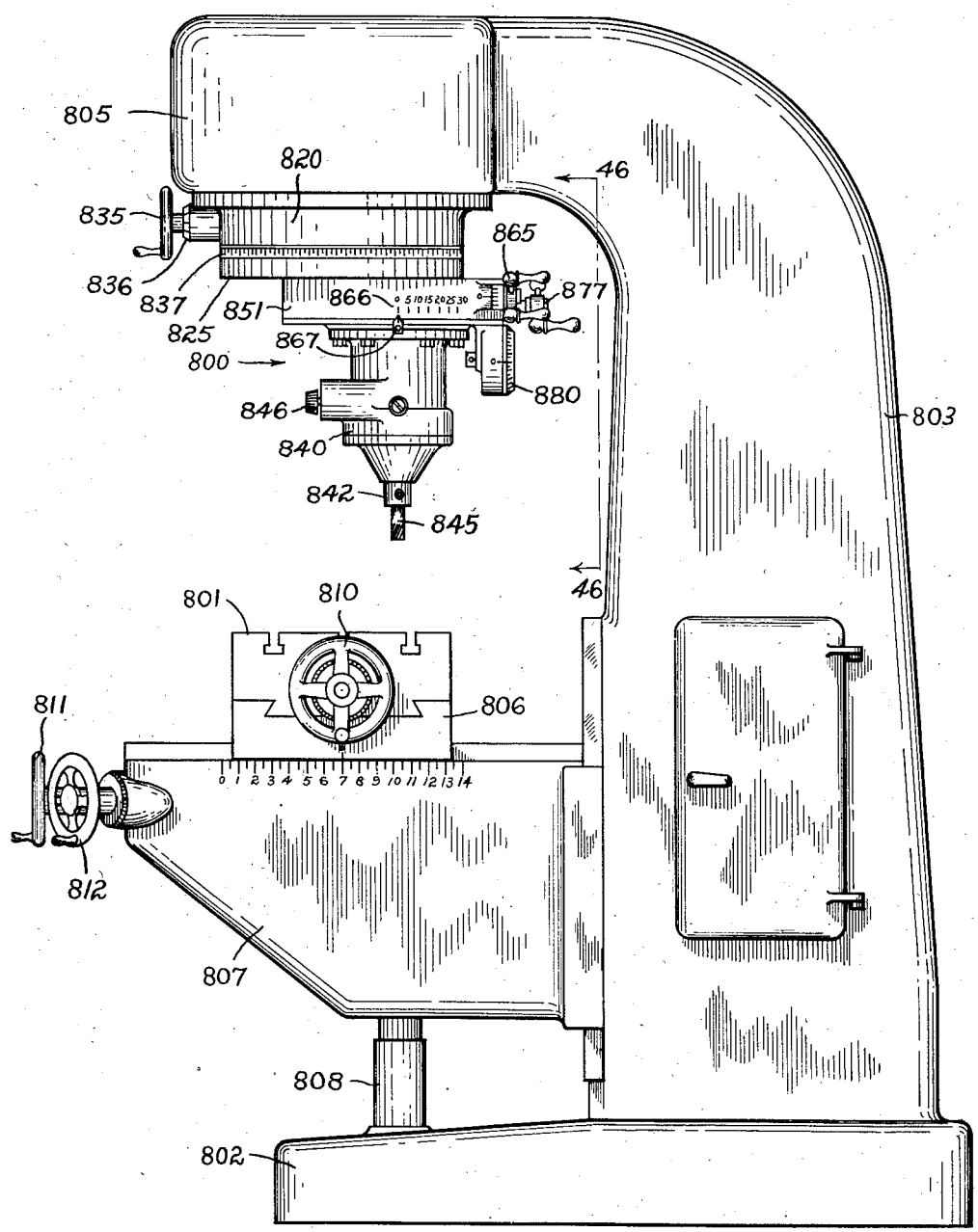

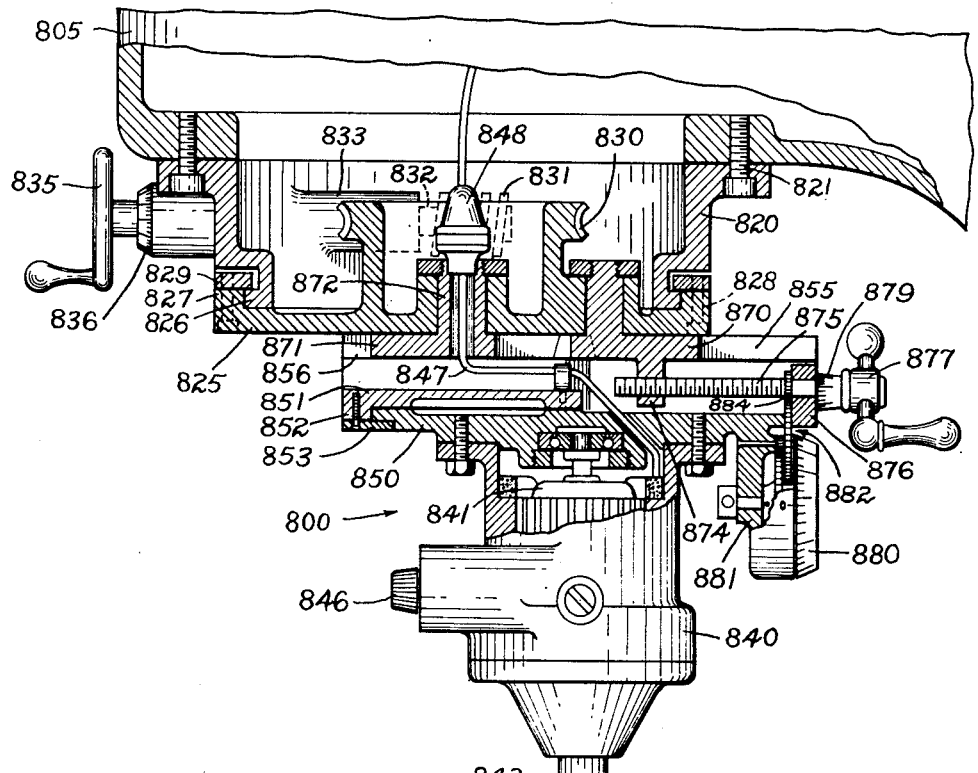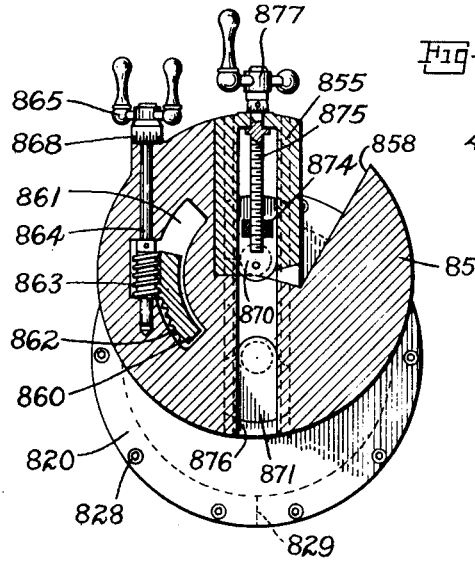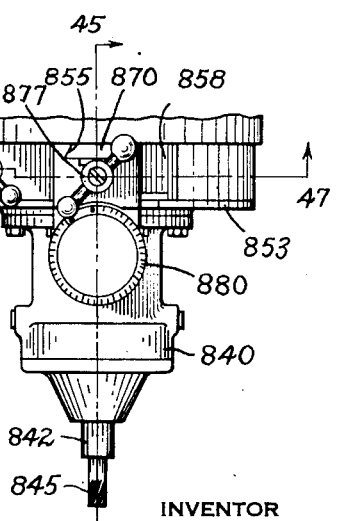

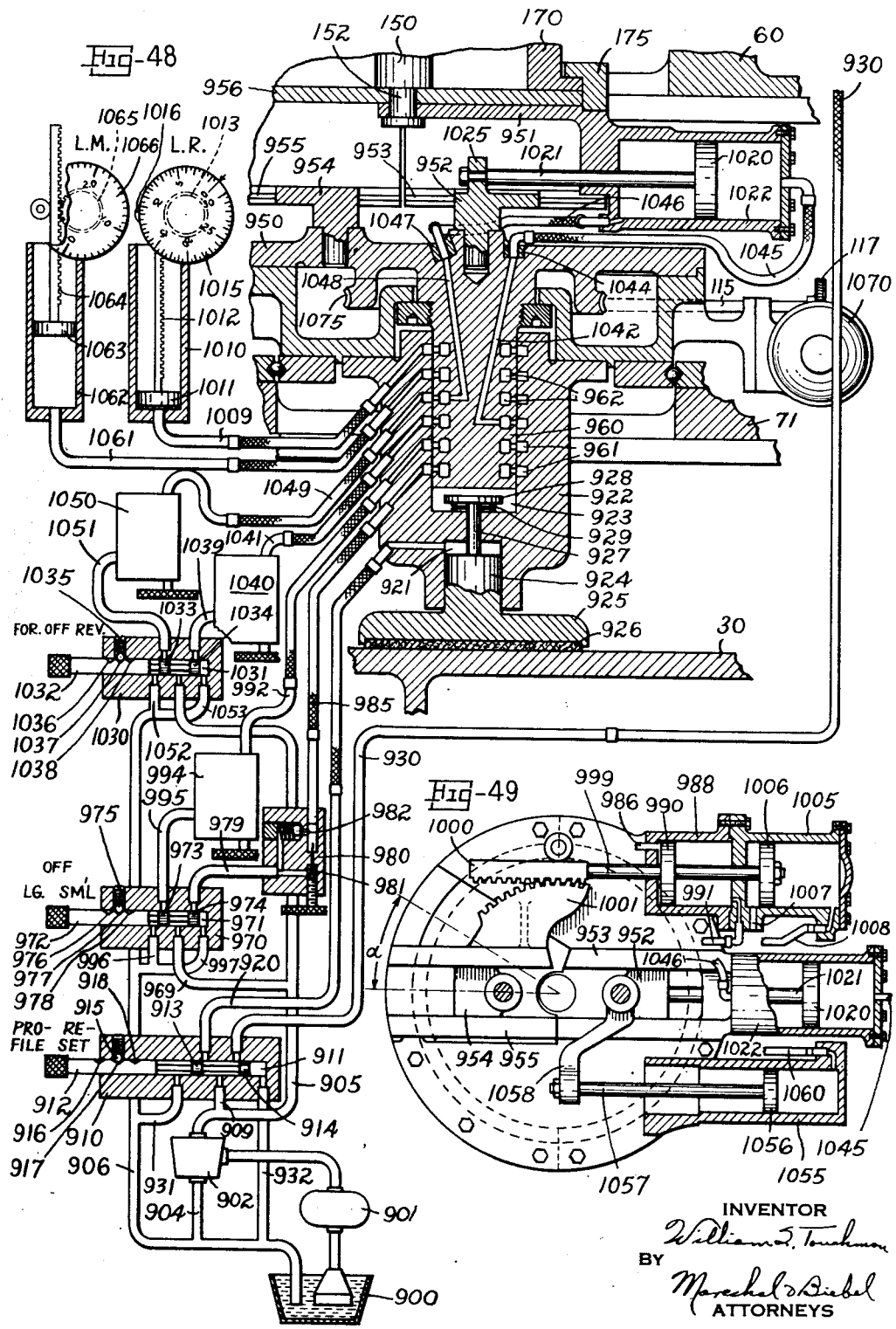

Patented Sept. 16, 1952

2,610,550

UNITED STATES PATENT OFFICE 2,610,550

FABRICATING MECHANISM

William S. Touchman, Milwaukee, Wis.

Application January 28, 1947, Serial No. 724,796

50 Claims. (Cl. 90—11)

This invention relates to apparatus for originating profiles, surfaces, and shapes, and is adapted for use with or incorporation in machines wherein a working member and a work piece are caused to have relative movement to carry out a working operation.

One of the principal objects of the present invention is to provide a machine for originating, developing, or generating an accurately controlled working movement of a work member and work piece along a path defined by an arc of any radius up to infinity.

Another object is to provide such a machine for originating accurately controlled movement of the working member and work piece along an arcuate course of any radius from zero to infinity without the use of a template or like guiding member.

Another object is to provide such a machine wherein relative arcuate movement of the working member and work piece about arcs of relatively short radius is originated by one operation and such movement about arcs of greater radius is originated by a different but coordinated operation.

Still another object is to provide such a machine wherein arcuate movement of the working member and work piece about arcs of relatively short radius is originated by one operation and movement about arcs of longer radius is originated by a different operation, with both operations overlapping to provide for covering the complete range of possible radii up to infinity.

It is also an object of the invention to provide such a machine wherein relative arcuate movement of the working member and work piece is originated by relative linear movement between component parts of a rotary offset mechanism.

An additional object is to provide such a machine for originating relative arcuate movement of the working member and work piece by relative linear movement between a plurality of parts of a rotary offset mechanism along angularly disposed paths and for varying the radius of such arcuate movement by variation of the angular relation of such paths of relative linear movement.

A further object is to provide a rotary offset connection mechanism for use in a tool of the above character which includes a pair of rotary members so connected together that their respective axes of rotation may have relative lateral movement along an arcuate path of any radius up to and including infinity.

Another object is to provide such a machine for originating accurately controlled working movement of the working member and work piece along an irregularly curved path such as a spiral without the use of a template or like guiding member.

An additional object of the invention is to provide such a machine wherewith a working member and work piece are caused to have accurately controlled relative movement along a course consisting of one or more straight lines and arcs of circles of any radius or radii without the use of a template or like guiding member.

It is also an object to provide such a machine for originating working movement of a working member and work piece along a continuous path composed of one or more straight lines in any relative angular position, one or more arcs of circles of any radius up to infinity, one or more irregular curves or a combination of such straight lines, arcs and curves, all without the use of a template or like guiding member, and also without unproductive movements of the working member and work piece.

Still another object is to provide such a machine wherewith the working movements in following an unbroken profile are made without releasing the work piece or withdrawing the working member from the work piece for purposes of resetting.

Another object of the invention is to provide for the operation of such a machine by remote control, and in particular to provide for directing all working and resetting movements of the machine by the manipulation of controls at a position remote from the working area of the machine.

An additional object is to provide a remote control system for such a machine which includes indicating members such as dials responsive to operation of the machine to indicate the positions of relatively movable parts of the machine with respect to predetermined index positions or directions.

Another object is to provide a mechanism for use with or incorporation in a pre-existing machine wherein a working member and a work piece are caused to have relative working movement by means of which the course of relative movement between the working member and work piece can be caused to conform to an arc of any predetermined radius up to and including infinity.

Still another object of the invention is to provide for selectively transmitting power to one or more relatively movable members of such a machine which are supported for rotary movement with a rotary member and for accurately indicating the position of each such relatively movable member at all times with respect to a predetermined index position.

A further object is to provide a machine tool wherein all movements of the working parts during working or resetting operations are controlled remotely, without the use of a template or like guiding member, by manipulating switches, dials and like control devices grouped on a control panel which may be at a position remote from and even out of sight of the working area of the tool.

It is also an object of the invention to provide a machine tool which includes a plurality of sensitive table members, one of which acts as a work table, and a rotary offset connection between these table members constructed to provide for relative movement of the tables along an arc of any predetermined radius up to and including infinity.

A further object is to provide a machine of this character wherein the working member and work piece are electromagnetically held against relative movement during resetting operations.

A still further object is to provide a machine which includes a work table and a moving saddle having a rotary offset connection to the work table, and which has also a drive mechanism effective to cause movement of the work table for working operations when the saddle is held stationary and effective to cause movement of the saddle for resetting purposes when the work table is held stationary.

Other objects and advantages of the invention will be apparent from the following description, the accompanying drawings and the appended claims.

In the drawings, in which like characters of reference designate like parts throughout:

Fig. 1 is a view in perspective illustrating a milling machine constructed in accordance with the present invention;

Fig. 2 is a view in side elevation of the milling machine shown in Fig. 1;

Fig. 3 is a top plan view of the milling machine shown in Fig. 1;

Fig. 4 is a view in vertical section taken substantially on the line 4—4 in Fig. 2 and also in Fig. 3;

Fig. 5 is a view in horizontal section taken on the line 5—5 in Fig. 4, illustrating details of a portion of the rotary offset connection and looking upwards as shown by the arrows in Fig. 4;

Fig. 6 is a view in side elevation of the mechanism shown in Fig. 5, the direction of view being indicated by the lines 6—6 in Figs. 4 and 5 and a part being broken away to illustrate details of internal construction;

Figs. 7 and 8 are views in vertical section illustrating parts of the mechanism shown in Fig. 5, the views being taken substantially on the lines 7—7 and 8—8, respectively, in Fig. 5;

Fig. 9 is a view in horizontal section further illustrating the rotary offset connection, and illustrating also the moving saddle of the milling machine shown in Fig. 1, the view being taken substantially on the line 9—9 in Fig. 4;

Fig. 10 is a view in horizontal section taken on the line 10—10 of Fig. 4 and illustrating details of the collecting ring arrangement utilized for transmitting electric current for operating the motors carried by the rotary off-set connection as shown in Figs. 5–8;

Fig. 11 is an enlarged fragmentary view in vertical section further illustrating the collecting ring mechanism shown in Figs. 4 and 10, the view being taken approximately on the line 11—11 of Fig. 10;

Fig. 12 is an enlarged fragmentary view in horizontal section further illustrating the collecting ring mechanism and taken approximately on the line 12—12 of Fig. 11;

Fig. 13 is a detail view in perspective of one of the parts of the rotary off-set connection in the machine shown in Fig. 1, a portion being broken away to illustrate internal construction;

Fig. 14 is a detail view in perspective of another part of the rotary off-set connection, the view being taken from below;

Fig. 15 is a view similar to Fig. 14 showing still another part of the rotary off-set connection;

Fig. 16 is a diagrammatic plan view of the rotary off-set connection and illustrating relative movement of the parts during linear motion and also during rotary motion about a short radius;

Fig. 17 is a view similar to Fig. 16 illustrating the operation of the parts in generating a line at an angle to another line;

Fig. 18 is a view similar to Fig. 16 illustrating the operation of the parts in generating a spiral curve;

Fig. 19 is a view similar to Fig. 16 illustrating the relative positions of the parts of the rotary offset connection preparatory to generating a curve of long radius;

Fig. 20 is a view similar to Fig. 16 illustrating the operation and movement of the parts in generating a curve of long radius;

Fig. 21 is a diagram illustrating the operation of the mechanism of the invention utilized for the production of arcs of large radius;

Fig. 22 is an elevational view of the control panel of the machine shown in Fig. 1;

Fig. 23 is a fragmentary sectional view showing details of the control mechanism of the machine and particularly of the gear transmissions for causing complex movements of the work table, this view being taken substantially on the line 23—23 of Fig. 22;

Fig. 24 is a fragmentary view partly in elevation and partly in section showing details of the gearing mechanism shown in Fig. 23, the view being taken as indicated by the line 24—24 of Fig. 23;

Fig. 25 is a fragmentary view in vertical section taken substantially on the line 25—25 of Fig. 24;

Fig. 26 is an electrical wiring diagram for the machine shown in Fig. 1;

Fig. 27 is a diagram which serves as a guide to show the proper settings of the rotary members to cause the work table to move in a given direction or to produce an arc tangent to a given line at a given point;

Fig. 28 is a diagram illustrating a typical profile which can be produced by means of the machine shown in Fig. 1 and illustrating also the operation of the machine to produce this profile;

Fig. 29 is a diagram illustrating the production of the spiral portion of the profile shown in Fig. 28;

Fig. 30 is a detail view, partly in elevation and partly in section, illustrating the application of the machine shown in Fig. 1 to drafting or scribing;

Fig. 31 is a view similar to Fig. 30, illustrating the application of the machine shown in Fig. 1 to grinding;

Fig. 32 is a fragmentary view in perspective illustrating another form of grinding machine constructed in accordance with the invention;

Fig. 33 is a view similar to Fig. 32 illustrating a machine constructed in accordance with the invention for originating or reproducing three-dimensional surfaces or shapes of revolution;

Fig. 34 is a fragmentary view in perspective illustrating a shaper constructed in accordance with the invention;

Fig. 35 is a view in perspective illustrating a flame-cutting machine constructed in accordance with the invention;

Fig. 36 is a plan view of the flame-cutting machine shown in Fig. 35;

Fig. 37 is a fragmentary view in plan illustrating a lathe constructed in accordance with the invention;

Fig. 38 is a view in front elevation of the portion of the lathe shown in Fig. 37;

Fig. 39 is a view in vertical section of the lathe shown in Figs. 37 and 38, the front portion being substantially on the line 39—39 of Fig. 38 and the remainder being substantially on the line 39—39 of Fig. 37 and also of Fig. 42;

Fig. 40 is a detail view taken in section substantially on the line 40—40 of Fig. 39;

Fig. 41 is a view in horizontal section through the operating mechanism of the lathe shown in Figs. 37 and 38, the view being taken substantially on the line 41—41 of Fig. 39;

Fig. 42 is a view in vertical section taken at right angles to Fig. 39 and substantially on the line 42—42 of Fig. 39;

Fig. 43 is a view in horizontal section taken substantially on the line 43—43 of Fig. 42;

Fig. 44 is a view in side elevation illustrating a milling machine of the rotary head type constructed in accordance with the invention;

Fig. 45 is a view in vertical section through the rotary head mechanism of the milling machine shown in Fig. 44 and taken substantially on the line 45—45 of Fig. 46;

Fig. 46 is a view in side elevation of the rotary head mechanism of the milling machine shown in Fig. 44, the view being taken at right angles to Fig. 44 as indicated by the line 46—46 of Fig. 44;

Fig. 47 is a view in horizontal section taken substantially on the line 47—47 of Fig. 46 looking upwards;

Fig. 48 is a view, partially in section, similar to Fig. 4, modified and extended to illustrate an alternative hydraulic control system for the milling machine shown in Fig. 1; and Fig. 49 is a view, partially in section, similar to Fig. 5 and modified to further illustrate the alternative hydraulic control system.

The present invention is applicable to a wide variety of machines wherein a working member and work piece are caused to have relative movement for working operations, and particularly to such machines in which it is desired to have such relative movement in a predetermined pattern, of lines, surfaces, or shapes in either two or three dimensions. While it is not intended to be all-inclusive, the following list is illustrative of machines to which the present invention relates and with which it may be used: milling machines, lathes, shapers, grinding machines, drafting or scribing machines, engraving machines, flame-cutting machines, sheet metal or fabric cutting machines, spot-welding or riveting and stitching or sewing machines, and machines for generating three-dimensional curves.

The invention provides a machine wherein the course of the relative working movement of the working member and work piece can be caused to generate a wide variety of patterns, including straight lines, angles, arcs of circles and irregular curves in substantially any desired relative arrangement or combination, and this result is achieved without the use of a template or like guiding member. Such a machine may be constructed in accordance with the invention wherein all working and resetting movements of the working parts are directed and controlled by means of a group of dials, knobs, switches and like manually operated control members assembled on a single control panel, which may be at any convenient operating location on the machine or even remote therefrom.

In the operation of a typical machine constructed in accordance with the invention, for example to cut a profile in the case of a milling machine or to draw a profile in the case of a drafting or scribing machine, no template or like pattern or guide member is needed. It is merely necessary to ascertain the linear and angular dimensions of the desired profile and to include these dimensions in an operating schedule or chart showing the sequence of settings for the various control members on the control panel. Thereafter, the operator of the machine merely secures the work member and work piece in proper working relation, as by securing the work piece to the work table in the case of a milling machine, and then operates the dials or other controls in accordance with the operating chart. The desired profile will be automatically produced upon the work piece with great accuracy and without requiring manual readjustment of the working parts of the machine since the necessary resetting movements may be included in the operating chart and carried out automatically. Furthermore, the operator is not required to watch the work directly, since the invention provides indicating means on the control panel responsive to movement of the working parts to show their positions at any given moment with respect to predetermined index positions such as the limits of the working area of the machine.

Machines constructed in accordance with the present invention have great flexibility with respect to the types and shapes of profiles, shapes or surfaces which they can generate or reproduce. Subject only to the physical limitations of the structural dimensions of a particular machine, such profiles can include not only straight lines of any length and at any relative angles but also arcs of circles of any radius from zero up to and including infinity, since a straight line can be considered as an arc of infinite radius, and such arcs can be formed tangent to any desired point in the profile. In addition, such profiles can include spirals of any desired rate of radius change and a virtually infinite number of other irregular curves, all formed with a high degree of accuracy to predetermined dimensions. All such varied profiles can be produced or reproduced in accordance with the invention by remote control operation of the machine as outlined hereinabove and without the use of a template or like preformed guiding means or pattern.

The present invention also has application to many pre-existing machines of the types listed above, to adapt such machines to a greater range of working operation and generally to greater flexibility. For example, the invention provides mechanisms which may be utilized as an attachment for a machine tool, such as a conventional milling machine, and which will enable the machine to reproduce profiles of the wide variety of shapes discussed hereinabove. Furthermore, the invention is not limited to remote control operation but may employ conventional operating methods. For example, an attachment constructed in accordance with the invention for enabling a conventional milling machine to reproduce irregular curves and arcs of any radius up to infinity may be incorporated in such conventional machine without changing its original manner of operation, except as the attachment itself may require an additional operating step or steps, and the machine as modified may readily be operated by wholly manual controls to give highly satisfactory results.

In constructing a machine in accordance with the invention for remote control operation of maximum capability, two sensitive tables are used, each mounted for free translational motion with respect to the base of the machine and in substantially parallel planes. That is to say, each of these table members has freedom of motion with respect to the base in two directions lying in the same plane, so that in motion all points of the table have at any instant the same velocity and direction of movement while at the same time the table is positively restricted and prevented from rotational or pivotal motion, about either an axis lying within its own area or an axis remote from its area, except as its path of translational movement as a whole may follow a circular or arcuate path. For maximum ease of operation and freedom from frictional resistance, it is desirable that the two directions of motion of each table be mutually perpendicular.

These two sensitive tables are coupled together by a rotary offset connection which includes members rotatably connected with each table and provides for motion of either table with respect to the axis of rotation of this offset connection relative to the other table. Furthermore, this offset connection includes guide members which are angularly adjustable in a plane substantially parallel to the planes of motion of the tables and thus provide for controlling the course of this relative motion such that it may vary from a straight line, or arc of infinite radius, to an arc of a predetermined and relatively short, definite radius. The construction of this offset connection also is such that its rotatable component members can rotate together about the axis of either thereof either independently of or simultaneously with the relative arcuate movement of the tables. The invention also provides for selectively securing either of these two tables against movement with respect to the base of the machine while leaving the other table free to move, for example by means of electromagnets, which are readily operated by switch means on a control panel.

In practice, either of these tables may be constituted a work table by securing it in fixed relation to either the working member of the machine or to a work piece, and the other table will then serve as a saddle for the work table. Accordingly, if the saddle is secured against movement with respect to the base, the work table and work piece can be caused to travel with respect to the base to carry out a desired working operation. For example, in the case of a milling machine having a cutting head, a work piece can be clamped to the movable work table and thus caused to move relative to the milling cutter, and by suitably controlling the relative movements and rates of movement of the component parts of the offset connection, the work table can be caused to follow a predetermined and accurately controlled path to reproduce with great accuracy a predetermined profile.

The invention also provides for resetting the machine for further working movement without releasing the work piece or withdrawing it relative to the working member and without unproductive relative movement of the working member and work piece. This result is accomplished with the above construction by reverse operation of the securing mechanism to hold the work table against movement with respect to the base of the machine while leaving the other table free to move, and then operating the offset connection to move the other table to a new position. Furthermore, the same drive and control means can be used in this manner for both working and resetting operations, depending upon which of the two tables is held stationary and which is free to move.

All the working and resetting operations are readily carried out in accordance with the invention by remote control, and the described construction utilizing two sensitive tables provides for optimum results by remote control operation. However, highly satisfactory results can be obtained utilizing only a single sensitive table, which will preferably be the work table, and utilizing means such as a conventional screw feed control for the second table, or even by substituting for the second sensitive table either the work table or the moving saddle of a conventional milling machine or like pre-existing, conventional machine tool. In such embodiments of the invention, the working and resetting movements of the machine may readily be controlled by manual operation while still making possible the reproduction by the machine of profiles of the many varied shapes and types discussed hereinabove in connection with remote control operation.

Referring now to the drawings, which illustrate preferred embodiments of the present invention, Figs. 1-3 show the general appearance in perspective, side elevation and plan of a milling machine of the stationary cutting-head type constructed in accordance with the invention. The base of the machine comprises a flat base plate 30 of magnetic material, such as cast iron, shown as mounted upon a suitable supporting base indicated generally at 31. At one end of the machine is a side member 32 on which is mounted the control panel indicated generally at 33, and a similar side member 34 is secured to the opposite side of the base. A bridge member 35 is connected across the tops of the side members 32 and 34 and is shown as of channelled construction for purposes of rigidity, this bridge and the base and side members being fixedly secured together, as by suitable bolts, to form a strong and rigid framework for the moving parts of the machine.

The working member of the machine shown in the drawings is illustrated as a milling cutter 40 secured in driving relation to a spindle 41 operating in suitable bearings within a threaded member 42 which has a graduated index 43 and serves to raise or lower the cutter 40 by screw movement in a supporting clamp 44 bolted or otherwise secured to the bridge 35, as shown most clearly in Fig. 4. This spindle 41 is driven by motor 45, also mounted on bridge 35, through pulleys 46 and 47 and a suitable drive belt such as the V-belt 48. A scale 49 is shown in Fig. 2 as secured in fixed relation to bridge 35 for readily indicating by reference to index 43 the position of cutter 40 as determined by adjusting screw movement of the threaded member 42.

In the illustrated machine, the work table or platen which carries the work piece is mounted for movement with respect to the base and cutter 40 during working operations, and this work table is indicated generally by the reference character 50. In its upper surface at the end adjacent the cutter, work table 50 is shown as provided with slots 51 of the conventional type adapted to cooperate with clamp members 52 for securing a work piece to the work table, such work piece being represented at 55 in Fig. 1. The work table 50 is mounted for free translational movement with respect to the base of the machine by means of the frame member 60. As shown in Figs. 1–4, this frame member 60 has bolted or otherwise secured to each of its opposite ends a guide member 61 having a V-groove along its outer edge. Each side member 32 and 34 also has bolted or otherwise secured thereto a similar guide member 62 having along its edge adjacent guide member 61 a similar V-groove, and these grooves are adapted to receive and hold a plurality of traveling balls 63, preferably provided with a suitable separator of conventional design serving to maintain the balls in properly spaced relation.

This construction provides for free movement of the frame 60 parallel to the side members of the machine, and the connection between the frame 60 and work table 50 provides for similar relative travel between the work table and frame in the direction substantially perpendicular to the direction of relative movement between the frame and the base. As shown in Figs. 1 and 4, the frame 60 has bolted or otherwise secured thereto a second pair of guide members 65 similar to guide members 61 but perpendicular thereto and having a similar V-groove along their inner edges. Two similar guide members 66 are bolted to the underside of the work table 50, and each has an outwardly projecting V-groove adapted to coincide with the similar groove in the adjacent guide member 65 and thereby to include a row of traveling balls 67 and separators similar to the corresponding balls and separator mounted between the opposing guide members 61 and 62. Thus the work table 50 has complete freedom of motion in one direction with respect to the base by reason of this sliding mounting between the table and frame 60, and it has also complete freedom of motion at substantially 90° to this first direction and in the same plane by reason of the similar mounting of frame 60 on the side members 32 and 34. Accordingly, the work table 50 has free translational movement in two directions at right angles to each other in a plane generally parallel with the base plate while at the same time the action of the guide members 61 and 65 prevent it from pivotal movement.

The other table member of the machine comprises a saddle 70 (Figs. 1, 2 and 4) mounted for free translational movement with respect to the base plate 30 by means of a frame 71 similar to the frame 60 as described. This frame 71 is supported for free movement parallel to that of frame 60 by means of the cooperating pairs of guide members 72 and 73, secured to the frame 71 and side members 32 and 34 respectively, and provided with opposed V-grooves adapted to cooperate with parallel rows of traveling balls 74, this construction being similar to the mounting of the frame member 60 as described and shown. The saddle 70 is in turn mounted on frame 71 for free movement substantially at right angles to the direction of travel of the frame itself by means of the cooperating guide members 75 and 76 having cooperating V-grooves adapted to hold parallel rows of traveling balls 77.

This construction accordingly provides for free translational movement of the saddle 70 in a plane substantially parallel to the plane of corresponding movement of the work table 50. It should also be noted that for preferred results this movement of the saddle should be extended over a somewhat greater area than the corresponding movement of the work table, for greater ease and flexibility of resetting movements in use as will be apparent from the description of the operation of the machine. Such provision for greater movement by the saddle may be conveniently made by utilizing fewer balls between the guides for the saddle and frame 71 than between the correspondng guides for the work table and frame 60.

Clamps are provided for selectively securing the work table and saddle against movement with respect to the base. These clamps are shown as comprising two electromagnets 80 and 90 (Figs. 1, 2 and 4), although suitable mechanical clamps may also be used. The upper electromagnet 80 is carried by the bridge 35 of the machine and is adapted when energized preferably by the application of direct current to grip the work table 50 and hold it substantially rigidly connected with respect to the base. As shown, this magnet 80 includes a core 81 of soft iron having an annular coil or winding 82 retained therein by means of an annular end plate 83 of brass or other suitable non-magnetic material. The core 81 is secured as by means of a nut 84 to the lower end of a shaft 85 preferably of suitable non-magnetic material such as brass. The upper end of shaft 85 passes freely through the bridge 35 and is provided with an annular collar 86, shown as secured thereto by means of a bolt or nut 87. A coil spring 88 is positioned between this collar 86 and the upper surface of the bridge 35 and acts to raise the magnet 80 out of contact with the work table 50 when the coil 82 is deenergized.

The electromagnet 90 is carried by moving saddle 70 and is adapted when energized to grip the base plate 30 and thereby to prevent the saddle from moving relative to the base. This magnet 90 is similar in construction to the magnet 80 and includes a similar core 91, coil or winding 92 and end plate 93 of non-magnetic material. The core 91 is secured by a nut 94 to the lower end of shaft 95 similar to shaft 85 and preferably formed of brass or like non-magnetic material, and the upper end of this shaft 95 carries collar 96 and coil spring 98 similar to the collar 86 and coil spring 88. This upper end of shaft 95 is shown as freely mounted in the lower end of a cup-like housing 99 bolted or otherwise secured to the under part of the saddle 70, with the collar 96 positioned within this housing and the spring 98 between the collar and housing. This spring 98 accordingly functions as in the case of the magnet 80 to raise the magnet 90 out of contact with the base plate 30 when the coil 92 is deenergized.

The rotary off-set connection between the work table 50 and moving saddle 70 includes a rotary member 100 (Fig. 13) connected with saddle 70 for rotation about an axis perpendicular to the plane of translational motion of the saddle, and a second rotary member 101 (Fig. 14) connected with the work table 50 for rotation about an axis substantially parallel to the axis of the rotary member 100. The upper surface of the saddle is formed to provide an annular bearing surface 105 having an outer and upwardly projecting annular flange portion 106, and the under surface of the rotary member 100 includes a complementary annular bearing surface 107 having an annular cut-out peripheral portion 108 adapted to receive the flange 106. This flange and these cooperating bearing surfaces thus provide for rotation of the rotary member 100 about an axis substantially perpendicular to the plane of translational motion of the saddle 70, and for maintaining the rotary member 100 in accurately centered position thereon.

Driving means to cause relative rotation between the member 100 and the saddle 70 are shown as including a worm gear 110 carried by a downwardly projecting annular portion 111 on rotary member 100 and driven by worm 112, this worm 112 being mounted on a shaft 115 journaled in brackets 116, which may be integrally formed within saddle 70. This shaft 115 is driven in turn by means of worm gear 117 and a worm 118 mounted on the shaft of a suitable reversible electric motor 120. At its end opposite the motor 120, shaft 115 is shown as in direct driving connection with one of a pair of self-synchronizing motors, shown as a selsyn motor 122, the other member of the pair being adapted to operate certain of the indicating dials on the control panel, as will be described in detail hereinafter. It should be noted that both of these motors 120 and 122 are fixedly connected by suitable brackets or like means for movement with the saddle 70.

As shown particularly in Fig. 4, the rotary member 100 also includes a hollow shaft portion 125 intergral therewith and extending downwardly therefrom and coaxially with its axis of rotation. This shaft 125 is connected with the member 100 by means of an integral boss 126 engaging within an annular boss 127 projecting upwardly from the lower portion of saddle 70 concentric with the bearing surface 105 and flange 106. This shaft and the two boss portions cooperate to retain the rotary member 100 in proper operating relation to the saddle 70, and are shown as thus held in place by means of an annular ring 128 threaded upon a complementary portion 129 of boss portion 126 and of reduced diameter. The ring 128 seats against the annular shoulder 130 formed by thus reducing the diameter of the threaded portion 129, and thereby holds these parts properly in place while at the same time permitting the desired relative rotation between the saddle and the member 100. These boss portions 126 and 129 and the shaft 125 are hollow, as shown, to provide a conduit for the electric wires carrying electric current for the operation of the various parts of the rotary off-set connection, and the lower portion of shaft 125 carries the collecting ring assembly indicated generally at 131 and functioning to provide the proper electrical connections to these wires throughout rotation of the table, as is described in detail hereinafter.

The rotary member 101 of the rotary off-set connection is best illustrated in Figs. 4–8 and 14. This rotary member 101 is shown as a generally circular plate connected with the work table 50 for rotation about an axis parallel to the axis of rotation of the rotary member 100. As shown most clearly in Fig. 4, the work table 50 has a downwardly extending bearing post 150 which is integrally formed or otherwise connected therewith and which may be positioned at approximately the central point of the work table for optimum stability and balance. The lower end 151 of this bearing post fits within a hole 152 positioned at the center of rotary member 101, this connection being shown as completed by a bolt 153 threaded into the bearing post 150.

The rotary member 101 is also connected for rotation with the rotary member 100, the construction of this connection being illustrated in Figs. 4–8 and 14. As shown, member 101 is formed with a downwardly extending channeled portion 155 adapted to receive and guide in relative sliding relation the upper portion of a connector member 156, the guide 155 and this shoe portion of the connector member having cooperating tongue and groove portions as indicated at 157 in Figs. 4 and 7. The lower portion 158 of connector member 156 is of cylindrical shape and is journaled in a bearing hole 159 in rotary member 100 coinciding with the axis of rotation of member 100. The guide 155 is so positioned and of such length that in one relative position of the connector member 156 therein, the axis of its cylindrical portion 158 will coincide with that of bearing post 150. It will also be seen that with these parts in such relative position, the axes of relative rotation between rotary member 100 and saddle 70 and between rotary member 101 and work table 50 will similarly coincide. A similar connector member 160 has its cylindrial lower portion 161 similarly journaled in a bearing hole 162 in rotary member 100 and spaced radially from the bearing hole 159 as clearly shown in Fig. 4.

The upper end or shoe portion of connector 160 has sliding engagement in a channeled guide or arm 165 similar to guide 155 but integrally formed or otherwise connected with a circular plate 166 separate from rotary member 101 but coaxial therewith, and shown in detail in Fig. 15. This assembly of rotary member 101 and plate 166 thus forms a carriage with respect to which the arm or guide 165 is angularly adjustable and which is in turn supported on the frame constituted by rotary member 100. The connector 160 and guide 165 have cooperating tongue and groove portions 167 as shown in Figs. 4 and 6, and this member 166 is positioned between member 101 and the work table 50 for rotation about the portion 151 of the bearing post 150 as shown in Fig. 4. It will also be noted that rotary member 101 is cut out at 168 (Figs. 5 and 14) to receive the guide 165, this cutout being of generally sector shape to provide for relative rotation of the members 101 and 166 but leaving a partially circular hub portion 169 at the center of member 101 for connection with bearing post 150. This construction permits relative angular adjustment of guides 155 and 165 from relative collinearity through an angle as indicated in Fig. 5, and this adjustment is about the common axis of members 101 and 166.

In order to provide for connecting the rotary member 101 and member 166 in proper relation with the work table 50, the latter is shown as including an annular rib 170 integrally formed or otherwise connected therewith and concentric with and spaced from the bearing post 150. This annular rib 170 includes a peripheral flange 171 extending outwardly therefrom and an annular bearing surface 172 adapted to engage the upper surface of member 166. All these parts are shown as held together in operative relation by means of a two-piece ring 175 bolted or otherwise removably secured to rotary member 101, as by means of bolts 176, and including an inwardly extending flange 177 fitting over the flange 171 of boss 170, the outer end of guide 165 being formed as shown at 178 in Fig. 4 to receive the ring 175. These parts should be so proportioned as to provide for ready relative rotation between each of members 101 and 166 and the rib 170 and flange 171, as well as between members 101 and 166 themselves, and the engaging surfaces of these parts may be suitably lubricated to insure and maintain the desired freedom of relative motion. The provision of rib 170 with its annular bearing surface 172 concentric with but spaced from the axis of relative rotation of member 101 and the work table assists in maintaining proper axial alignment between these parts, to support and brace them during working and resetting movements.

The above construction provides both for relative rotation of rotary member 101 with respect to work table 50 about the axis 180 of bearing post 150 and also for translating to the work table along this axis any motion of rotary member 101 with respect to the base of the machine in a plane perpendicular to its rotational axis 180. This automatically causes translational movement of the work table corresponding to, and in accordance with, such movement of the rotary member 101 and its rotational axis, which may appropriately be considered as lateral movement in a machine constructed as shown. The invention accordingly provides for such lateral movement of rotary member 101, and particularly of its axis of translation, which is its axis 180 of rotation with respect to the work table, and further for causing and accurately controlling such movement to a course of predetermined length and configuration, which may be straight or curved, or both straight and curved, and the curved portion or portions of which may be arcs of any radius or of spiral or other irregularly curved shape.

The sliding connection between the two connector members 156 and 160 and the guides 155 and 165 permits relative lateral movement between rotary members 100 and 101, and such movement will be relatively straight line motion when the guides 155 and 165 are in collinear relation as shown in Fig. 5. Also, since the connector members 156 and 160 are held against lateral movement with respect to rotary member 100, by reason of their engagement in bearing holes 159 and 162, it will be seen that rotation of rotary member 100 in saddle 70 will cause similar rotation of member 101 about the axis of member 100, thus causing rotation of the axis 180 of translation of member 101 about a radius equal to its lateral distance from the rotational axis of member 100, and causing corresponding translational movement of the work table along an arc of the same radius. The converse is true if the work table is held with respect to the base; rotary members 100 and 101 will both rotate about axis 180 with respect to the work table and corresponding translational movement of the saddle will result.

In the use of this machine, the above movement of rotary member 101 with the saddle held stationary operates to drive the work table for working movement, and the converse operation, with the work table held stationary, moves the saddle for resetting purposes. Accordingly, the invention provides means for the controlled driving of the rotary member 101 along the desired course. The drive mechanism for straight line motion is shown in Figs. 4-8 and 13-15, and it includes the connector members 156 and 160 and the guide members 155 and 165.

As pointed out, the connector members 156 and 160 are held against relative movement, other than pivotal, with respect to each other and the rotary member 100, but they can have relative sliding movement with respect to the guides 155 and 165 and the rotary member 101. In order to cause this movement, there is provided a lead screw 200 having a shaft portion 201 journaled in a boss 202 integrally formed or otherwise connected with rotary member 101. The threaded portion of screw 200 has threaded engagement in a boss 203 on connector member 156, and the screw is held against axial movement with respect to rotary member 101 by means of a collar 204 and the collar of a worm gear 205 secured to the shaft portion 201 on opposite sides of boss 202. Accordingly, when screw 200 is caused to rotate, its threaded engagement within the boss portion 203 of connector member 156 will cause axial travel between the screw and connector member, and since the latter is held within rotary member 100, this will result in relative movement between rotary members 100 and 101.

The drive to rotate lead screw 200, as described, is transmitted to worm gear 205 through a worm 206 (Fig. 8) carried by a shaft 207 journaled in a boss 208 on rotary member 101 and guide 155. The opposite end of shaft 207 is driven by a reversible electric motor 210, which is mounted on rotary member 101 and has a worm 211 on its drive shaft meshing with a worm gear 212 secured to the outer end of shaft 207. The outer end of shaft portion 201 of screw 200 is in direct driving connection with a selsyn motor 215 similar to the selsyn motor 122 and similarly used in conjunction with the control panel for indicating the relative positions of rotary members 100 and 101, as will be described hereinafter in connection with the electrical system of the machine. The length of the threaded portion of screw 200 is preferably sufficient to provide a range of relative linear movement between rotary members 100 and 101 at least equal to the distance between the pivotal axes of connector members 156 and 160, thus providing for substantial coincidence between each of these axes and the rotational axis 180 of rotary member 101 with respect to the work table. In the machine illustrated in the drawings, this distance is shown as 3.75 inches, and the operation of the machine will be described accordingly on the basis of this dimension.

With the above construction, and with guides 155 and 165 in line as shown in Fig. 5, rotation of screw 200 will cause corresponding straight line relative motion of the axis of translation of rotary member 101 and hence of the work table or saddle, depending upon which is free to move relative to the base, within the limits determined by the length of screw 200 and guides 155 and 165 and the spacing of connector members 156 and 160 as described, such motion of the work table being from right to left as viewed in Fig. 4 for clockwise rotation of screw 200 as viewed from the right and from left to right for counterclockwise rotation of screw 200. The direction of this motion with respect to any predetermined index direction will depend on the angular relation between guides 155 and 165 and such index direction, and this is determined and controlled by rotation of rotary members 100 and 101 about the axis of member 101, by means of motor 120 as described, with the work table held with respect to the base during such rotational movement. If saddle 70 is also held stationary, such rotational movement of members 100 and 101 will be possible only if they are in coaxial relation, in the relative positions at the limit of their left to right movement as viewed in Fig. 4, and for any other relative positions, the saddle must be left free to move by releasing lower electromagnet 90.

Figs. 16 and 17 illustrate diagrammatically this linear motion of the members 101 and 166 relative to rotary member 100. In each case the saddle 70 is assumed to be held stationary so that rotary member 100 can have only rotational movement. Also, it may be assumed in each case that members 100 and 101 are initially in their relative positions of coincident axes, which it is convenient to consider as the zero setting of the machine for linear movement. Accordingly, when the lead screw is operated with guides 155 and 165 in line, the member 101 will move laterally in a straight line, as shown in Fig. 16, the axis 180 of member 101 starting as indicated from the position corresponding to the small $x$ in Fig. 16 and following a course parallel to the straight arrow. This movement is shown in Fig. 16 as being a full stroke equal to the distance between the pivotal axes of connector members 156 and 160. If this linear motion is desired in a different direction from that shown in Fig. 16, this is produced as illustrated in Fig. 17, by first rotating member 100. Fig. 17 shows member 100 as initially in the same position as in Fig. 16, as indicated by the outlines 155' and 165' of guides 155 and 165, and then as rotated through 45° in counterclockwise direction. Thereafter when the lead screw is operated, the member 101 will move in a straight line as in Fig. 16 but at an angle of 45° to its course in Fig. 16, as shown by the arrow in Fig. 17, and it will thus be been that member 101 can be driven at any angle to its previous stroke by proper resetting of member 100 between strokes.

As pointed out, the limit of relative lateral movement between the rotary members 100 and 101 is determined by the effective length of the lead screw 200. If the profile being reproduced includes a straight line portion of greater length, it may be made in either of two ways. Assuming that at the beginning of the straight portion the members 100 and 101 are in their zero position of coincident axes, and with the guides 155 and 165 already arranged in the proper direction relative to the base or an index position, the motor 210 is operated to rotate screw 200 in clockwise direction for its full effective length, which in this case will be 3.75 inches. Next the work table is clamped to the base and the saddle released, and the motor 210 is then operated in the reverse direction to drive screw 200 counterclockwise for its full effective length. This operation will result in resetting the machine by causing the saddle to move in the same direction and through the same distance as the working table on its previous working stroke. Then after clamping the saddle and releasing the work table, the working stroke may be repeated as described to give a further working stroke of 3.75 inches.

The alternative procedure after completion of the first working stroke is to clamp the work table and release the saddle, and then to rotate the members 100 and 101 through 180° about the axis 180 by operating motor 120, which will similarly result in a resetting of the saddle and also in a resetting of the guides 155 and 165 in a position in line with their previous position but lying in the opposite direction. If then the motor 210 is operated to rotate screw 200 in counterclockwise direction, the work table will make a further working stroke similar to the first and in the same direction with respect to the base.

The work table may also be caused to describe an arc or a complete circle by causing rotational movement of rotary members 100 and 101 with the saddle held stationary and the work table released, and the radius of such arc or circle will depend upon the lateral distance between the axes of members 100 and 101, ranging from zero, when these axes coincide, to a maximum equal to the effective length of lead screw 200, which will be 3.75 inches in the illustrated machine. Fig. 16 illustrates such an operation, and shows member 100 as being rotated in counterclockwise direction after the linear stroke of member 101 as described. This will cause the members 100 and 101 to rotate about the axis of member 100, with the central axis 180 of member 101 following an arc having a radius equal to the extent of the previous relative linear movement between members 100 and 101, which is shown in Fig. 16 as equal to the distance between the pivotal axes of connector members 156 and 160. The arc followed by axis 180 is indicated by the smaller curved arrow in Fig. 16, and it will be understood that every point on the work table 50 will have translational motion along a similar arc of the same radius. This radius may be varied by resetting the machine, as described, to any desired relative position of the central axes of members 100 and 101 within the range afforded by the effective length of the lead screw.

If members 100 and 101 are caused to rotate and to have relative linear movement at the same time, which can be done by simultaneous operation of motors 120 and 210, the axis 180 will be caused to describe an arc of increasing or decreasing radius, which will result in a spiral pattern of movement for the work table and work piece. This spiral movement is illustrated in Fig. 18, which shows members 100 and 101 as starting in their zero position and rotating through 270° while at the same time member 101 moves a full stroke laterally relative to member 100. In Fig. 18, the parts are indicated as starting in the same relative positions and alignment as in Figs. 16 and 17 and rotating in clockwise direction. At the end of 90°, 180° and 270° rotation, member 101 will occupy the positions indicated at 101', 101'' and 101, respectively. This course is indicated by the larger spiral arrow in Fig. 18, and the axis 180 will actually follow the spiral course shown by the smaller spiral arrow, as will each point on the work table.

Operation of the machine as described above limits the work table to the production of arcs and circles of a maximum radius equal to the effective length of screw 200, but the invention also provides for further adjustment of the rotary off-set connection to provide for generation of arcs of larger radius, up to infinity. This result is accomplished by relative angular adjustment of guides 155 and 165, which may be carried out by the mechanism shown most clearly in Figs. 5-7, 14 and 15, and it is illustrated in Figs. 19-21. The guide 165 has a web 220 integrally formed on one side thereof or otherwise connected therewith. This web is formed on its outer edge to provide a gear segment 221 centered on axis 180 and adapted to mesh with a worm 222 on a shaft 223 journaled in suitable bosses 224 on rotary member 101. Shaft 223 carries a worm gear 225 meshing with a worm 226 on a shaft 227 journaled in bosses 228 on member 101. A reversible electric motor 230 is mounted on member 101 and drives a worm 231 which meshes with a worm gear 232 on the end of shaft 227 opposite worm 226. Thus motor 230 may be driven to cause angular adjustment of member 166 and guide 165 with respect to guide 155 as a result of the driving engagement between worm 222 and segment 221. A selsyn motor 235 is directly driven by the end of shaft 223 opposite worm 222, and is connected with suitable indicating means on the control panel to show the angular relation of guides 155 and 165, as will be described hereinafter.

When guides 155 and 165 are in line, relative movement of members 100 and 101 through operation of the lead screw 200 will also be in a straight line, as shown in Figs. 16 and 17. However, when these guides are relatively inclined, the relative movement of members 100 and 101 will be along an arcuate course of a definite radius, and this is illustrated in Figs. 19 and 20. Fig. 19 shows members 100 and 101 in their zero position but with guide 155 moved through an angle $a$ from its position in line with guide 165. With the guides in this position, when member 101 is moved laterally, it will turn at the same time and in such manner that its axis 180 will follow an arc of a definite radius $r$. This arc corresponds to the small arrow in Fig. 20, and its radius will depend on the value of the angle $a$, as will now be explained.

The operation of the guides 155 and 165 in producing arcs of large radius will be readily apparent upon reference to the geometric principle that an angle inscribed in a circle is measured by one-half its intercepted arc, and therefore two angles inscribed in the same circle and measured by the same intercepted arc are equal, as illustrated by the diagram in Fig. 21. In this diagram, the point $c$ represents the axis 180, and the points $b$ and $d$ represent the pivotal axes of the cylindrical portions of connector members 156 and 160, respectively. The distance between the points $b$ and $d$ is a constant $k$ and corresponds to the lateral distance between the pivotal axes of the two connector members, which is 3.75 inches in this example. The angle $bcd$ may be termed as the "included angle" of the two guide members and is determined by the relative angular setting of the guides. It may, therefore, vary from a maximum of 180° or a straight line, to an angle which is determined by 180° minus the angle $a$ shown in Fig. 5, which represents the maximum angular movement between the guides 155 and 165. The included angle may accordingly be designated as angle $a'$; as it will be evident that it is thus the supplement of the angle $a$.

If a circle is drawn through the points $b$, $c$ and $d$ about a center $x$, then the angle $a'$ is measured by the arc $bfd$. If the guide members and connector members move relative to each other such that axis 180 assumes a new position $c'$, the arc $bfd$ remains unchanged and the angle $bc'd$ is equal to the angle $bcd$, and the point $c'$ will therefore fall on the circle in accordance with the above geometrical principles. If the radius of this circle is designated as $r$, it will be seen that $$\sin \alpha' = \frac{k}{2r} \qquad (1)$$

and this is the basic formula utilized in the adjustment of the guides 155 and 165 to form an arc of large radius. However, since $$\alpha = 180° - \alpha' \qquad (2)$$
$$\sin \alpha = \sin (180° - \alpha') \qquad (3)$$

and $$\sin \alpha = \frac{k}{2r} \qquad (4)$$

To translate this into practice by means of the mechanism shown in Figs. 4-8, it has already been pointed out that the relative movement of axis 180 of member 101 is between two limit positions which are its positions of coincidence with the pivotal axes of connector members 156 and 160 respectively, and the course of this relative movement is determined by the angular setting of guides 155 and 165. If the guides are in line, i. e., $a$ being 0° and $a'$ being 180°, this course will be a straight line, or an arc of infinite radius. But if the guides are arranged at a lesser angle to each other, this course will follow an arc corresponding to the arc $bcd$ in Fig. 21, as illustrated in Fig. 20, and Equations 1 and 4 show how the radius of this arc depends upon the particular angular setting of the guides.

To reproduce an arc of predetermined long radius by this mechanism, Equation 4 is utilized to determine the proper angular setting for the guides to give the proper radius. For example, in preparing to reproduce an arc of 12-inch radius, this value for $r$ may be substituted in Equation 4; as follows:

$$\sin \alpha = \frac{3.75}{2 \times 12} = .15625 \qquad (5)$$
$$\alpha = 8°59' \qquad (6)$$

Having thus determined the proper angular setting for guides 155 and 165 and adjusted them accordingly, as by operation of motor 230, motor 210 may be operated to drive lead screw 200, and the axis 180 of rotary member 101 and the work table will be caused to describe the desired arc about a radius of 12 inches.

It is possible by means of this type of mechanism to produce an arc of any radius from infinity down to a small radius. However, in the illustrated machine it is possible by simple rotation of the rotary members, as described, to produce an arc or circle of radius up to an arbitrary maximum of 3.75 inches, and as a practical matter therefore, the construction of guides 155 and 165 may be such that the range of angular displacement of one guide relative to the other will cover only the longer radii but will overlap the range obtainable by simple rotation, thus providing for complete coverage of the entire range of radii from zero to infinity. Thus in the machine shown and described, it is preferred to have the angle $a$ adjustable to cover the range of arcs of the radius of 3.75 inches and above. In order, therefore, to determine the maximum angle $a$ required for this result, it is merely necessary to let $r$ be equal to $k$ in Equation 4 as follows:

$$\sin \alpha = \frac{k}{2r} = .5 \qquad (7)$$
$$\alpha = 30° \qquad (8)$$

Accordingly, if the cut-out at 168 and the gear segment 221 are proportioned to provide for relative angular movement of guides 155 and 165 through a total angle of 30°, it will be possible by means of the illustrated construction to cause the work table 50 to travel along an arcuate course of any radius up to and including infinity. This means that the angle $a$ need be only 30° and it is convenient to utilize such an angle for purely design and mechanical reasons, but it will be clear that in any case the angle can be made less where a greater radius is obtainable by direct rotary movement.

If the mechanism is constructed to provide for greater angular movement of guides 155 and 165, for example through a range of 90° for angle $a$, this will result in reducing the minimum radius of arc produceable by this method to a value equal to one-half the constant $k$, as is shown by Equation 4. Thus for a given distance $k$ between the axes of connector members 156 and 160, the minimum radius of arc produced as shown in Figs. 20 and 21 is obtained when the angle $a$ is equal to 90°, and if the angular movement of the guides is carried still further, the resulting increase of angle $a$ will result in increasing the circumference of the generated arc. On the other hand, the radius of the arc produced as shown in Figs. 20 and 21 may be further varied if the parts are constructed to provide for variation of the distance $k$, and this radius will approach zero to the same extent that the distance $k$ approaches zero, as is also apparent from Equation 4.

The length of arc which may be produced at a single stroke is determined by the effective length of screw 200, and in this case will be the arc subtended by a chord of 3.75 inches. To produce a longer arc, the machine may be reset, as described above, by clamping the work table, releasing the saddle and driving screw 200 in the reverse direction. The alternative resetting procedure described for straight line profiles is not suitable for a continuous arc, since it would result in an arc curved in the opposite direction on the second stroke. To produce an arc shorter than the maximum, it is necessary only to compute the length of the chord which will subtend the desired angle of arc at the desired radius, and then to limit relative axial movement of screw 200 to the calculated chord length. Thus, since the chord C of the angle $\phi$ to be subtended by the arc to be described at a radius $r$ is equal to the relative axial travel of srcew 200, $$C = 2r \sin \frac{\phi}{2} \qquad (9)$$

But since from Equation 4

$$r = \frac{k}{2 \sin \alpha} \qquad (10)$$

$$C = \frac{k}{\sin \alpha} \cdot \sin \frac{\phi}{2} \qquad (11)$$

It should be noted that in all production of arcs of large radius by this mechanism, unless the screw 200 is at one of its end limit positions, with axis 180 coinciding with the pivotal axis of one of connectors 156 and 160, the desired ready control over the dimensions and position of the arc by control over the relative movement of the screw 200 will not be obtained and further calculations will be required.

The position of each arc produced as described with relation to the other portions of the profile or the index positions of the work table is determined by the initial setting of the rotary members 100 and 101 and the resulting positions of the connector members 156 and 160 and guides 155 and 165 with respect to the base. Thus for arcs of small radius, up to the effective length of the lead screw 200, and with the guides in line, the arc will start tangent to a line perpendicular to the plane passing through the pivotal axes of the connector members 156 and 160 at the start of the rotary working movement, and such line, which may be imaginary, may be readily placed at any desired position in the profile by appropriate initial adjustment of member 100 during resetting. In the case of arcs of large radius, greater than the effective length of the lead screw, a given arc will start tangent to a line parallel to the plane forming the angle $a$ with the plane passing through the pivotal axes of connector members 156 and 160.

This last point may be more readily understood by reference to Fig. 21. If the members 100 and 101 are initially in the zero position, as defined, the arc $bcd$ will be tangent at the point $b$ to the line $yy'$ forming the angle $dby$ equal to the angle $a$. At the end of a full stroke of lead screw 200 from the zero position, the arc $bcd$ will be tangent at the point $d$ to the line $zz'$ forming the angle $bdz$ equal to angle $a$, so that the total angular change of the tangent of arc $bcd$ is $2a$. Accordingly, for an arc formed by starting with the machine at the zero or other end position of members 100 and 101, to cause the arc to start tangent to a given line it is necessary only to rotate member 100 through angle $a$ from a position wherein the plane passing through the pivotal axes of members 156 and 160 is parallel to the tangent line, the direction of rotation being towards the imaginary center of the arc to be produced.

The above calculations are simple and readily made for arcs formed by starting with members 100 and 101 at one of their relative end positions, and such procedure is accordingly recommended. If the arc is started with members 100 and 101 at an intermediate position, it will be seen that the calculations and control will be more complex. It will also be noted that starting from the zero position, it is possible with the mechanism as illustrated for member 101 to move in a large arc relative to member 100 only in a counterclockwise direction, as viewed from above as in Fig. 20, and conversely only in clockwise direction starting from the other end position. This, however, is due only to the fact that guide 165 is shown as mounted for movement with respect to guide 155 only in counterclockwise direction, as viewed from above, from their positions of collinearity, and would not apply if guide 155 could swing in either direction which may readily be provided for if desired.

The machine will also function to produce irregular curves in accordance with the above operating principles. Thus it will be seen that for any given starting position, both the radius of the arc produced and the position of its center of curvature will depend upon the angular setting of guides 155 and 165. If, therefore, this angular setting is changed simultaneously with the operation of the lead screw, the resulting irregular curve will be composed of arcs having both a constantly changing radius and a constantly shifting center, and a wide variety of such irregular curves may be obtained with the illustrated mechanism by providing a variable gearing to control operation of the motors 210 and 230, one example of such gearing being shown and described in connection with the remote control system.

Since the above mechanism for driving the work table includes a plurality of members movable with respect to each other as well as the moving saddle, the invention employs a system of collecting rings for transmitting the electric current for the operation of the motors 210 and 230 and selsyn motors 215 and 235 carried by the rotary member 101. Referring particularly to Figs. 4 and 9–12, these wires may lead to the machine in a cable 250 and enter the housing 99 through a slot 251. Within this housing is a boss 252 in which is mounted a rod 253 having secured to its upper end a bracket 254 which is in turn bolted to a block 255 of Bakelite or like insulating material. Each of the wires in cable 250 is provided at its end with a collecting rod 256 of springy metal which is inserted through one of a series of vertically arranged bores in the block 255 so that these rods 256 all lie in substantially the same vertical plane, as shown in Figs. 4 and 11.

The hollow shaft 125 which extends downwardly from rotary member 100 is provided with an insulating outer sleeve 259 on which in turn are mounted collecting rings 260, separated by insulating rings 261 as shown in Fig. 11. Each of these rings 260 is provided in its outer face with a groove 262 adapted to receive one of the collecting rods 256 as shown in Fig. 11, and the wires leading to the motors and selsyn motors on rotary member 101 are connected with these rings. As shown in Figs. 11 and 12, the shaft 125 and sleeve 259 are slotted at 263 to receive these wires 265, and each ring 260 has a radial bore through which the bare end 266 of the proper wire is inserted and preferably soldered at 267 to insure good electrical contact. The other ends of these wires lead to rotary member 101 as shown in Fig. 4. Also, in order to insure proper contact between rods 256 and rings 260, rod 253 is shown as provided with a handle 268 by which it may be turned to force rods 256 against rings 260 as shown in Fig. 10, and rod 253 may be readily secured in this position by a lock screw 269 as shown in Fig. 4.

As has been pointed out, the selsyn motors 122, 215 and 235 are utilized in conjunction with the remote control panel to show the relative motion of the parts of the rotary off-set connection, each of these selsyn motors having its counterpart at the panel. It is also desirable to provide means for similarly indicating the linear movement of the work table 50, and selsyn motors may also be used for this purpose. As shown in Figs. 1–4, relative movement between the base and the supporting frame 60 for the work table may be measured by means of a selsyn motor 280 mounted on side member 32 and having on its shaft 281 a gear 282 which meshes with a rack 283 carried by the frame 60. This rack is shown as having a pivotal connection at 284 to frame 60 so that it may be readily disengaged from gear 282 to permit free movement of the table without operating selsyn motor 280 if desired. Relative movement between frame 60 and the work table itself may be similarly measured by a selsyn motor 285 mounted on frame 60 and having on its shaft a gear 286 meshing with a rack 287 secured to the work table, preferably by pivotal connection similar to that between rack 283 and frame 60.

With this construction, movement of the work table or frame will result in rotation of one or both of these selsyn motors, and this rotation may be readily translated into movement of suitable dials on the control panel, as will be described. It is also desirable to limit this movement of the work table by electrically operated means, and limit switches may be readily provided for this purpose. As shown in Figs. 2 and 3, movement of the frame 60 with respect to the base may be controlled by limit switches 290 and 291 mounted at opposite ends of side member 34 and each having a pin 292 extending inwardly in position to be engaged by frame 60 as it approaches its desired limit of movement. These switches may be so connected as to operate a warning light or similar device or may simply cut off the operating circuit of the machine when engaged by the frame, as indicated in the wiring diagram in Fig. 26. Movement of the work table with respect to the frame 60 may be similarly controlled by limit switches 295 and 296 mounted at opposite ends of bridge 35 and each provided with a pin 297 extending inwardly of the machine in position to be engaged by the work table as shown in Figs. 1 and 2.

The milling machine constructed as described and shown is especially designed for completely electrical operation by means of a remote control panel, and a suitable panel for such operation is illustrated in Figs. 22–25 and will be described in conjunction with the associated wiring diagram shown in Fig. 26. Referring to Fig. 22, each of the five pairs of large and small dials at the left of the panel 33 serves to indicate one of the motions of the machine, and each large dial is geared to its associated small dial in such manner that a convenient number of revolutions of the large dial will equal one revolution of the small dial, thus providing for relatively fine adjustments and control. The two pairs of dials at the top of the panel identified by the legends "X" and "Y" indicate motions of the work table along its OX and OY axes, which are defined as parallel and perpendicular, respectively, to the length of the machine. The pairs of dials identified by the legends "RM," "LM" and "LR" indicate, respectively, rotation of members 100 and 101 with respect to the saddle or work table, lateral motion of members 100 and 101 by operation of the lead screw 200, and relative angular movement of the guides 155 and 165.

Referring to Fig. 23, the large dial 300 of the pair of dials RM is shown as mounted on a hollow shaft 301 which is directly connected at 302 with the shaft of a selsyn motor 303 which, as shown in Fig. 26, is connected through a differential selsyn motor 305 to the selsyn motor 122 driven by motor 120 which controls the rotary movement of members 100 and 101. The selsyn motor 303 is accordingly designated by the legend "RM" in Fig. 26 since it operates the correspondingly designated dials. Shaft 301 is also connected through a gear train indicated generally by the reference character 306 with a shaft 308 to which is secured the small dial 310 of this pair of dials. Since these dials are intended to indicate rotary motion, it will be noted that the small dial 310 is graduated from 0° to 360°, and its connection through the selsyn motors is preferably such that it will rotate once for each complete revolution of the rotary members 100 and 101. The large dial 300 is shown as graduated from 0 to 9, and if gear train 306 is so chosen that the ratio between the dials will be 40 to 1, then each small division of dial 300 will represent 6' of rotation of member 100.

It will be apparent that since all of the pairs of dials on the instrument panel indicate relative motion, some index position should be established for each, and this may conveniently be with respect to predetermined index directions on the work table. Since the work table is considered as having motions along OX and OY axes, as stated, in initially connecting the machine one corner of the working area of the work table may be chosen as the zero point, and for the purposes of this description this point 0 is considered as the near left-hand corner as viewed in Fig. 1. Accordingly, by definition the X direction is toward the near right-hand corner of the working area of the work table as viewed in Fig. 1 and the Y direction will be toward the corresponding far left-hand corner. The zero position for the dials RM is accordingly defined for present purposes as that position wherein the plane passing through the centers of the bearing holes 159 and 162 is parallel to the OX axis and the bearing hole 162 is on the right-hand side of the bearing hole 159 as viewed in Fig. 1.

The large dial 315 of the pair of dials LM is connected through shaft 316 to a selsyn motor 317 which is in turn directly connected electrically with the selsyn motor 215 driven by the lead screw 200. Dial 315 is also connected through a gear train 318 with its small dial 320, as shown in Fig. 23. It will be noted that this small dial 320 is graduated from 0 to 3.75 inches in accordance with the effective length of the lead screw, as stated, and the large dial 315 is graduated from 0 to 0.10. Thus with the connection through the selsyn motors such that the dial 320 will rotate from 0 to 3.75 for a single complete stroke of the lead screw, the gearing between the two dials may be at a ratio such that one revolution of dial 315 corresponds to one of the divisions on dial 320 of 0.10 inch. As pointed out in connection with the description of the mechanical operation of the machine, the zero position for lateral movement between members 100 and 101 may be considered as that position wherein their axes of rotation are coincident, and this is accordingly considered as the zero position as indicated by these dials 315 and 320.

The large dial 322 of the pair of dials LR is connected through a hollow shaft 323 to a selsyn motor 325 and through gear train 326 with its small dial 328. As shown in Fig. 26, the selsyn motor 325 is connected through a differential selsyn motor 330 with the selsyn motor 235 which is connected with the angularly movable guide members on rotary member 101. It will accordingly be noted that the small dial 328 is graduated only from 0 to 30° in accordance with the maximum value of the angle $a$ as described, and the zero position for this dial will accordingly be that position of the machine wherein guides 155 and 165 are in line. The large dial 322 is shown as graduated from 0 to 5, and if geared with the dial 328 at a ratio of the order of 6 to 1, this will result in each small division of dial 322 representing 3' of angular movement between guides 155 and 165.

The large dial 331 of the pair of dials X may be geared to its small dial 332 at a suitable ratio such as 10 to 1 and is driven by a selsyn motor 333 which is in turn electrically connected with the selsyn motor 285 as shown in Fig. 26. The large dial 335 of the pair of dials Y may be similarly geared to its small dial 336 and is driven by a selsyn motor 340 which is electrically connected with the selsyn motor 280, also as shown in Fig. 26, the graduations of these dials will depend upon the dimensions of a given machine and particularly on the dimensions of the actual working space on the work table. In Fig. 22, each of the small dials of these pairs is shown as graduated from 0 to 8.5, thus indicating that the working area or range of movement of the work table is delimited by a square 8.5 inches on a side, included between the OX and OY axes as defined hereinabove, and for the sake of illustrative example these dimensions may be considered as suitable. Accordingly, the graduations on the dials X and Y will represent relative motion of the work table and cutter with respect to the point 0, as will be described in more detail hereinafter in connection with the description of a typical work operation.

Now referring more particularly to Figs. 22 and 26, the supply of power for operation of the working parts of the machine other than the electromagnets 80 and 90 is initially supplied from a suitable source of alternating current controlled by a switch 350 which may be positioned at a convenient location on the instrument panel. The direct current for energizing the electromagnets is shown as supplied from a suitable source controlled by a switch 351, also positioned on the instrument panel. Closing of switch 350 supplies current to the various selsyn motors and for the operation of the drive motor 45 for the cutter spindle, which is shown as controlled by a separate switch 352. It supplies current also to the magnetically operated switches controlling the electromagnets in accordance with the setting of the selective single pole double throw switch 355 which determines whether magnet 80 or magnet 90 is energized. The switch 355 is accordingly shown as provided with suitable legends "Reset" and "Profile" on the instrument panel, the reset position being that in which magnet 80 is energized to hold the work table stationary while the saddle is moved to a new position, and the profile position being that in which magnet 90 is energized to hold the saddle stationary while leaving the work table free for working movement. Fig. 22 also shows signal lights 356 and 357 adjacent the reset and profile legends which are energized selectively in accordance with the energization of one or the other of the magnets.

Referring to Fig. 26, which illustrates the wiring diagram for the magnets at the lower left hand corner, the switch 355 is illustrated as in the reset position, the magnet 80 being energized and magnet 90 released. With switch 355 in this position, when switch 350 is closed, this will supply current through switch 355 to the coil of the magnetic contactor 360, and this will result in simultaneously closing switch 361, opening switches 362, 363 and 364, and closing switches 365 and 366. The closing of the latter pair of switches supplies direct current through switch 351 to electromagnet 80, and also to the signal light 356 on the control panel, thus causing the magnet to grip the work table. At the same time, since magnetic contactor 370 is deenergized its correspondingly controlled switches will be in the opposite positions, switch 371 being open, switch 372, 373 and 374 being closed and switches 375 and 376 being open, and electromagnet 90 is accordingly deenergized and leaves the saddle free to move relative to the base.

It is desirable during working operations to insure that one of magnets 80 and 90 will be in clamping position at all times to prevent accidental creeping of the work table relative to the cutter. Since the magnets are shown as selectively operated by the single switch 355, each of the magnetic contactors 360 and 370 is provided with a hold-down circuit providing for a delayed release when switch 355 is shifted from one position to the other. This hold-down circuit for magnetic contactor 360 is shown as comprising a bimetallic switch element 367 and a hot wire 368, which is energized by current through the switch 372 which is closed when magnetic contactor 370 is deenergized, and the hold-down circuit for magnetic contactor 370 comprises a bimetallic switch 377 and hot wire 378, which is energized by current through switch 362 when magnetic contactor 360 is deenergized.

When the selector switch 355 is shifted to the profile position, alternating current is supplied to the magnetic contactor 370, causing switches 371, 375 and 376 to close and switches 372, 373 and 374 to open, and this will in turn supply direct current to the electromagnet 90 and signal light 357. Since the opening of switch 372 breaks the circuit to the hot wire 368, the latter will begin to cool, but this requires a definite time interval, for example one second, and during this interval switch 367 remains closed and so maintains a supply of alternating current to the magnetic contactor 360 through switch 361. Accordingly, the electromagnet 80 is thus held in gripping position for this interval, thus insuring that electromagnet 90 will clamp before electromagnet 80 is released and so preventing accidental creeping of the combined work table and saddle mechanism as a result of simultaneous deenergizing of both electromagnets. After the hot wire 368 is cooled sufficiently to permit switch 367 to open, the magnetic contactor 360 will be deenergized, thus opening switches 361, 365 and 366 and permitting switches 362, 363 and 364 to close. The closing of switch 362 completes the circuit through the hot wire 378 to close switch 377 in preparation for the next cycle. At the same time, the closing of switches 363 and 364 reverses the magnetic flux to the magnet 80 through the switch 390 and permits the magnet to be lifted by the action of spring 88. The lifting of magnet 80 also causes the opening of this switch 390, as indicated in Fig. 26, and thereby breaks the circuit to the magnet 80 and allows it to remain in lifted position.

When switch 355 is again reversed, the reverse of this cycle takes place, with magnet 80 being energized before magnet 90 is released by operation of the hot wire switch. Also, since when magnet 90 is energized and moves into clamping position it closes the switch 391, when the magnetic contactor 370 is subsequently deenergized, the magnetic flux is reversed through this switch 391 to permit the magnet to be raised by spring 98 and thereby to open the switch 391. The resistance 393 is included for the purpose of reducing the reversed current to the electromagnets. The switch 395 is included in the circuit for the purpose of simultaneously deenergizing both of the magnetic contactors 360 and 370 and thereby releasing both the electromagnets to permit the entire work table and saddle mechanism to be moved manually to any desired starting position with reference to the work table area.

The controls for the electric drive motors 120, 210 and 230 are also illustrated in Figs. 22 and 26. Motor 120 is shown as controlled by a three-position switch 400 which is mounted on the control panel and provides for either fast or slow operation of the motor. In its "Slow" position this switch provides a connection through a fixed resistor 401, and in its "Fast" position the switch provides a connection through a variable resistor 402 shown as provided with a corresponding control knob on the instrument panel. Since the selsyn motors 122 and 303 will be energized directly upon the closing of switch 350, it will be seen that operation of motor 120 will produce corresponding operation of the selsyn motors and the desired rotation of the two dials RM. Motor 120 is also provided with a reversing switch 403 which is shown as mounted on the instrument panel and provided with suitable legends "Right" and "Left," right-hand motion being defined as movement of the work table relative to the base in clockwise directed as viewed from above and left-hand motion being similarly defined as counterclockwise when viewed from above. It is also desirable from the standpoint of convenience in operation to have the connections between the selsyn motors and dials RM such that the dials will rotate in the same direction as the work table.

The control systems for motors 210 and 230 are quite similar to that just described for motor 120. Motor 210 has a three-position switch 405 providing a connection for "Slow" operation through the resistor 406 and a connection for adjustable "Fast" operation through the variable resistor 407. This motor 210 also has a reversing switch 408 shown as mounted on the instrument panel and provided with legends "For." and "Rev.," forward motion being defined as relative movement of members 100 and 101 away from their zero position of coincident axes and reverse movement being defined as relative motion of members 100 and 101 towards this zero position. It will be seen that this measurement of the lateral movement of members 100 and 101 is independent of their direction of movement as determined by their setting through dials RM.

The motor 230 is controlled by a three-position switch 410 providing a connection for "Slow" operation through the resistor 411 and a connection for "Fast" operation through the variable resistor 412, and this motor is also provided with a reversing switch 413 shown as mounted on the instrument panel and provided with legends "Large" and "Small." As pointed out, when the guides 155 and 165 are in their position of relative collinearity the machine is set for an arc of infinite radius, and hence Large movement is defined as movement towards this zero position. Similarly, motion of the guides to increase the size of angle $a$ provides for forming arcs of progressively decreasing radius, and it is this movement which will be produced when the switch 413 is in the Small position.

It should be noted that the direction of movement of the work table relative to its OX and OY axes under the operation of the lead screw 200 is controlled by the setting of the rotary members 100 and 101 as determined by the dials RM. This is illustrated by the diagram in Fig. 27. As shown, when dials RM are set at 0°, by definition forward movement of the work table will be parallel to the OX axis and towards X, and reverse movement will be similarly parallel to OX but away from X. Conversely, with dials RM set at 180°, forward movement will be parallel to OX and away from X, and reverse movement will be parallel to OX and towards X. Similarly, with dials RM set at 90°, forward movement of the work table will be parallel to OY and towards Y, and reverse movement will be parallel to OY and away from Y, and the converse is true with dials RM set at 270°. Any movement at an acute angle to both of axes OX and OY may be similarly obtained by a corresponding setting of dials RM. For example, at a setting of 45°, forward movement will be away from O in a direction at 45° to both the OX and OY axes, and movement in the other directions at an angle to both axes may be similarly controlled.

The invention also provides for operating some or all of motors 120, 210 and 230 simultaneously and at different ratios to produce spiral and other irregular movement between the work table and working member. The gear systems shown in Figs. 23–25 and the differential selsyn motors 305 and 330 control such operations of the machine. Referring to Fig. 23 shaft 316 of large dial 315 of dials LM has a series of stepped gears 425 keyed thereto, seven such gears being shown, and each of shafts 301 and 323 carries a gear transmission capable of selective engagement with any of the stepped gears 425 to provide for driving shaft 316 simultaneously with either or both of shafts 301 and 323 at any of a series of different relative ratios. When any of these shafts are geared together, one or both of the selsyn motors 305 and 330 function to keep their associated drive motors at the proper relative speeds to maintain the desired ratio.

Referring to Figs. 23–25, shaft 301 carries a gear 430 which is keyed thereto through a slot 431 by the connection 432 between the gear hub and a shaft 433 mounted for axial movement within shaft 301 and provided with an external handle 434. A carrier 435 is rotatably mounted on the hub of gear 430 through ball bearing 436 and is provided with three arms carrying idler gears 437, 438 and 439 for connecting gear 430 with the stepped gears 425, idlers 437 and 438 being in mesh with gear 430 and idler 439 being in mesh with idler 438. Thus when idler 437 is in mesh with one of gears 425, shaft 301 will be driven in the same direction as shaft 316, and when gear 439 is in mesh with one of gears 425, shafts 301 and 316 will rotate in opposite directions.

The shifting mechanism for the above gear transmission includes an annular ring 440 rotatably secured to the supporting wall 441 by annular bearings 442 and 443. A pin 444 extends inwardly from ring 440 to a fork 445 on carrier 435 so that any rotary motion of ring 440 will produce corresponding rotation of the carrier on bearing 436. A similar pin 446 extends outwardly through an arcuate slot 447 in the instrument panel and is provided with a pointer handle 450 adapted to be brought into register with each of the series of indicia 449 on the panel. These indicia represent forward and reverse positions of the gear transmission with respect to each of the seven stepped gears 425 and accordingly include forward and reverse sets of positions A to G and a neutral or 0 position. Handle 450 also has a spring actuated locking pin 451 adapted to engage in the series of locking holes 452 adjacent each of indicia 449.

This construction provides for putting gear 430 selectively in forward or reverse driven engagment with any of the stepped gears 425. For example, Fig. 24 shows pointer handle 450 as in the reverse D position, and handle 434 on shaft 433 is accordingly pulled out as illustrated in Fig. 25 until the corresponding D mark of the similar indicia 455 shows beyond dial 300. This will result in causing gear 439 to mesh with the center gear of the stepped gears 425, as shown in Figs. 23 and 24, and this center gear will preferably have the same number of teeth as gear 430 so as to drive shafts 301 and 316 at a 1 to 1 ratio in opposite directions. Any others of gears 425 may be similarly connected with gear 430 to drive shafts 301 and 316 at different relative speeds in the same or opposite direction, by similarly shifting pointer 450 to the desired position and then shifting shaft 433 to its corresponding position.

A similar gear transmission 459 is provided for connecting shafts 316 and 323. The pointer handle 460 for transmission 459 cooperates with indicia 461 and is shown in Fig. 22 in the 0 position, and this transmission is accordingly shown in Fig. 23 as out of engagement with gears 425. The ring 462 is similar to ring 440 and is connected with the transmission and pointer 460 by similar pins 463 and 464, respectively. Transmission 459 may be similarly shifted axially by the handle 465 of a shaft within hollow shaft 323, and shaft 323 may thus be connected with shaft 316 as described in connection with shaft 301. This construction accordingly provides for connecting shaft 316 with either or both of shafts 301 and 323 for rotation at the same or different speed ratios and in the same or opposite directions.

The system for controlling and synchronizing the simultaneous operation of two or more of the drive motors is shown in Figs. 22 and 26. For example, the machine may be operated with the gearing set as shown in Figs. 22–25 to produce a spiral curve. For a right-hand spiral, switch 403 is first shifted to its Right position and switch 408 to the Forward position. Also, variable resistor 407 is adjusted for a desired speed of motor 210, preferably sufficiently low for accurate control. Then switch 405 is moved to its Fast position, and substantially simultaneously the switch 470 is closed instead of switch 400. Switch 470 completes a circuit to motor 120 through variable resistor 471 and fixed resistor 472, which provides for operation of motor 120 over an intermediate speed range in accordance with the initial setting of resistor 471, and both motors 120 and 210 will thus commence to operate simultaneously and at speeds in relation to the initial settings of variable resistors 407 and 471.

If now motors 120 and 210 should be operating in a speed ratio different from the corresponding geared ratio between selsyn motors 303 and 317, the differential selsyn motor 305 will cause its associated switch 475 to close, the contact arm of this switch being connected with the shaft of the selsyn motor 305 as indicated in Fig. 26. For example, if motor 120 tends to drive selsyn 303 slower than motor 210 drives selsyn 317, switch 475 will be caused to make contact with its upper terminal 476. This will energize the operating coil of the relay 477, thus closing the switch arm of the relay and shorting out resistor 472, which will cause motor 120 to speed up to the maximum rate determined by the initial setting of resistor 471. At the same time, a signal light 478 on the instrument panel will be energized to notify the operator of the change in speed so that he can manually adjust resistors 407 and 471 if desirable.

If in the above example motor 120 tends to drive selsyn 303 faster than motor 210 drives selsyn 317, differential selsyn motor 305 will cause switch arm 475 to make contact with its lower terminal 479. This will complete the circuit through the operating coil of relay 480 and open the switch arm of the relay, which will place a fixed resistor 481 in series with fixed resistor 472 and variable resistor 471 and thus cause motor 120 to slow down to its minimum speed in accordance with the setting of resistor 471. At the same time a signal light 482 will be energized similarly to the signal light 478, and if these lights are of different colors, such as red and green, the operator will immediately know whether motor 120 requires speeding up or slowing down for proper synchronism with motor 210 and can make manual adjustments accordingly. However, if the manual adjustments are not made, differential selsyn 305 will keep motors 120 and 210 in the required speed ratio by "off-on" control action.

A similar control system is provided for the simultaneous operation of motors 210 and 230. It includes a switch 485 which should be closed substantially simultaneously with switch 405 and completes an operating circuit for motor 230 through variable resistor 486 and fixed resistor 487. If motor 230 runs slower than at the proper ratio relative to motor 210, differential selsyn motor 330 will cause the associated switch arm 488 to make contact with its contact 489. This will energize the operating coil of relay 490, close the switch arm of the relay and thus short out resistor 487 and energize the associated signal light 491. Similarly, if motor 230 requires slowing down with respect to motor 210, selsyn motor 330 will cause switch arm 488 to make contact with its terminal 492, thus energizing the operating coil of relay 495 to open its switch arm and thereby place the fixed resistor 496 in series with motor 230 and at the same time energize the signal light 497.

If it is desired to operate all three of motors 120, 210 and 230 simultaneously, this can also be done. The gear transmissions are first set as described in proper position to give the desired ratio for each of motors 120 and 230 with respect to motor 210. Then switches 405, 470 and 485 are closed simultaneously, and the further operation of the machine will substantially duplicate that described for motor 210 in combination with each of motors 120 and 230. Motor 210 will act as the control and will run at the speed determined by the setting of resistor 407, and each of motors 120 and 230 will be regulated to the proper speed relative to motor 210 by the operation of differential selsyn motors 305 and 330 as just described. In this way a wide variety of irregular curves may be accurately produced in accordance with the initial determination of the proper relative speeds of the different motors.

The operation of the machine as a whole will now be described in connection with the production of the illustrative profile shown in Fig. 28, which represents a work piece 500 wherein the profile indicated by the continuous heavy line 501 is to be formed by an inside cut with a milling cutter. The work piece 500 is shown as of substantially the same surface area and shape as the working area of the work table, and the profile is located as indicated with reference to the corner O and axes OX and OY of the work table. The profile consists of a straight line KM 2 inches in length and parallel to the OY axis, a 90° arc MN of 1-inch radius tangent to KM at M and having its center within the profile, a 15° arc NS of 12-inch radius tangent to MN at N and having its center outside the profile, a spiral-like curve ST tangent to NS at S and tangent to TU at T, a straight line TU 2.227 inches in length, a 90° arc UV of 0.25 inch radius tangent to TU at U, another 90° arc WK of 0.25 inch radius tangent to KM at K, and finally an arc VW which completes the profile and is tangent to UV at V and tangent to WK at W. In Fig. 28, the radius of the milling cutter is indicated as 0.25 inch, and the dotted line 502 represents the path of relative motion between the work piece and the axis of this cutter.

In producing this profile, the machining operation may start at any point on the profile, for example the point K, which is indicated as 3 inches from O along the OY axis and 0.75 inch from O along the OX axis. The initial readings on the control panel will accordingly be at 3 inches on the small dial Y, 1 inch on the small dial X, to allow for the 0.25 inch radius of the cutter, thereby placing the axis of the cutter at the point K'. To set the machine accordingly, both the saddle and work table may be unclamped by opening switch 395 as described hereinabove, and then the saddle and work table may be moved manually as a unit until dials X read approximately 1 inch and dials Y read approximately 3 inches.

Switch 395 is then closed and switch 355 moved to "Reset." Small dial LM is set to approximately the midpoint of its travel, and dials RM are set to either 0° or 180° so that after switch 355 is moved to "Profile" the linear travel will be parallel to OX, it being assumed that dials LR are set to 0°. After the "Profile" condition is established, motor 210 is operated either forward or in reverse, as required, until dials X read exactly 1.0 inch. In similar fashion dials RM are set to either 90° or 270° and the "Profile" condition again established. Then motor 210 is operated forward or in reverse as before to position dials Y exactly to 3.0 inches. With the cutter axis precisely at the point K', the mechanism is reset so that dials RM read 270°, dials LM read 0 inches, dial LR read 0°, and switch 408 is set to FOR.

After switch 352 is closed, which causes the cutter to revolve, the cutter may then be fed downward into the workpiece 500 by clockwise rotation of threaded member 42 to the required depth, thereby placing everything in readiness to make the first cut KM. With dials RM at 270° and switch 408 at the Forward Position, the work table is set for movement away from Y as shown in Fig. 27, which is the motion required in making the cut from K to M in Fig. 28. The switch 355 is shifted to its "Profile" position and switch 405 is operated to turn on motor 210, preferably for fast operation under control of resistor 407 since the slow operation is ordinarily used only for very close tolerances. The machine is continued in operation until dials LM read 2.00 inches, which will complete the cut KM, and motor 210 is then turned off.

When the KM cut is completed, the cutter axis will be at M', and the machine must then be reset for the arc MN. This may be done by operating motor 210 in reverse until dials LM read 0.75 inch, which is the radius of arc M'N' and operating motor 120 until dials RM read 0°. Then with the magnet switch again at "Profile," switch 403 is placed in its "Right" position, since the work table must move clockwise to produce the clockwise cut MN, and motor 120 is again turned on and operated until dials RM read 270°. Since with the rotary members 100 and 101 in the initial 0° position indicated by dials RM, the plane passing through the axes of bearing holes 159 and 162 will be perpendicular to OY, the arc MN will start tangent to KM at M, as required. It is important to note that in forming the arcuate cut MN, the actual translational movement of the work table relative to the base is along an arc M"N" of 0.75 inch radius which is also clockwise as is the arc M'N' but which is displaced by 180° from arc M'N' as indicated in Fig. 28.

The cutting of the next arc NS requires operation of motor 230 and dials LR, since its radius is greater than 3.75 inches. First it is necessary to determine the angle $a$ at which guides 155 and 165 should be set, and this is done by means of Formula 4 above, as follows:

$$\sin \alpha = \frac{k}{2r} = \frac{3.75}{2(12.25)} = .1530 \quad (12)$$

$$\alpha = 8° \ 48' \quad (13)$$

Therefore during resetting, switch 413 is shifted to "Small" and switch 410 closed to operate motor 230 until dials LR indicate 8° 48'. Since arc NS is to be formed with the work table moving in clockwise direction relative to the cutter, motor 210 should be operated to reset dials LM to 0 inches. Also, motor 120 must be operated to set members 100 and 101 in such position that arc NS will be tangent to arc MN at N. The initial resetting would be to a position corresponding to 180° on dials RM plus the angle $a$, which has been determined to be 8° 48'; so that motor 120 should be operated to the "Right" until dials RM read 188° 48'. Then since the point S' has been computed to be 4.921 inches from the OY axis, it is merely necessary to operate motor 210 until dials X register 4.921 inches and the cut NS will be completed.

It is also possible to determine when the point S has been reached by means of dials LM without reference to dials X, and this requires only determination of the length C of the chord N'S' in accordance with Equations 9 to 11. Since the angle $\phi$ of arc NS is given as 15°, $$C = \frac{k \sin\left(\frac{15°}{2}\right)}{\sin \alpha} = \frac{3.75 \sin 7.5°}{\sin 8° 48'} \quad (14)$$

$$C = \frac{3.75(.13053)}{.1530} = 3.1995 \quad (15)$$

Therefore, the chord N'S' is 3.1995 inches in length, and the proper length of arc NS will be obtained as described by operating motor 210 until dials LM register 3.1995 inches. It will be noted that this method of forming arc NS avoids any necessity for determining the distance of the point S' from either of the OX and OY axes.

The next portion of the profile is a spiral curve ST tangent to arc NS at S and tangent to the line TU at T. It is produced by causing relative movement between the work table and the axis of the cutter along a course S'T' which is tangent to N'S' at S' and tangent to T'U' at T'. The preliminary calculations for setting the machine to follow this course will be more readily understood by reference to the diagram in Fig. 29. The curve S'T' is a portion of an Archimedean spiral having its origin at a point O' and which in polar coordinates would be represented by the equation $$\rho = a\theta \quad (16)$$

where $\rho$ (rho) represents the radius vector to the point A as shown in Fig. 29, $\theta$ represents the angular displacement in radians of the radius vector $\rho$ with respect to O'X' in Fig. 29, and $a$ is a constant whose value determines how closely the spiral winds about its origin point O' in Fig. 29. Positive values of $\theta$ represent counterclockwise measurement from O'X' and define a left-hand or counterclockwise spiral, and negative values of $\theta$ represent clockwise angular measurement and define clockwise spirals.

In Fig. 29, AZ represents the tangent to the spiral at point A and makes an angle $\tau$ with O'X' and $\psi$ represents the angle O'AZ between the radius vector O'A and AZ. By geometry $$\tau = \theta + \psi \quad (17)$$

Also, by the differential calculus $$\tan \psi = \frac{\rho}{\rho'} \quad (18)$$

where $$\rho' = \frac{d\rho}{d\theta} \quad (19)$$

Differentiating Equation 16 gives $$\frac{d\rho}{d\theta} = a \quad (20)$$

therefore, $$\tan \psi = \frac{\rho}{a} \quad (21)$$

but $$\theta = \frac{\rho}{a} \quad (22)$$

hence, $$\tan \psi = \theta \quad (23)$$

$$\psi = \tan^{-1} \theta \quad (24)$$

$$\tau = \theta + \tan^{-1} \theta \quad (25)$$

The given quantities in this example are that the spiral S'T' starts 1.00 inch from its point of origin O' and ends 2.750 inches from O', that it is tangent to N'S' at S', and that it is described clockwise to the point T'. It is accordingly necessary to determine the location of the point of origin O', which corresponds to the position of the axis of rotary member 100, and also to determine the positions of the tangent line T'U'. Also, the spiral is to be formed with the selsyns 303 and 317 operating at 1 to 1 ratio, which in this case has been described as meaning that 9° rotation of dial 300 will equal 0.100 inch on dial 315. Accordingly, since 9° is equal to $$\frac{\pi}{20} \text{ radians}$$

substituting in Equation 16 gives $$a\frac{\pi}{20} = .100 \quad (26)$$

$$a = \frac{2}{\pi} = \text{constant for spiral } S'T' \quad (27)$$

and $$\theta = \rho\frac{\pi}{2} \quad (28)$$

Now substituting the values of −1 inch and −2.750 inches for $\rho$ in Equation 28, the negative values being used because of the right-hand spiral, gives values for $\theta$ of $$-\frac{\pi}{2} \text{ and } -\frac{11\pi}{8} \text{ radians}$$

respectively. Since $\theta$ thus equals −90° when $\rho$ is −1 inch, $\rho$ is −270° from O'X', the negative vector being plotted in the opposite direction from a positive vector. Accordingly, the coordinate axes O'X' and O'Y' applying to curve S'T' can be located by inspection in Fig. 28, with O'Y' coinciding with O'S'.

To determine the proper setting of the rotary members for the right-hand spiral S'T' in Fig. 28, positive values of θ are applied in Equations 17 and 23 to 25. Therefore at point S', $$\tan \psi = \theta = \frac{\pi}{2} = 1.5708 \qquad (29)$$

$$\psi = 57° \ 31' \text{ (approx.)} = \text{angle } Z'S'O' \qquad (30)$$

Therefore, since angle Z'S'L is equal to 75°, $$\text{angle } O'S'L = 75° - 57° \ 31' = 17° \ 29' \qquad (31)$$

A similar set of calculations may be used to determine the angular relation between the tangent line T'U' and the OX axis of the work table. Since at point T'

$$\tan \psi = \theta = \frac{11\pi}{8} = 4.3197 \qquad (32)$$

$$\psi = 76° \ 58' \qquad (33)$$

$$\theta = 247° \ 30' \qquad (34)$$

Accordingly, by Equation 17

$$\tau = \theta + \psi = 247° \ 30' + 76° \ 58' = 324° \ 28' \qquad (35)$$

$$\text{angle } O'X'T' = 360° - 324° \ 28' = 35° \ 32' \qquad (36)$$

But since O'X' is at an angle of 17° 29' to OX, the tangent line T'U' is at an angle of 18° 3' to OX, as indicated in Fig. 28.

To apply the values as determined above to the resetting of the machine to form curve ST, the first steps are to return guides 155 and 165 to their zero position by operation of motor 230 and to operate motor 210 until dials LM register 1 inch as required by the starting distance O'S' of the spiral. Since to begin the cut ST tangent to NS at S, the line O'S' must be at an angle of 17° 29' to the OY axis, and since the actual movement of the table in forming cut ST will be similar to its motion in forming a small circle and will be in the same direction but displaced by 180° from the cut being formed, motor 120 is operated until dials RM register 252° 31' (270°−17° 29') in accordance with the chart in Fig. 27.

The final step in resetting the machine preparatory to forming the cut ST is to shift the gears at the control panel to place shafts 301 and 316 in driving relation at 1 to 1 ratio. This is done, as described, by shifting pointer 450 to its reverse D position, as shown in Fig. 24, and pulling shaft 433 out to its corresponding D position as shown in Fig. 23. Then with switch 408 at FOR. and switch 403 at "Right," switches 405 and 470 are simultaneously closed to both of motors 120 and 210. This will cause the work table to rotate clockwise about a radius which constantly increases from its initial value of 1 inch and thus to follow a spiral pattern, and during this motion differential selsyn 305 will function to control the two motors to the proper relative speeds through switch 475 as described.

With the machine adjusted as stated, the cut ST will be accurately completed when dials LM read 2.75 inches, the indicated length of the line O'T', and the machine should then be stopped. The adjacent straight line cut TU, which is tangent to ST at T has been determined to be at an angle of 18° 3' to the OX axis and to be 2.277 inches in length. Since dials LM are already at 2.75 inches, resetting may be quickly accomplished by operating motor 210 "Forward" to 2.277 inches on dials LM and operating motor 120 in "Left" rotation until dials RM register 198° 3'. Then by operating motor 210 on the "Profile" stroke in reverse until dials LM register 0 inches, the cut TU will be completed.

It will be noted that since the cutter being used has a radius of 0.25 inch and since the next cut UV is similarly about a radius of 0.25 inch, it will be made automatically by the completion of cut TU, as indicated in Fig. 28. A similar situation exists in the case of the final cut WK, which is automatically made in starting the cutter at point K. Accordingly it is now only necessary to make the arc VW to complete the profile. This arc VW is tangent at each end to arcs UV and WK, respectively, and its radius has been determined to be 1.534 inches. The machine is accordingly reset by operating motor 210 until dials LM register 1.784 inches (1.534+0.25), no resetting of the rotary members being necessary since they are already parallel to the starting radius. Then motor 120 is operated in "Left" rotation until dials RM register 270°, and the profile will be completed.

One of the outstanding features afforded by the remote control operation of the machine, as described, is that the operator can be furnished with an operating chart keyed to the approximate dials and switches so that he need only to follow the chart without further calculations and without even watching the work piece. For example, an operating chart for forming the profile shown in Fig. 28 may read as follows:

```
Start   : X—1.0    : Y—3.0    : RM—270°   : LM—0    : LR—0°
  Profile :              LM—FOR. 2.000
  Reset   : RM—0°       : LM—0.75          : LR—0°
  Profile :              RM—RIGHT 270
  Reset   : RM—188° 48' : LM—0             : LR—8° 48'
  Profile :              LM—FOR. 3.1995
  Reset   : RM—252° 31' : LM—1.00          : LR—0°
                         REV.—D    : SM
  Profile : RM—RIGHT    : LM—FOR. 2.750
  Reset   : RM—198° 3'  : LM—2.277         : LR—0°
  Profile :              LM—REV.—0
  Reset   : RM—198° 3'  : LM—1.784         : LR—0°
  Profile :              RM—LEFT—270°
```

In this key or chart, it will be seen that each group of settings indicated for "Reset" are the settings for the various dials preparatory to the subsequent "Profile" operation and the "Profile" designations include the direction and end point of the movement or movements necessary to make the cut in question.

After the foregoing operations have been completed in accordance with the above operating chart, it will be found that the profile 501 will have been accurately formed in the work piece 500 as required by the initial calculations, and without the necessity for effort on the part of the operator other than to conform with the chart. This generation and production of the profile will thus be completed without the use of a template and without any like guiding member or separately formed pattern. The only preliminary work which is necessary is the accurate calculation of the pattern and the subsequent preparation of the operating chart, which may readily be done as part of the original designing. The subsequent reproduction of the profile in the desired work piece can thus be carried out automatically and with substantially as high degree of accuracy as the initial calculations.

Production of the profile 501 as shown in Fig.

28 and described, illustrates the ability of the machine to follow a continuous profile which includes straight lines, arcs of many different radii and irregular curves, all in predetermined relation. It will also be seen that this profile is produced without unproductive movements of the working member or work piece and without releasing the work piece or withdrawing the working member, all resetting being carried out with these parts held relatively stationary. Furthermore, all the working and resetting movements of the machine are regulated by means of control members which can be grouped on a control panel remote from the actual working area, and all such movements are carried out by electrical control while at the same time indicating members on the panel show the operator at all times the precise positions of the working parts with relation to predetermined index positions.

In the machine as described, the working member is carried by the base and the work piece by table 50, but it will be readily understood that the converse arrangement may be used where desired, for example, by simply reversing the functions of table 50 and saddle 70, in which case the base plate 30 will serve as the work table and a suitable working member may be mounted on the saddle. Similarly, the saddle 70 may be utilized as the work table with the working member mounted on the base, and it will be readily apparent that various other arrangements may be made.

The invention may be readily applied to a conventional machine tool such as a milling machine to provide some of the operational features of the present invention. For example, the work table of a conventional milling machine may be substituted for the saddle 70 of the machine shown in Fig. 1, in which case the work table 50 and rotary off-set connection may still be operated as described to provide for arcuate movement about any radius. It will also be seen that hand wheels or like operating means can be substituted for motors 120, 210 and 230 without affecting the principles of operation of the invention, and such mechanical operating means may be found quite desirable in many embodiments of the invention. In such cases, mechanical clamps may readily be substituted as stated in place of the electromagnetic clamps 80 and 90.

Although the invention has been described and illustrated in Figs. 1–29 in connection with a milling machine, it will be readily seen that it is applicable to many other machine tools. For example, the machine can be utilized for engraving by employing a suitable engraving cutter in place of the milling cutter 40. Similarly, if a scribing or drafting instrument is substituted in place of the milling cutter in Figs. 1 and 2, the machine will operate equally satisfactory as a drafting or scribing machine. Such a modification of the illustrated milling machine is shown in Fig. 30, wherein a scribing instrument 510 such as a stylus or pencil is illustrated as mounted in a suitable holder 511 having a pivotal connection 512 to the underside of the bridge member 35. With this construction, a sheet 515 of paper or other writing surface may be mounted on a suitable supporting board 516 secured to the work table 50 and caused to have movement relative to the stylus 510, and the weight of the holder 511 and its pivotal connection to the bridge will insure adequate pressure on the stylus for proper drawing on the writing surface.

With this construction as shown in Fig. 30, the machine may be operated as described in connection with Fig. 28 and utilizing the same operating chart, the stylus then tracing the dotted path 502 on the writing surface carried by the work table. It will also be apparent that the invention is not limited to operation with the work piece and working member positioned within the physical boundaries of the machine base. For example, for drafting or scribing purposes the work table can be used to support and move one end of a pantograph or other linkage and thus cause operating movement of a drafting instrument at the opposite end of the linkage to reproduce an enlarged or reduced profile in accordance with a suitable operating chart.

Fig. 31 is a view similar to Fig. 30 illustrating the application of the machine shown in Fig. 1 to grinding. In Fig. 31, an electric motor 520 is shown as mounted on the bridge 35 and provided on its shaft 521 with a grinding wheel 522. A work piece 525 is also shown as mounted on the work table 50, and it will be seen that the work table can be operated as described to cause this work piece to follow any desired course of movement relative to the grinding wheel 522 and thus to carry out a grinding operation.

Another form of grinding machine embodying the invention is illustrated in Fig. 32, in which the basic construction of the machine is substantially the same as described in connection with Figs. 1–29. Fig. 32 shows the work table 50 as having mounted thereon a compound tool rest 530, which may be of conventional construction and includes a tool holder 531, the bridge 532 of the machine, which corresponds to bridge 35, being shown as extending only a part of the way across the work table to provide room for tool rest 530. An electric motor 533 is supported in the tool clamp 531 and has a grinding wheel 535 on its drive spindle. The base of the machine includes an upright portion 536 having a horizontal shaft mounted therein and driven by means such as pulley 537 and belt 538. This shaft also carries a face plate 539 to which a work piece 540 may be secured as by means of suitable clamps 541, this work piece being shown as of bowl shape.

It will be seen that this construction of grinder provides for readily generating three-dimensional curves or shapes. The work table can be moved in accordance with any desired curve pattern, and the work piece can also be caused to rotate with the face plate 539 during the grinding operation. Thus while the grinding wheel is grinding, it can be caused to move at any desired angle relative to the axis of rotation of the work piece or along a curved course corresponding to the projected curve of the surface desired on the work piece, and such movement of the grinder may be controlled by the control panel, as described, to generate or reproduce curved surfaces without a template or other guiding member.

Fig. 33 shows an embodiment of the invention similar to that illustrated in Fig. 32, and with the corresponding parts similarly numbered. In Fig. 33, however, the tool clamp 531 is shown as mounting a tool or cutter 545 of the type used in lathes or shapers. This machine may accordingly be utilized in a manner similar to that described in connection with Fig. 32 to generate curved or other three-dimensional surfaces, such use being illustrated in Fig. 33 by the bowl-shaped work piece 540. Thus the work piece can be caused to rotate through pulley 537 and belt 538 at a proper speed for cutting, and the work table can be driven, as described, along any desired curved or straight course to develop a correspondingly curved surface on the work piece, this operation thus combining some of the characteristics of both a lathe and a milling machine in addition to the remote control features of the invention and the elimination of templates.

Fig. 34 illustrates a shaper constructed in accordance with the invention and adapted to the generation or reproduction of curved surfaces on a work piece. In Fig. 34, the general structure of the machine is similar to that shown in Fig. 1, but a shaper mechanism is mounted on the bridge 35 in place of the milling cutter and its supporting structure. As shown, this mechanism includes a shaping cutter 550 mounted in a slide member 551 which is supported for vertical reciprocal movement in guides 552. A motor 553 is mounted on bridge 35, and on its drive spindle is a disk or wheel 554. An arm or link 555 is pivoted at one end to the slide 551 and at its other end to a point on disk 554 off-set from its center of rotation. This construction thus provides a crank connection between the motor spindle and slide 551, such that as motor 553 rotates disk 554, slide 551 will reciprocate and cause similar movement of cutter 550.

In utilizing this shaper construction, a work piece can be secured to the work table 50 and caused to move along any desired curved, straight or angular path relative to the cutter 550. Such a work piece 556 is shown in Fig. 34 and has both convex and concave surfaces curved about different radii. It will be seen that such curved surfaces may be reproduced or generated very readily and with great accuracy by control over the directions of movement of the work table in accordance with an appropriate operating chart as described in connection with the profile shown in Fig. 28.

As pointed out in connection with Fig. 30, the invention is particularly adapted for operation with a linkage, to drive one or more working members or work pieces spaced from the base of the machine, and Figs. 35 and 36 illustrate such an embodiment of the invention as applied to a flame-cutting machine. In Figs. 35 and 36, the structure shown fragmentarily at the right may be substantially as described in connection with Figs. 1–29. The flame-cutting attachment includes a supporting base 560 to which two links 561 are pivotally secured at one end, their other ends being pivoted to a connecting bar 562. Two other links 563 are similarly pivoted at one end to bar 562 and at their other ends to a bar 565 which supports a plurality of flame-cutters 566, there being eight such cutters shown in Figs. 35 and 36 as secured in spaced relation along bar 565. The tubes indicated generally at 567 serve to convey the necessary gases, such as oxygen, acetylene or hydrogen, to the tip of each cutter 566, and a control panel 568 may also be provided for separate control of each cutter.

The work piece in Figs. 35 and 36 is shown as sheet 570 of metal supported below the cutters 566, and this sheet may be cut into multiple identical sections by operation of the machine of the invention. To accomplish this result, one end of bar 565 is clamped to the work table 50 as indicated at 571. Since the linkage shown in Fig. 35 maintains bar 565 parallel with base 560 at all times, work table 50 can be driven along any desired course through the control panel 33, and each cutter 566 on bar 565 will simultaneously be caused to follow a similar course and will reproduce this course on the work piece 570 with the same accuracy as if it were mounted on the work table itself. Furthermore, by the use of means such as a pantograph linkage in place of the unitary-ratio linkage shown in Fig. 35, the motion of the work table may readily be magnified or reduced in transmittal to the cutters. It will also be seen that a similar construction may be applied to other multiple-element machines, for example by the substitution for the flame-cutting elements 566 in Figs. 35 and 36 of other working members such as welding torches, scribing or engraving cutters, stitchers, or like devices.

Figs. 37–43 illustrate a lathe provided with a lathe carriage embodying a form of the present invention. In Figs. 37–43, the lathe carriage is designated generally by the reference character 600, and it is shown as mounted for sliding movement on the lathe bed 601, the bed being provided with V-tracks 602 (Fig. 39) which support the carriage and engage in complementary V-grooves 603 in the under side of the carriage. The carriage 600 is shown as provided with the conventional controls for its longitudinal movement along the bed, including the lead screw 605 for thread-chasing and the rack 606 which cooperates with suitable gears, not shown, adapted to be driven through shaft 607 by the conventional motor, not shown. The shift lever 608 controls the direction of movement of the carriage, and a lever 609 controls the movement of the carriage during thread-chasing. The hand wheel 610 is used for manual movement of the carriage instead of the motor-controlled movement, and the hand knob 611 operates suitable clutch means for shifting between hand and motor operation of the carriage. These controls are conventional equipment on many lathes, and detailed description thereof is accordingly unnecessary.

Figs. 37–39 show a work piece 615 mounted in the lathe and comprising a piece of cylindrical stock, the work operation being indicated as the formation in the work piece of a semi-circular peripheral groove 616. A cutter 617 is shown as carried by a suitable holder 618 which is in turn mounted in the tool post 619 of a conventional compound tool rest 620. As is well understood, the compound tool rest provides for sliding movement of its upper portion 621 on the intermediate portion 622, this movement being controlled by a suitable lead screw and hand wheel 623. The portion 622 of the tool rest is in turn rotatably mounted in the portion 624, and it may be locked in any desired angular position by the set screw 625 as shown in Fig. 39. It will be understood that in the operation of the lathe, all adjustments of these various parts of the tool rest and tool holder are made prior to beginning work on the work piece and remain fixed during cutting operations.

The tool rest 620 is mounted for sliding movement transversely of the lathe on a slide 630 which is in turn mounted for similar sliding movement an a supplemental carriage 631, the slide 630 being provided with dovetailed tracks 632 and 633 which engage in complementary slots in the part 624 of the tool rest and in the supplemental carriage 631, these slots being shown as provided with suitable gibs 634. Control of the relative movement between the slide 630 and the compound rest is provided by a lead screw 635 journaled in the slide 630 and provided with a suitable handle 636, shown as located at the front of the carriage. The lead screw 635 is threaded in a boss 637 extending downwardly from the portion 624 of the compound rest, and the handle of the lead screw is provided with a suitable scale 638 for indicating the amount of lateral movement of the compound rest relative to the slide 630.

The supplemental carriage 631 is mounted for sliding movement on the main carriage 600 and in the same direction as the sliding movement of the main carriage relative to the lathe base, the main carriage having dovetailed track members 640 (Fig. 39) which engage complementary receiving grooves 641 in the under surface of the supplemental carriage and provided with gibs 642. It will accordingly be seen that this arrangement provides for free translational movement of the tool rest 620 and the working member carried thereby relative to the main carriage 600, the slide 630 providing for movement of the compound rest transversely of the lathe bed and the supplemental carriage 631 providing for movement of the compound rest longitudinally of the lathe bed. The slide 630 is thus analogous in function to the work table 50 of the milling machine shown in Fig. 1, and the invention accordingly provides means for controlling the translational movement of this slide 630 and for causing the slide to move relative to the main carriage 600 along any desired arcuate course of radius up to and including infinity.

The operating mechanism for the slide and compound rest is shown in detail in Figs. 39–43. There is a rotary off-set connection between the slide 630 and the main carriage 600 which includes a rotary member 650, corresponding to the rotary member 100 in the milling machine, and a second rotary member 651, corresponding with the rotary member 101 of the milling machine. The main carriage 600 includes a portion 655 formed to provide a cylindrical housing, and the rotary member 650 is secured to the top of this housing for rotation relative thereto. As shown in Fig. 42, the upper portion of the housing 655 is formed with an outwardly projecting flange 656, and the rotary member 650 rests on the upper surface of this flange and includes a downwardly projecting flange portion 657 which overlaps the flange 656 and is secured by bolts 658 to a two-piece ring 659 which engages in the groove formed by the flange 656 and the adjacent portion of the housing 655, this construction being generally similar to the rotatable connection between the work table 50 and rotary member 101 in the milling machine.

The connection between the rotary members 650 and 651 is similar to the connection between the corresponding members 100 and 101 of the milling machine, and is constructed to provide for relative lateral movement between members 650 and 651 along a straight or curved course. As shown in Figs. 39 and 42, this connection includes a connector member 660 having a cylindrical lower portion 661 journaled coaxially in the rotary member 650 and secured in place by a lock nut 662. The upper portion of connector member 660 is received in sliding relation within a channeled track 665 which extends downwardly from a plate member 666 corresponding to member 166 of the milling machine, the member 651 being cut away at 668, as shown in Fig. 41, to receive the guide 665. As shown in Figs. 39 and 42, the plate 666 is rotatably connected with the rotary member 651 by a two-piece bearing ring 669 bolted to member 651 and overlapping the rim of plate 666, this connection being similar to the corresponding connection between members 101 and 166 shown in Figs. 4–8.

A connector member 670 similar to the connector member 660 includes a cylindrical lower portion 671 journaled in the rotary member 650 at a position laterally offset from the rotational axis of member 650 relative to the carriage 600, the lower end of this cylindrical portion 671 being secured in place by a lock nut 672. The upper portion of connector member 670 is received in sliding relation within a channeled track 675 which extends downwardly from the member 651, as best seen in Fig. 42. It will accordingly be seen that this arrangement of guides and connector members is generally much the same as the corresponding arrangement of guides and connector members described above in connection with the milling machine of Fig. 1, and the invention also provides means for causing relative lateral movement between the guides and connector members and means for changing the angular relation between the guides to provide for varying the course of relative movement between the members 650 and 651 from a straight line to an arc of predetermined minimum radius.

The relative movement between the guides and connector members is provided for, and controlled by a lead screw 680 mounted, as shown in Figs. 41 and 42, at the end of the channeled guide 665 carried by plate 666. This lead screw is threaded within a sleeve 682 journaled within the upper portion of the connector member 660. This sleeve 682 forms the hub of a bevel gear 683 which engages a similar bevel gear 684 keyed or otherwise secured to the upper end of a shaft 685 journaled in cylindrical portion 661 of connector member 660. The drive mechanism for shaft 685 will be described hereinafter, and it will accordingly be seen that rotation of this shaft will act through gears 684 and 683 to rotate the sleeve 682 relative to the lead screw 680, and since this sleeve is held against axial movement relative to the connector member 660, this will cause relative movement between the connector member and its guide 665, thus causing the rotary member 651 to move laterally relative to the rotary member 650. Also, plate 666 is provided on its upper surface with an upwardly extending cylindrical stud 686 coaxial therewith and which engages in a cylindrical boss 687 extending downwardly from the slide 630, this connection providing for translating movement of the plate 666 and rotary member 651 to the slide 630 and compound rest 620, the axis 688 of the stud 686 and boss 687 being in this case the translational axis corresponding to axis 180 of the milling machine.

The course of relative lateral movement between members 651 and 650 is determined, as in the case of the milling machine, by the angular relation between guides 665 and 675. When these guides are in their position of relative collinearity, this movement will be in a straight line, and when the guides are angularly disposed relative to each other, this movement will follow an arcuate course the radius of which depends upon the angle $a$ as explained hereinabove in connection with Figs. 5 and 20. Relative angular adjustment of the guides is controlled as shown in Figs. 37, 39 and 41. The plate 666 includes a downwardly extending arcuate boss portion 690 which extends into an arcuate groove 691 in member 651 and is provided on its outer surface with gear teeth 692. These gear teeth mesh with a worm wheel 693 carried by a shaft 694 journaled in member 651 as shown in Fig. 41.

It will accordingly be seen that by means of this mechanism, rotation of shaft 694 will cause relative rotational movement of the rotary member 651 and the plate 666, and since one of the guide members 655 and 675 is carried by each of these members, this will cause angular movement between the guides. This angular movement is shown as limited to 30° for the reasons explained in connection with Equations 7 and 8 hereinabove, and the outer end of shaft 694 is provided with a dial 695 cooperating with a suitable index mark on the member 651 to indicate the amount of rotation of shaft 694, the shaft being shown as provided also with a squared outer end 696 to receive a suitable adjusting wrench. As shown in Fig. 37, the upper surface of the plate 666 is also provided with a graduated scale 697 cooperating with a suitable index mark on the adjacent surface of the bearing ring 669 to indicate the value of the angle $a$ in each position of the plate 666 relative to rotary member 651.

It will now be seen that rotation of shaft 685 will produce linear movement of the slide 630 and tool rest relative to the main carriage 600, and that rotation of rotary member 650 will cause rotational movement of the slide 630 and tool rest relative to carriage 600, and Figs. 37–43 show means for selectively causing and controlling each of these movements. The drive mechanism includes a planetary gearing, shown in detail in Fig. 42, and two shafts extending to the front of the carriage 600 and provided with suitable handles for ready manual operation.

The rotary member 650 is formed with an extending circular boss 700 provided on its periphery with worm teeth 701 meshing with a worm wheel 702 secured to a shaft 703 journaled in a boss 704 integrally formed with the wall of the housing portion 655 of main carriage 600. The outer end of shaft 703 carries a gear 705 (Fig. 40) meshing with another gear 706 carried by a shaft 707, which in turn extends out through the front of carriage 600 to a handle 710. The handle 710 carries a dial 711 suitably graduated to indicate in fractions of a degree the amount of corresponding rotation of rotary member 650, and the shaft 707 is also connected through suitable gearing, not shown, to a dial 715 mounted on the front of carriage 600. These dials 711 and 715 correspond with the dials 309 and 310 in Fig. 22, and they are accordingly shown as provided with a similar legend "RM."

It will thus be seen that rotation of shaft 707 by means of handle 710 will be transmitted through the gears as described to the worm 702 and worm teeth 701 to cause corresponding rotation of the boss 700 and rotary member 650. The dial 715 is accordingly shown as graduated to indicate 360° of rotation, and the various gears are so chosen that one complete revolution of dial 715 will represent one complete revolution of the rotary member 650, similarly to the corresponding arrangement in the milling machine. It will also be seen that rotation of member 650 in this fashion will produce corresponding rotational movement of the rotary member 651 and through it the slide 630 and tool rest 620, the radius of this rotational movement being determined by the lateral setting of member 651 relative to member 650 and varying from zero, when members 651 and 650 are coaxial, to a value determined by the effective length of the lead screw 680, which in the lathe is shown as 3 inches instead of the 3.75 inches in the milling machine. A convenient zero position for dial 715 may be the position of the parts wherein the plane connecting the pivotal axes of connector members 660 and 670 is perpendicular to the axis of the lathe and wherein the connector member 670 is nearest the front of carriage 600, this being the position wherein cutter 617 is farthest from the work piece.

It should be noted that since the shaft 685 which operates the lead screw 680 is mounted coaxially with the rotary member 650, if this shaft remains stationary during rotation of member 650, the bevel gear 683 would be caused to move about the bevel gear 684 and thus be caused to rotate, which would result in causing lateral movement of the member 651 relative to member 650 simultaneously with the rotation of member 650. The invention accordingly provides a planetary gearing so constructed and arranged that it both affords a drive for the lead screw independently of the drive for rotational movement of member 650 and also causes shaft 685 to rotate during rotational movement of member 650 in the same direction and at the same rate, thus preventing relative lateral movement of the members 650 and 651 during rotation of member 650.

As shown in Fig. 42, a web 720 is mounted for free rotational movement on shaft 685 and is held in position by the collar 721 of a sun gear 722 keyed to shaft 685. The web 720 carries two pins or shafts 723 having rotatably mounted at their opposite ends the planet gears 724 and 725. The planet gears 724 mesh with a sun gear 726 integral with or otherwise secured to the boss 700 on rotary member 650, and they also mesh with a ring gear 727 which is held stationary by an extending arm 728 bolted or otherwise secured to a boss 729 integrally formed with the wall of housing 655 as shown in Fig. 39. The planet gears 725 mesh with sun gear 722 and with a ring gear 730 integrally formed on a casting 731, which includes a shaft 732 journaled in the web 733 which forms the bottom of housing 655. This casting 731 also has worm teeth 735 formed on its periphery, as shown in Figs. 39, 42 and 43, which mesh with a worm 736 carried by a shaft 737 journaled in a boss 738 which is integrally formed with the wall of housing 655. As shown in Figs. 39 and 40, this shaft 737 is connected through gears 740, 741 and 742 with a shaft 743 similar to shaft 703 and which extends out through the front of carriage 600 to a handle 745 shown as provided with a suitable dial 746 corresponding with dial 711 on handle 710. Shaft 743 is also connected through gears 747, 748 and 749 with a dial 750 graduated, as shown, in terms of the effective length of lead screw 680 and provided with a corresponding legend "LM."

With this construction, when it is desired to cause relative lateral movement between rotary members 650 and 651 without rotation of member 650, handle 710 and shaft 707 remain stationary, and handle 745 is turned to rotate shafts 743 and 737. This will cause corresponding rotation of the worm 736 and the casting 731 and ring gear 730. At the same time, the sun gear 726 will remain stationary with the rotary member 650, and since the ring gear 727 is held stationary, as described, by the arm 728, the planet gear 724 and the web 720 will also remain stationary. Therefore, when the casting 731 and ring gear 730 are rotated relative to the main carriage, this rotation will be transmitted through the planet gear 725 to the sun gear 722 and thus cause corresponding rotation of shaft 685. As already described, this rotation of shaft 685 will be transmitted through gears 684 and 683 to the sleeve 682, and will thus cause relative lateral movement between the member 651 and the lead screw 680, and in turn between members 650 and 651. The extent of this movement will depend upon the amount of rotation of the handle 745, as can be readily determined by the dials 746 and 750.

If it is desired to cause rotation of the rotary member 650 relative to carriage 600 without lateral movement between members 650 and 651, handle 745 remains stationary and handle 710 is operated to rotate shafts 707 and 703. This rotation will be transmitted directly through worm 702 and worm wheel teeth 701 to rotate the boss 700 and member 650. During this rotary motion, as has been pointed out, it is desirable to cause the drive shaft 685 for the lead screw to rotate at the same rate and in the same direction as the member 650, and this result is provided by the planetary gearing.

The sun gear 726 rotates with the rotary member 650, and since the ring gear 727 is held stationary as described, this will cause rotation of the planet gears 724 and progression of the web 720, this movement of the web being in the same direction as the rotary member 650 but at a slower speed. The web 720 will carry with it the planet gears 725, and since the ring gear 730 is held stationary with casting 731, this movement of the planet gears 725 will be transmitted through the sun gear 722 to the shaft 685. With the various gears properly chosen and combined relative to their respective pitch diameters, this rotation of the sun gear 722 and shaft 685 will be in the same direction and at the same speed as the rotary member 650, thus holding the bevel gear 685 stationary relative to the rotary member 650 and accordingly preventing relative lateral movement between member 650 and member 651. This result may be obtained, for example, with all of the planet gears 724 and 725 of the same pitch diameter, and with ring gears 727 and 730 and sun gears 722 and 726 also of the same pitch diameters, respectively, and other combinations of gears can also be arranged to produce the same results. It should also be noted that the separate drives through shafts 703 and 737 should be self-locking, as by friction, to provide for the above operational characteristics.

In operation, the lathe construction shown in Figs. 37-43 provides for controlled translational movement of the tool rest 620, and hence of the cutter 617, relative to the work piece 615 along any desired arcuate course of radius up to and including infinity. For arcs of comparatively small radius, up to a maximum equal to the effective length of the lead screw 680, this arcuate movement is controlled by rotation of the handle 710, the device having first been set for the desired radius by operation of handle 745. As will be apparent from the corresponding operation of the milling machine as described, the radius of such comparatively short arcs is determined by the linear distance between the axis 689 of the stud 686 and the axis of the shaft 685, this radius increasing from a minimum of zero when the rotary members 650 and 651 are in their position of relative concentricity.

Accordingly, in order to form the arcuate cut 616 with a radius of, for example, 2 inches, a suitable tool 617, preferably having a circular point such as one with a radius of .125 inch, is mounted substantially as shown in Fig. 37. It is necessary that the tool 617 cut only on the circular cutting edge if a true circular cut is to be made in the work piece. Now, handle 710 may be rotated to bring dial 715 to the zero position and handle 745 rotated to provide an off-set between the centers of members 650 and 651 of .125 inch, or the cutter radius. The handles 623 and 636 may then be operated to bring the tool rest 620 into a position such that the cutter 617 will be properly centered relative to the work piece, and so that the tool 617 just touches the, as yet, uncut work piece 615.

The lathe may then be started and the handle 710 rotated to make the first cut, which in this case will be a cut of 0.25 inch radius. Handle 710 is then operated to return to the approximate zero position and handle 745 operated to bring dial 750 to read say 0.25 inch for the next cut. Handle 710 is again rotated to make a second cut of .375 inch radius. This process is substantially repeated until dial 750 reads 1.875 inches, whereupon handle 710 is operated to make the final cut, corresponding to a cut of 2 inch radius in the work piece 615. The various cuts can thus be arranged so that the final cut will be very light so that a smooth cut will be obtained as has been a conventional method of operation in the past for straight line cuts.

Arcs of longer radius, i. e. greater than the effective length of the lead screw 680, are generated by first adjusting the guides 665 and 675 angularly as has been described in connection with the milling machine. Thereafter, the movement of the cutter during cutting operation is produced and controlled by rotation of the handle 745, and the compound rest and cutter will follow the proper arcuate movement in the same manner as described in connection with the milling machine for generating arcs of long radius. Control over the position of such arcuate cuts relative to the axis of the work piece, i. e. from the standpoint of the angular relationship or tangency of the arc to the work piece axis, is provided in the same manner as described for the milling machine, particularly in connection with Fig. 21.

It should be noted that the application of the present invention to a lathe, as described and shown in Figs. 37-43 does not interfere with the conventional lathe operation but instead provides additional operational features while retaining those previously present. Thus the lathe can be operated as usual through the controls 605—611 without requiring or affecting the operation of the handles 710 and 745 or their associated parts. The invention is accordingly particularly adapted for incorporation in a lathe at comparatively low cost, and it is accordingly possible and practical to build the structural features of the invention into a carriage which can be mounted on the bed of a conventional lathe to provide the operational advantages of the invention without alteration in the construction of the lathe bed and drive.

It should also be noted that a planetary gearing arrangement constructed and arranged as shown in Figs. 37-43 may readily be incorporated in the other machines described above, to provide for mechanical operation thereof, for example by substituting the housing 655 in place of the saddle 70 in the above milling machine. In such a construction, the mechanical controls for the various operating shafts may readily be collected to a central operating position corresponding to the control panel 33 as shown, for example by means such as splined extensible shafts and universal joints to provide for relative movement between the saddle and control panel, or the control panel may be carried by the saddle in a manner corresponding to the control panel on the main carriage 600 of the lathe.

Figs. 44-47 illustrate a milling machine of the rotary head type constructed to embody the present invention, wherein the cutting head indicated generally by the reference character 800 is mounted for movement relative to the work table 801 along an arcuate course of any radius from zero to infinity. Referring to Fig. 44, the frame of the machine is shown as of generally conventional construction and includes a base 802 and column 803 extending upwardly from the base to a portion 805 overhanging the work table 801. This work table is mounted for sliding movement laterally of the machine on a cross slide or saddle 806 which is in turn mounted for sliding movement back and forth on the knee 807, and the latter is mounted for vertical adjustment relative to the base by means of the jack mechanism or elevating screw indicated at 808. The hand wheels 810 and 811 operate lead screws for the lateral movement and back and forth or longitudinal movement of the work table, respectively, and the hand wheel 812 operates the jack mechanism for vertical adjustment of the knee and work table. Since such constructions are conventional, no further detailed description thereof is necessary.

Referring to Figs. 45-47, the cutting head 800 is mounted in the overhanging portion 805 of the frame, and it is generally similar to the corresponding mechanism described in connection with the lathe shown in Figs. 37-43. A generally cylindrical casing 820 is secured to frame portion 805 as by means of bolts 821. A rotary member 825, which corresponds with rotary member 650 in the lathe, is rotatably connected with the casing 820. As shown in Fig. 45, casing 820 includes an outwardly projecting flange 826, and the rotary member 825 includes an upwardly projecting peripheral flange 827 which overlaps the flange 826 and is secured, as by bolts 828, to a two-piece ring 829 which engages in the groove formed by the flange 826 and the adjacent portion of casing 820, this construction being generally similar to the rotatable connection between the members 650 and 655 of the lathe. The member 825 also includes an upwardly projecting boss portion having a worm gear 830 formed thereon and adapted to mesh with a worm 831 secured to a shaft 832 journaled in a boss 833 which is integrally formed with casing 820. This shaft extends outwardly through the casing 820 to a hand wheel 835 or similar adjusting member providing for rotation of member 825 relative to casing 820 in response to rotation of hand wheel 835. An appropriately graduated dial 836 is accordingly provided adjacent hand wheel 835, as shown in Fig. 45, and the outer surface of ring 829 is shown as graduated to indicate the position of member 825 relative to a suitable zero index position.

The cutting mechanism of this milling machine is carried by a housing 840, and is shown as including a motor 841 mounted in this housing and with its drive spindle extending through the lower part of the housing to a suitable chuck 842 in which a milling cutter 845 can be mounted as shown. The switch or other operating controls for this motor 841 are indicated at 846 as mounted on one side of housing 840, and the motor may be supplied with electric current as indicated by the wires 847 and slip ring device 848 for making an electrical swivel connection.

The housing 840 which supports the cutting mechanism is bolted or otherwise secured to a plate member 850, which corresponds with the member 666 of the lathe and is in turn connected with a member 851 which corresponds with the member 651 of the lathe. As shown in Fig. 45, the member 850 fits within a downwardly extending flange 852 on member 851, and these two members are secured in rotatable connection by a bearing ring 853 bolted to member 851. These two members 850 and 851 are in turn connected with rotary member 825 by mechanism similar to that connecting members 100 and 101 of the milling machine shown in Fig. 1 and the members 650 and 651 of the lathe.

The member 850 includes an upwardly extending channeled guide portion 855, and member 851 is formed to provide a similar channeled guide portion 856, member 851 being cut out at 858 to receive the guide portion 855 on member 850 as shown most clearly in Figs. 45 and 47. In addition, member 850 includes an upwardly extending arcuate boss portion 860 which extends into a corresponding arcuate slot 861 in member 851 and is provided on its outer surface with worm teeth 862. These teeth mesh with a worm 863 carried by a shaft 864 journaled in member 851 as shown in Fig. 47 and extending out to a hand wheel 865. It will be seen that this construction provides for rotational adjustment between members 850 and 851 to vary the angle between the guides 855 and 856 as in the similar constructions shown in connection with the milling machine of Fig. 1 and the lathe, the range of this adjustment being shown as 30° for the reasons explained in connection with the milling machine of Fig. 1. Accordingly, a suitable scale 866 and index marker 867 for indicating this angle $a$ is provided on the outer surface of member 851 as shown in Fig. 44, and a cooperating scale 868 for finer measurements is provided on shaft 864 as shown in Figs. 44 and 47.

Two connector members 870 and 871 provide the connection between members 825 and 851, each of these connector members being pivotally mounted in member 825 and including a portion slidably received in guides 855 and 856 respectively. As shown in Fig. 46, these connector members and guides have dovetailed engaging portions providing for suspending members 850 and 851 and the parts carried thereby from the member 825 while still permitting relative lateral movement. The connector member 871 has its pivotal axis coinciding with that of member 825, and the cylindrical portion 872 of member 871 is hollow, as shown in Fig. 45, to receive the wires 847 to the spindle motor. The connector 870 includes a downwardly extending boss portion 874 which is in threaded engagement with the lead screw 875 for initiating and controlling relative lateral movement between member 825 and members 850 and 851.

Referring to Fig. 45, the lead screw 875 is journaled in a boss 876 which extends upwardly from member 850. The lead screw extends outwardly beyond this boss to a hand wheel 877 or similar manual control member, a dial 879 being carried by this portion of the lead screw for measuring its rotational movement. The large dial 880 corresponds to dial 750 on the lathe and indicates the extent of lateral movement between member 825 and members 850 and 851 in response to the rotation of the lead screw. As shown in Fig. 45, this dial 880 is mounted on a downwardly extending boss portion 881 on member 850 and is connected through the gearing 882 with the gear 884 carried by lead screw 875.

It will accordingly be seen that the construction shown in Figs. 44–47 provides for movement of the axis of the cutter 845 with respect to the work table 801 along an arc of any desired radius up to and including infinity, and without movement of the work table relative to the base. Such movement of the cutter along a straight line course is produced by operating the lead screw 875 while the two guides 855 and 856 are relatively in line as shown in Fig. 47. Movement of the cutter along an arc of short radius, i. e. up to the effective length of the lead screw, is produced by operating the hand wheel 835 after setting the radius of the arc by means of the lead screw, this operation being similar to the corresponding operation of the lathe or of the milling machine shown in Fig. 1. Movement of the cutter along an arc of large radius, greater than the effective length of the lead screw, is produced by first setting the guides 855 and 856 for the proper angle $a$ as explained in connection with Equation 4 and then operating the lead screw in the same manner as described with the lathe or other machines described above. The position of all such arcs relative to the work piece, i. e. from the standpoint of the angular relationship or tangency of the arc relative to any point and line on the work piece, is controlled in the same manner as described above for the milling machine of Fig. 1.

Figs. 48 and 49 illustrate somewhat diagrammatically the application of a hydraulic operating system to the machines above described, these views corresponding to Figs. 4 and 5. In these views, the frame of the machine, including the base, the saddle and the work table, are of the same construction as in Figs. 1–4, but the operating system for the rotary offset connection is hydraulic, and certain of the component parts of this mechanism are accordingly of modified construction.

Referring to Fig. 48, a reservoir 900 supplies hydraulic fluid to a pump 901, and a pressure relief valve 902 maintains substantially constant pressure in the discharge line 905 of the pump, this valve having a bypass line 904 to the main return line 906 to the reservoir. A branch line 909 leads from line 905 to a valve body 910 having a central bore 911 in which a plunger 912 is slidably mounted. This plunger includes two axially spaced valve portions 913 and 914, and valve 910 is provided with a spring detent 915 adapted to engage in either of three notches 916, 917 and 918 in plunger 912 to establish three positions for the valve. These positions are "Profile" when the detent is in the innermost notch 918, "Reset" when the detent is in the outermost notch 916 and an intermediate position when the detent is in the intermediate notch 917.

A line 920 for fluid leads from the bore 911 of valve 910 to a cylinder chamber 921 in the housing 922 which corresponds to housing 99 in Fig. 4 and has an internal bore 923. A piston portion 924 of a hydraulic clamp 925 is reciprocable in this cylinder to operate clamp 925, the clamp being provided with a gripping face 926 for engagement with base 30. A rod 927 extends from piston 924 into the internal bore 923 of housing 922 and has a collar 928 at its upper end. A spring 929 is positioned between this collar and the inner end of bore 923 and acts to raise clamp 925 out of gripping engagement with base 30 when the fluid pressure to cylinder 921 is cut off.

A line 930 for fluid leads from the bore 911 of valve 910 to a similar hydraulic clamp mechanism, not shown, effective when pressure is applied thereto to clamp the work table and bridge together, in a manner corresponding to the operation of electromagnet 80 in Figs. 1–4. When plunger 912 is in its "Profile" position, it will be seen that its valve portion 914 will have moved outwardly of line 930, thus cutting off the supply of pressure fluid thereto while at the same time connecting this line 930 to a return line 932 to the main return line 906. At the same time, valve portion 913 of the plunger will still be between line 920 and its return line 931. Thus the lower clamp 925 will be engaged but the upper clamp for the work table will be released, this being the proper condition for profiling operation and corresponding to the settings of magnets 80 and 90 in Fig. 4.

When plunger 912 is shifted to its "Reset" position, the situation is reversed. Valve portion 913 of the plunger moves inwardly of line 920, cutting it off from the pressure fluid and connecting with its return line 931 to cause release of clamp 925. At the same time, valve portion 914 will remain between line 930 and its return line 932, thus maintaining pressure on the clamp for the work table. It will also be noted that when plunger 912 is in its intermediate position, both of lines 920 and 930 are connected with main pressure line 905, thus maintaining both clamps in gripping position to prevent creeping, as described for the milling machine shown in Figs. 1–4.

The rotary offset connection between the saddle 70 and the work table is generally similar to that shown in Figs. 4–8, and it includes rotary members 950 and 951 which correspond to members 100 and 101. A connector member 952 is journaled in member 950 and has sliding engagement in the guide portion 953 of member 951. A similar connector member 954 is also journaled in member 950 and has sliding engagement in the guide portion 955 of member 956, which corresponds to member 166 in Figs. 4–8 and is rotatably connected with member 951 to provide for relative angular adjustment of guides 953 and 955 to vary the angle $a$ as shown in Fig. 49. The connection between members 951 and 956 and the work table is shown as of the same construction as in Figs. 4–8, and the connecting parts are similarly numbered in Fig. 48.

The rotary member 950 includes a shaft portion 960 which extends downwardly and is rotatably positioned in the bore 923 of housing 922. The inner surface of this bore is provided with a plurality of separate, spaced grooves 961, each of which connects as shown in Fig. 48 with a line for hydraulic fluid. The outer surface of shaft 960 is provided with similarly spaced, peripheral grooves 962 each adapted to register with one of grooves 961, these grooves thus providing collector means comparable to the electric collector rings described and shown in Figs. 10–12. Shaft 960 is also provided with a plurality of longitudinal bores, two being shown in Fig. 48, each connected at one end with one of grooves 962 and at its other end with a line to one of the cylinders carried by rotary member 951, as will be described. The grooves 961 and 962 thus provide constant open connections between each line leading into housing 922 and its complementary line leading from shaft 960 irrespective of relative rotation between shaft 960 and housing 922, this arrangement being comparable to the electrical collecting ring arrangement as described and shown in Figs. 4 and 10–12. In place of longitudinal bores in shaft 960, the shaft may be formed hollow, similarly to shaft 125 in Fig. 4, and a plurality of hydraulic tubes may be mounted therein similarly to the wires in Fig. 4 and each connecting with one of grooves 962.

The hydraulic controls for varying the angular relation of the guides 953 and 955 include a branch line 969 leading from main fluid line 905 to a valve body 970 similar to valve 910 and including an internal bore 971 and a plunger 972 having two valve portions 973 and 974. A spring detent 975 is mounted in valve body 970 for selective engagement in either of notches 976, 977, and 978 of plunger 972. A line 979 leads from the valve bore 971 to a regulating valve 980, which includes an adjustable needle valve 981 and a ball check valve 982 effective to permit free return of hydraulic fluid to line 979.

A line 985 leads from valve 980 to housing 922 and connects with one of the grooves 961 in bore 923. This groove 961 is in open communication with its complementary groove 962 on shaft 960, as described, and a longitudinal bore, not shown, in shaft 960 provides communication from this groove 962 to a line 986 leading to one end of a hydraulic motor comprising a cylinder 988 carried by rotary member 951 as shown in Fig. 49. A piston 990 is reciprocable in cylinder 988 and a line 991 leads from the end of cylinder 988 opposite line 985 to shaft 960 and connects through another pair of complementary grooves 961 and 962 with a line 992, which leads to a regulating valve 994 similar to valve 980. A line 995 leads from valve 994 to the valve bore 971 as shown in Fig. 48, and two branch return lines 996 and 997 lead from opposite ends of valve bore 971 back to the main return line 906.

Referring particularly to Fig. 49, it will be seen that the rod 999 for piston 990 extends outwardly from cylinder 988 and is provided at its outer end with a rack 1000, which meshes with a segment 1001 of a spur gear integrally formed with or otherwise connected to the guide portion 955 carried by member 956, this construction being similar to that of gear segment 220—221 as shown in Figs. 5 and 6. It will thus be seen that reciprocal movement of piston 990 in response to the application of fluid pressure in cylinder 988 will result in angular movement of guide 955 relative to guide 953 in a manner similar to that described in connection with Fig. 5.

The control over this angular movement of the guides is provided by appropriate positioning of the plunger 972 in valve body 970. When the plunger is in its intermediate position, with detent 975 engaged in notch 977 as shown in Fig. 48, it will be noted that the valve portions 973 and 974 of the plunger are in position to close both of lines 979 and 995. Under these conditions, no pressure will be applied to either end of piston 990, and the piston will accordingly be held stationary, since all the lines between it and the valve body 970 will be equally full of hydraulic fluid. When the valve plunger 972 is moved inwardly, to the position of relative engagement between detent 975 and notch 976, this will open line 979 to the line pressure and at the same time will connect line 995 to its return branch line 996. Thus pressure will be applied through line 985 to move piston 990 to the right as viewed in Fig. 49, and at the same time the valve will permit the return flow of fluid through line 991. The result of this movement of the piston will be to rotate guide 955 in clockwise direction as viewed in Fig. 49, thus increasing the angle $a$ from its zero value shown in Fig. 49. Since this will result in decreasing the radius of the arc generated by the machine, this inward movement of the plunger represents the proper manipulation of the valve for arcs of "Small" radii as explained hereinabove in connection with Fig. 22.

Outward movement of valve plunger 972 from its position shown in Fig. 48, to the position of engagement between detent 975 and notch 978, will reverse this operation. Pressure will be applied through lines 995 and 992 to the right end of piston 990 as viewed in Fig. 49, and since at the same time lines 986 and 979 will be connected to the return, this will cause movement of the piston from right to left as viewed in Fig. 49. This will in turn cause counterclockwise rotational movement of guide 995 to decrease the angle $a$, and since this is the proper movement of the valve to increase the radius of the arc produced by the machine, this is the position of the valve plunger for arcs of "Large" radii as indicated by the legend in Fig. 48.

Figs. 48 and 49 also illustrate a remote indicating system for the movement of guide 955 as described. Referring to Fig. 49, a cylinder 1005 is directly connected with cylinder 988, and piston rod 999 extends into this cylinder and carries a second piston 1006, thus providing a compound cylinder and piston arrangement. One end of this cylinder 1005 is provided with a vent port 1007 to atmosphere. A hydraulic fluid line 1008 leads from the opposite end of cylinder 1005 to shaft 960 and connects through a pair of complementary grooves 961 and 962 with a line 1009 leading to a cylinder 1010, which may be remotely positioned and preferably mounted at the back of a suitable remote control instrument panel. A piston 1011 is reciprocable in this cylinder 1010 and has its rod 1012 formed with a rack meshing with pinion 1013, which is directly connected with or otherwise geared to an indicating dial 1015 as shown in Fig. 48. Roller bearing 1016 serves to keep the rack 1012 and pinion 1013 in engagement. With this construction, when piston 990 is caused to move by operation of valve 970 as described, piston 1006 will move similarly, and its motion will be translated by the flow of fluid through lines 1008 and 1009 into similar movement of piston 1011 in cylinder 1010. This will in turn cause rotation of the indicator dial 1015, and this dial is accordingly shown provided with an appropriate legend "LR" and is graduated to indicate a total angular change of 30° for the angle $a$ and thus corresponds to dial 328 in Fig. 22. It will be readily apparent that another dial for finer adjustment may be geared to dial 1015 in a manner similar to dial 322 as described in Figs. 22 and 23.

Relative linear movement between rotary members 950 and 951 is produced by means of a hydraulic motor comprising a piston 1020 and a cylinder 1022 integrally formed with or otherwise secured to the rotary member 951. The piston rod 1021 corresponds to the lead screw 200 in Figs. 1–8, and its end opposite piston 1020 is secured as shown in Fig. 48 to a boss 1025 extending upwardly from the connector member 952. With this construction, reciprocal movement of piston 1020 in cylinder 1022 will cause relative movement between connector member 952 and cylinder 1020, thus causing relative linear movement between members 950 and 951 in the same manner as the movement caused by rotation of lead screw 200 in the milling machine shown in Figs. 1–9.

Control over this relative linear movement of members 950 and 951 is afforded by means of the valve 1030, which is similar to valves 910 and 970 as described and includes a valve bore 1031 having a plunger 1032 slidably mounted therein. This plunger includes valve portions 1033 and 1034, and a spring detent 1035 is mounted in the valve bore 1031 for selective engagement in the notches 1036, 1037, and 1038 on plunger 1032.

A line 1039 leads from the valve bore 1031 to a regulating valve 1040 similar to the regulating valve 980 as described, and a further line 1041 leads from valve 1040 to housing 922 and connects with one of the grooves 961 in bore 923. This groove in turn connects through its complementary groove 962 with the longitudinal bore 1042 in shaft 960. The upper end of bore 1042 connects through the fitting 1044 with a line 1045 leading to the outer end of cylinder 1022. A line 1046 leads from the inner end of cylinder 1022 and connects through fitting 1047 with the bore 1048 in shaft 960, and this bore is in turn connected through its pair of grooves 961 and 962 with line 1049 leading to a regulating valve 1050, which is similar in construction to valve 980. A line 1051 leads from valve 1050 to the bore 1031 of valve 1030, and its branch return lines 1052 and 1053 lead from opposite ends of this bore 1031 back to the main return line 906 as shown in Fig. 48.

It will be seen that with plunger 1032 in its intermediate position as shown in Fig. 48, its valve portions 1033 and 1034 will be in position to close both of lines 1039 and 1051, thus holding piston 1020 stationary. When plunger 1032 is moved outwardly, to the position of relative engagement of the detent 1035 and notch 1038, this will result in opening line 1051 to the full line pressure while at the same time connecting line 1039 to the release line. The result will be to apply pressure fluid to the inner end of piston 1020 while withdrawing fluid from the outer end of cylinder 1022. This will in turn cause relative linear movement between members 950 and 951, and since this movement is away from the position of coincident axes of these two members, it is by definition "Forward" movement as indicated by the legend in Fig. 48. Inward movement of plunger 1032 from its position shown in Fig. 48, to the position of engagement between the detent 1035 and notch 1036 will reverse this operation. Pressure fluid will be applied to the outer end of piston 1020 while fluid is withdrawn from the inner end of cylinder 1022, thus causing relative movement by the members 950 and 951 in the "Reverse" direction as indicated by the legend in Fig. 48.

An indicating system for the linear movement of members 950 and 951 is also provided as shown in Figs. 48 and 49. A cylinder 1055 is integrally formed with or otherwise secured to the rotary member 951. A piston 1056 is reciprocable in this cylinder 1055, and its rod 1057 is secured to an arm 1058 integrally formed with or otherwise secured to the connector member 952. One end of cylinder 1055 may be open as shown in Fig. 49. A line 1060 leads from the closed end of cylinder 1055 and connects through a pair of grooves 961 and 962 with a line 1061 leading to a cylinder 1062 which may be remotely positioned and adjacent cylinder 1010 as shown in Fig. 48. A piston 1063 is reciprocable in this cylinder 1062, and its rod 1064 is formed with a rack meshing with a pinion 1065 for operating an indicating dial 1066 provided with the appropriate legend "LM." The operation of this indicating system is similar to that for the system connected with the angular adjustable guides. Relative movement by the rotary members 950 and 951 causes relative reciprocation between cylinder 1055 and piston 1056, and this movement is translated through the lines 1060 and 1061 into similar reciprocal movement of piston 1063 with resulting rotary movement of dial 1066.

The mechanism for producing relative rotation between the rotary member 950 and saddle 70 is similar to that shown in Figs. 4 and 9. In place of the electric motor 120, a rotary hydraulic motor 1070 may be used to drive the shaft 115 as indicated in Fig. 48, motor 1070 being mounted in substantially the same manner as the motor 120 shown in Figs. 4 and 9 and being connected to drive a worm wheel meshing with the teeth 1075 in substantially the same manner as shown in Fig. 9. Control over the operation of this hydraulic motor 1070 may be provided by means of valves of substantially the same construction as the valves 910, 970 and 1030 as described and shown in Fig. 48.

It will accordingly be seen that a hydraulic operating system of the type shown in Figs. 48 and 49 will provide automatic remote control operation for the milling machine in substantially the same manner as described for the electric system in connection with Figs. 1–29. For example, the profile shown in Fig. 28 may be similarly produced as a continuous operation, the reversible hydraulic clamps providing for necessary resetting operations without disturbing the relative positions of the working member and work piece. Control over the speed of operation of the machine parts is afforded by the various regulating valves 980, 994, 1040 and 1050, each of which may be adjusted to regulate the flow of operating fluid to the various operating cylinders and pistons. All of these operating valves may be readily grouped on a single remote control instrument panel for convenient operation in a manner similar to that shown and described in connection with Figs. 22–25. It will also be apparent that the machine can be caused to operate in a plurality of directions at the same time, for example to describe spirals or other irregular curves as already described in connection with the machine shown in Figs. 1–29, and different ratios of speed for such operations can also be obtained by appropriately different settings of the various regulating valves.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A machine of the character described for generating relative working movement of a workpiece and a working member without the use of a template or like guiding member, comprising a base, a work table, means for supporting said table for movement relative to said base in a predetermined plane, a workpiece and a working member carried one on said base and the other on said work table, drive means for moving said work table relative to said base in said plane to generate an arcuate profile, adjustable guiding means carried in cooperative relation by said work table and said drive means for establishing a predetermined radius for said profile, and means for moving said drive means with respect to said base to determine the location and direction of said profile with respect to said base.

2. A machine of the character described for generating relative working movement of a workpiece and a working member without the use of a template or like guiding member, comprising a working member, a work supporting member movable relative to said working member, drive means for effecting a translation movement of one of said members relative to the other in an arcuate path of movement to generate an arcuate profile of a predetermined short radius ranging from zero to a predetermined maximum, separate drive means for effecting a translational movement of said one member relative to the other in an arcuate path of movement to generate an arcuate profile of a predetermined radius ranging from said maximum to infinity, driving connections between both said drive means and said one member, and means for adjusting said driving connections to establish the radius of the profile to be generated.

3. In a machine of the character described, the combination of a carriage, an arm angularly adjustable relative to said carriage, a pin connected with said carriage and movable linearly relative thereto, another pin connected with said arm and movable linearly relative thereto, a frame in which said pins are received in a predetermined spacing from each other while providing for relative pivotal movement thereon, means for causing said carriage and arm to move linearly relative to the respective said pins to cause resultant arcuate movement of a point on said carriage, and means for rotating said frame about an axis to determine the direction of said arcuate movement of said point and also to cause said point to move in an arcuate path about a radius centered on the rotational axis of said frame.

4. In a machine of the character described, the combination of a carriage, an arm angularly adjustable relative to said carriage, a pin connected with said carriage and movable linearly relative thereto, another pin connected with said arm and movable linearly relative thereto, a frame in which said pins are received in a predetermined spacing from each other while providing for relative pivotal movement thereon, means for causing said carriage and arm to move linearly relative to the respective said pins to cause resultant arcuate movement of a point on said carriage, and means for adjusting the angular position of said arm relative to said carriage to vary the radius of said resultant arcuate movement.

5. In a machine of the character described, the combination of a frame, a pair of pins pivotally mounted in fixed lateral spacing in said frame, a carriage having thereon a pair of angularly adjustable guides, means securing one of said pins in guided relation with one of said guides and the other said pin in guided relation with the other said guide, means for causing relative linear movement between one said pin and its associated said guide to cause resultant arcuate movement of a point on said carriage relative to said frame, means for rotating said frame about an axis fixed with respect to said pins to determine the direction of said arcuate movement, and means for retaining said carriage and frame in fixed relation during operation of said rotating means to cause said point on said carriage to rotate about said axis on a radius determined by the radial spacing of said point from said axis.

6. In a machine of the character described, the combination of a base, a frame on said base, a pair of pins pivotally mounted in fixed lateral spacing in said frame, a carriage having thereon a pair of angularly adjustable guides, means securing one of said pins in guided relation with one of said guides and the other said pin in guided relation with the other said guide, a first drive for causing relative linear movement between one said pin and its associated said guide to cause resultant arcuate movement of a point on said carriage relative to said frame, a second drive for adjusting the angular relation between said guides to vary the radius of said resultant arcuate movement, a third drive for rotating said frame with respect to said base, and means for selectively operating said drives in unison or in predetermined sequence to control the direction and pattern of movement of said point.

7. In a machine of the character described, the combination of a carriage, an arm angularly adjustable from a position in alignment with said carriage to a position at an angle thereto, a pin carried by said carriage, another pin carried by said arm, a frame in which said pins are rotatably received while being held in predetermined fixed spacing from each other, cooperating drive means on said frame and said carriage for effecting linear movement of each of said pins relative to said carriage and said arm respectively to cause resultant arcuate movement of a point on said frame, and means for adjusting said arm from its position in alignment with said carriage resulting in a movement of said frame in an arc of infinite radius to a position at an angle to said arm resulting in an arcuate movement of said frame in an arc of lesser radius.

8. In a machine of the character described, the combination of a frame, a pair of pins pivotally mounted in fixed lateral spacing in said frame, a carriage having thereon a pair of angularly adjustable guides, means securing one of said pins in guided relation with one of said guides and the other said pin in guided relation with the other said guide, a drive for causing relative linear movement between one said pin and its associated said guide to cause resultant arcuate movement of a point on said carriage relative to said frame, means for adjusting the angular relation between said guides to vary the radius of said resultant arcuate movement, said guides being adjustable from a position of substantial alignment providing a radius of infinity for said arcuate movement to a relative angular position such that the radius of said resultant arcuate movement will substantially equal the linear distance between the axes of said pins, means for rotating said frame about a predetermined axis to vary the direction of said arcuate movement, means for aligning said point on said carriage with said frame axis to cause rotation of said point about said axis in an arc of zero radius upon operation of said rotating means, and means cooperating with said drive to move said point to a position spaced from said axis by a distance equal to said distance between the axes of said pins for movement of said point about aids frame axis in an arc of any radius from zero up to said distance between said axes of said pins upon operation of said rotating means.

9. In a machine of the character described, the combination of a frame, a pair of pins pivotally mounted in fixed lateral spacing in said frame, a carriage having thereon a pair of angularly adjustable guides, means securing one of said pins in guided relation with one of said guides and the other said pin in guided relation with the other said guide, a drive for causing relative linear movement between said pins and said guides respectively to cause resultant arcuate movement of a point on said carriage relative to said frame, means for adjusting the angular relation between said guides to vary the radius of said resultant arcuate movement, said guides being adjustable from a position of substantial alignment through an angle of substantially 30° to provide for variation of the radius of said resultant arcuate movement from infinity to a distance substantially equal to the linear distance between the axes of said pins, means for rotating said frame about a predetermined axis to vary the direction of said arcuate movement, means for aligning said point on said carriage with said frame axis to cause rotation of said point about said axis in an arc of zero radius upon operation of said rotating means, and means cooperating with said drive to move said point to a position spaced from said axis by a distance equal to said distance between the axes of said pins for movement of said point about said frame axis in an arc of any radius from zero up to said distance between said axes of said pins upon operation of said rotating means.

10. In a machine of the character described, a base, a work table, means supporting said table for translational movement on said base, a frame, a carriage pivotally connected with said table, an arm pivoted to said carriage and angularly adjustable from a position in line with said carriage to a position at an angle thereto, means movable lengthwise of said arm outwardly from the pivot point thereof, means movable lengthwise of said carriage, means on said frame engaging both said movable means and retaining the same in predetermined spacing from each other, means for adjusting said arm from a position in line with said carriage to a position at an angle relative to said carriage to provide for travel of said table in an arc of long radius in response to movement of said movable means.

11. In a machine of the character described, the combination of a frame rotatable about an axis, a carriage, a pair of laterally spaced pivot members parallel with said axis connecting said frame and carriage, said pivot members being supported in spaced relation relative to said frame and being linearly movable in unison relative to said carriage, means for causing such linear movement between said pivot members and carriage in different directions to cause resultant arcuate movement of a point on said carriage relative to said frame about a long radius, means for limiting said linear movement to a predetermined maximum distance, means for rotating said frame about said axis to cause rotation of said point on said carriage about a short radius corresponding to the linear distance between said point and said axis and having a predetermined maximum equal to said maximum distance of linear movement of said carriage, and means for changing the angle between the directions of linear movement of said pivot members relative to said carriage to vary the radius of said resultant arcuate movement from infinity to a predetermined minimum, the range of said angle change being such that the ranges of said long and short radii overlap to provide for relative movement of said carriage in arcs of any desired radius.

12. In a machine of the character described, the combination of a frame, a carriage, a pair of laterally spaced pivot members connecting said frame and carriage, said pivot members being supported in spaced relation relative to said frame and being linearly movable in unison relative to said carriage over a range equal to the linear distance between their respective pivotal axes, means for causing such linear movement between said pivot members and carriage in different directions to cause resultant arcuate movement of a point on said carriage relative to said frame about a long radius, means for rotating said frame about an axis substantially coaxial with one of said pivot members to cause rotation of said point on said carriage about a short radius corresponding to the linear distance between said point and said axis of rotation, means for aligning said point with said axis when said carriage is at one limit of said linear movement, and means for changing the angle between the directions of linear movement of said pivot members relative to said carriage to vary the radius of said resultant arcuate movement from infinity to a predetermined minimum, the range of said angle change being such that said minimum long radius is not greater than the linear distance between the pivotal axes of said pivot members to provide for relative movement of said carriage in arcs of any desired radius.

13. In a machine of the character described, the combination of a base, a table, means positioning said table for translational motion with respect to said base in any direction in a predetermined plane, means for securing a working member and a work piece in fixed relation one to said base and the other to said table, a second table, means positioning said second table for translational motion with respect to said base in any direction in a plane substantially parallel to said first named plane, means for selectively securing each of said tables against movement with respect to said base, and motion-imparting means connected with both of said tables and effective to cause working movement of said first table when said second table is secured with respect to said base and effective to cause resetting movement of said second table when said first table is secured with respect to said base.

14. In a machine of the character described, the combination of a base, a table positioned for translational motion with respect to said base in any direction in a predetermined plane, means for securing a working member and a work piece in fixed relation one to said base and the other to said table, a second table positioned for translational motion with respect to said base in any direction in a plane substantially parallel to said first named plane, means for selectively securing each of said tables against movement with respect to said base, a first rotary member connected with said first table for rotation about an axis substantially perpendicular to said planes, a second rotary member connected with said second table for rotation about an axis substantially parallel to said first named axis, means connecting said rotary members and providing for rotation of both of said rotary members about the axis of either thereof, said connecting means including means for causing relative movement between said rotary members substantially parallel to said planes of movement of said tables to cause corresponding movement between said axes, and driving means effective to cause rotation of said rotary members about the axis of said second rotary member when said second table is secured with respect to said base and effective to cause rotation of said rotary members about the axis of rotation of said first rotary member when said first table is secured with respect to said base.

15. In a machine of the character described, the combination of a base, a pair of tables, means positioning said tables for translational motion with respect to said base in any direction in substantially parallel planes, means for securing a working member and a work piece in fixed relation one to said base and the other to one of said tables, a pair of rotary members, means connecting one of said rotary members to one of said tables for rotation about an axis substantially perpendicular to the plane of movement of said table, means connecting the other of said rotary members to the other of said tables for rotation about an axis substantially parallel to said first named axis, means connecting said rotary members and providing for rotation of both of said rotary members about the axis of either thereof, said connecting means including means for causing relative movement between said rotary members parallel to said planes of motion of said tables to cause corresponding relative movement between said axes, means for selectively securing each of said tables against movement with respect to said base, driving means for rotating said rotary members, and means for causing said relative movement between said axes simultaneously with and independently of said driving means.

16. In a machine of the character described, the combination of a base, a first table, means for securing a working member and a work piece in fixed relation one to said base and the other to said table, a second table, means positioning said tables for translational motion with respect to said base in any direction in predetermined substantially parallel planes, means for selectively securing each of said tables against movement with respect to said base, means providing a rotary off-set connection between said tables, and drive means operatively coupled with said off-set connection means and effective to cause working movement of said first table with respect to said second table when said second table is secured with respect to said base and to cause resetting movement of said second table with respect to said first table when said first table is secured to said base.

17. In a machine of the character described, the combination of a base, a pair of tables positioned for translational motion with respect to said base in any direction in predetermined substantially parallel planes, means for selectively securing each of said tables against movement with respect to said base, a frame connected with one of said tables for rotation about an axis substantially perpendicular to said planes, a carriage connected with the other of said tables for rotation about an axis substantially parallel to said first named axis, means for connecting said frame and carriage together for relative movement in planes substantially perpendicular to said axes of rotation, said connecting means including guide members supported by said carriage for relative angular movement substantially parallel to said plane to vary the course of relative movement followed by the axes of said frame and carriage, said connecting means being constructed to provide for such relative movement between said frame and carriage that in one relative position said frame and carriage will be substantially coaxial, means for connecting a working member and a work piece one in fixed relation to said base and the other to one of said tables to constitute said table a work table, and drive means for causing said relative movement of said frame and carriage and rotation of said frame and carriage with respect to said base and effective to cause relative working movement between said working member and work piece when said other table member is secured with respect to said base and to cause relative resetting movement of said other table with respect to said base when said work table is secured with respect to said base.

18. In a machine of the character described, the combination of a base, a first table and a second table positioned for translational motion with respect to said base in any direction in predetermined substantially parallel planes, a rotary member connected with said first table for rotation about an axis substantially perpendicular to said plane, a second rotary member connected with said second table for rotation about an axis substantially parallel to said first named axis, means for selectively securing each of said tables against movement with respect to said base, means connecting said rotary members and providing for rotation of both of said rotary members about the axis of either thereof, said connecting means including means for causing relative movement between said rotary members in planes substantially parallel with said first named planes to cause corresponding relative movement between said axes along an arcuate course of a predetermined radius lying in a plane substantially parallel to said first named planes, means for adjusting the radius of said arcuate course of movement of said axes from a predetermined minimum to infinity, driving means effective to cause rotation of said rotary members about the axis of said first rotary member when said first table is secured with respect to said base and effective to cause rotation of said rotary members about the axis of said second rotary member when said second table is secured with respect to said base, means for driving said axis-moving means, and means for driving said adjusting means, each of said driving means being operable independently of the other said driving means.

19. In a machine of the character described, the combination of a base, a table, means positioning said table member for translational motion with respect to said base in any direction in a predetermined plane, means for securing a working member and a work piece in fixed relation one to said base and other to said table, a first rotary member, means supporting said rotary member for rotation about an axis substantially perpendicular to said plane, a second rotary member having a rotational connection with said table on an axis substantially perpendicular to the plane of movement of said table to drive said table through said rotational connection, means connecting said rotary members and providing for rotation of said second rotary member about the axis of said first rotary member, means for causing relative movement of said rotary members in planes parallel to said first named plane to cause corresponding relative movement between said axes of rotation, angularly adjustable guide means associated with said connecting means for guiding the course of said relative movement of said axes, and means for angularly adjusting said guide means to vary said course of relative movement of said axes over a range from an arc of infinite radius to an arc of a predetermined minimum radius, and means for rotating said first rotary member about said axis thereof to determine the direction of the course of the resulting movement of said table.

20. In a machine of the character described, the combination of a base, a first member supported for rotation about a predetermined axis, another member connected with said rotary member for rotation therewith about said axis, the connection between said rotary members including a pair of laterally spaced guided members carried by one of said rotary members and complementary guide members carried by the other said rotary member in guiding relation with said guided members respectively, said guide members being angularly adjustable with respect to each other in a plane substantially perpendicular to said axis, means for causing relative movement between said guided members and said guide members to cause relative movement between said rotary members in planes substantially perpendicular to said axis, means for adjusting said guide members to change the angle between the course of relative movement followed by one of said guided members and the corresponding course followed by the other of said guided members, and means for rotating said first rotary member with respect to said base to change the directions of said courses of movement.

21. In a machine of the character described, the combination of a base, a frame, means for supporting said frame for rotation about a predetermined axis with respect to said base, means for effecting controlled movement of said frame in a plane substantially perpendicular to said axis, a carriage connected with said frame for rotation therewith about said axis, means for translating motion of said carriage on an axis substantially parallel to said first named axis, the connection between said frame and carriage including a pair of laterally spaced guided members carried by said frame and complementary guide members carried by the said carriage in guiding relation with said guided members respectively, means for effecting relative linear movement of said guide and guided members through a predetermined limited distance, said guided members and said guide members being so positioned and spaced that when they are at one limit of their said relative movement said axis of translation will coincide with said axis of rotation, said guide members being angularly adjustable with respect to each other in a plane substantially perpendicular to said axis to and from a position of substantial collinearity, means for rotating said frame about said first named axis to effect rotation of said axis of translation about a selected short radius in the range from zero to a maximum equal to said predetermined limited distance, means for causing relative movement between said guided members and said guide members to cause relative movement between said frame and carriage in planes substantially perpendicular to said axis, and means for adjusting said guide members from substantial collinearity to a predetermined relative angle to vary the course followed by said axis of translation from an arc of infinite radius to an arc of a predetermined minimum radius greater than said maximum short radius.

22. In a machine of the character described, the combination of a base, a frame, means for supporting said frame for rotation about a predetermined axis with respect to said base, a carriage connected with said frame for rotation therewith about said axis, means for translating motion of said carriage on an axis substantially parallel to said first named axis, the connection between said frame and carriage including a pair of laterally spaced guided members carried by said frame and complementary guide members carried by said carriage in guiding relation with said guided members respectively, means for effecting relative linear movement of said guide and guided members through a predetermined limited distance, said guided members and said guide members being so positioned and spaced that when they are at one limit of their said relative movement said axis of translation will coincide with said axis of rotation, the distance between the axes of said guided members and the relative travel of said connector members and said guide members being substantially equal, said guide members being angularly adjustable with respect to each other from a position of substantial collinearity through an angle of substantially 30°, means for rotating said frame about said first named axis to effect rotation of said axis of translation about a selected short radius in the range from zero to a maximum equal to said distance between the axes of said guided members, means for causing relative movement between said guided members and said guide members in planes substantially perpendicular to said axis to cause corresponding relative movement between said axis of translation and said axis of rotation, and means for angularly adjusting said guide members to vary the course of said relative movement between said axes from an arc of infinite radius to an arc of a radius substantially equal to said distance between the axes of said guided members.

23. In a machine of the character described, the combination of a base, a pair of tables positioned in spaced relation for translational motion with respect to said base in any direction in substantially parallel planes, a frame connected with one of said tables for rotation about an axis perpendicular to said planes, a carriage connected with the other said table for rotation about an axis substantially parallel with said first named axis, a first guided member supported in said frame substantially coaxially with the axis of rotation thereof, a second guided member supported in said frame at a position spaced laterally from said first guided member, a pair of guide members carried by said carriage and each adapted for cooperative engagement with one of said guided members to connect said frame and carriage together for rotation about the axis of each thereof and for relative movement in planes substantially parallel to said axes, said guide members being angularly adjustable to and from a position of substantial collinearity, means for selectively securing each of said tables against movement with respect to said base, means for varying the angular relation between said guide members, means for securing a working member and a work piece in fixed relation one to said base and the other to one of said tables, driving means for causing relative rotation of said frame and said base, and driving means for causing said relative movement between said frame and carriage.

24. In a machine of the character described, the combination of a base, a rotary member, means supporting said rotary member for rotation with respect to said base about a predetermined axis, a table positioned for free translational motion with respect to said base in a plane substantially perpendicular to said axis, means for securing a working member and a work piece in fixed relation one to said base and the other to said table, a second rotary member connected with said table for rotation about an axis substantially parallel to said first named axis, means connecting said rotary members and including a pair of connector members carried by one rotary member and complementary guide members carried by the other rotary member, said connector and guide members cooperating to provide for relative movement between said rotary members in a plane substantially perpendicular to the axes of rotation thereof, said guide members being angularly adjustable with respect to each other in a plane parallel to said first named plane to vary the course of relative movement of the axes of rotation of said rotary members, and a plurality of separate motors carried by one of said rotary members and effective to cause relative angular adjustment of said guide means and relative movement between said rotary members.

25. In a machine of the character described, the combination of a base, a frame supported on said base for rotation about a predetermined axis, a carriage connected with said frame for rotation therewith about said axis, the connection between said carriage and frame including a pair of laterally spaced connector members carried by said frame and complementary guide members carried by said carriage and each adapted to cooperate with one of said connector members, said connector members and said guide members being so positioned and spaced that each of said connector members alternately occupies the same predetermined position relative to said carriage at opposite limits of its travel relative to said guide members, said guide members being angularly adjustable with respect to each other in a plane substantially perpendicular to said axis, means for rotating said frame about said axis, means for causing relative movement between said connector members and said guide members to cause relative movement between said frame and carriage in planes substantially perpendicular to said axis, means for adjusting said guide members to change the angle between the course of relative movement followed by one of said connector members and the corresponding course followed by the other said connector member, and indicator means responsive to said relative movements to indicate the positions of all of said members relative to predetermined index directions.

26. In a machine of the character described, the combination of a base, a rotary member, means positioning said rotary member for rotation with respect to said base about a predetermined axis, a member connected with said rotary member for rotation therewith and for lateral movement with respect thereto in a plane substantially perpendicular to said axis, means carried by one of said members for guiding said relative lateral movement, said guide means including portions relatively angularly adjustable in a plane substantially parallel to said first named plane, motor means carried by one of said members for causing said relative lateral movement, separate motor means carried by one of said members for causing said angular adjustment of said guide means, means for transmitting power to each of said motor means for selective operation thereof, and indicating means effective upon operation of each of said motor means to show the relative angular positions of said guide means and the relative lateral positions of said rotary members with respect to predetermined index positions.

27. In a machine of the character described, the combination of a base, a frame, means positioning said frame for rotation relative to said base about a predetermined axis, a carriage connected with said frame for rotation therewith and for lateral movement relative thereto in a plane substantially perpendicular to said axis, means carried by said carriage for guiding said relative lateral movement and including portions relatively angularly adjustable in a plane substantially parallel to said first named plane, motor means carried by one of said laterally movable members for causing said relative lateral movement, separate motor means carried by one of said laterally movable members for causing said angular adjustment of said guide means, and indicating means operable in coordinated relation with said relatively movable members to show the relative angular positions of said guide means and the relative lateral positions of said frame and carriage with respect to predetermined index positions.

28. In a machine of the character described, the combination of a base, a rotary member, means including a shaft for positioning said rotary member for rotation with respect to said base about the axis of said shaft, a driven member on said base, a plurality of control members connected with said rotary member each for relative movement with respect to said rotary member, means controlled by said control members for driving said driven member in a path determined by the relative movements of said control members and said rotary member, separate motor means carried by said rotary member for causing said relative movement between said rotary member and each of said control members, means including a plurality of collector means carried by said shaft for transmitting power to each of said motors for operation independently of each other said motor, and indicating means responsive to the operation of each said motor for indicating the relative movement between said rotary member and each of said relatively movable members with respect to a predetermined index position to determine said path of movement of said driven member.

29. A machine of the character described comprising, in combination, a support, a work table, means for supporting said table for translational movement relative to said support in any direction in a predetermined plane, a work piece and a working member carried one on said support and the other on said work table, drive means for causing relative movement between said support and said work table in said plane along an arcuate course of any selected radius from zero to a predetermined relatively short maximum, additional drive means for causing relative movement between said support and said work table in said plane along an arcuate course of any selected radius from said maximum short radius to infinity, selectively operable means for separately energizing either of said drive means, and means remotely positioned relative to said work table for selectively controlling said energizing means.

30. In a machine of the character described, the combination of a base, a rotary member, means for positioning said rotary member for rotation with respect to said base about a predetermined axis, a driven member on said base, a plurality of control members connected with said rotary member each for relative movement with respect to said rotary member, means controlled by said control members for driving said driven member in a path determined by the relative movements of said control members and said rotary member, a plurality of separate motors for causing said relative movement between said rotary member and each of said control members, said motors being supported for rotation with said rotary member, means remotely positioned with respect to said rotary member for controlling the energization of each said motor, indicating means remotely positioned with respect to said rotary member for indicating the relative positions of each of said relatively movable members with respect to a predetermined index position to determine said path of movement of said driven member, and means operatively connecting said relatively movable members with said indicating means and responsive to movement of said relatively movable members to operate said indicating means.

31. In a machine of the character described, the combination of a base, a member for supporting a working member on said base, a member for supporting a work piece on said base, means providing a connection between one of said supporting members and said base constructed to provide for both arcuate and linear movement of said supporting member relative to said other supporting member, separate means operable by remote control for causing said arcuate and linear movement of said movable supporting member, remote control operating means for said movement causing means, and means operatively connected with said operating means for indicating relative movement of said supporting members relative to predetermined index positions.

32. A machine of the character described comprising, in combination, a frame, a carriage, a pair of laterally spaced pivot members connecting said frame and carriage, said pivot members being supported in spaced relation relative to said frame and being linearly movable relative to said carriage, means for causing such linear movement between said pivot members and carriage, means for varying the angular relation of the directions of said relative movement of said pivot members and said carriage, means for sensing relative linear movement between said pivot members and carriage, means for sensing a change in the angular relation of said directions of said linear movement of said pivot members and carriage, and means remotely positioned with respect to said frame and carriage and responsive to said sensing means to indicate the relative positions of said frame and carriage and the angular relation between said directions of linear movement of said pivot members and carriage relative to predetermined index directions.

33. In a machine of the character described, the combination of a base, a supporting member carried by said base, a table mounted for translational motion relative to said base in any direction in a predetermined plane, means providing a rotary off-set connection between said table and said supporting member, means for securing a working member and a work piece in fixed relation one to said base and the other to said table, drive means for said rotary off-set connection, and means for indicating the position of said working member relative to a predetermined index station at said work piece, said indicating means including two pairs of self-synchronizing motors, means connecting said table with one member of one of said pairs of self-synchronizing motors and effective to actuate said motor upon movement of said table in a predetermined index direction, means connecting said table with one member of said other pair of self-synchronizing motors and effective to actuate said motor upon movement of said table in an index direction at a predetermined angle to said first named index direction, and indicating means actuated by the other members of each of said pairs of self-synchronizing motors to show the movement of said table along said index directions.

34. In a machine of the character described including a plurality of relatively movable members and separate drive motors for actuating said relative movable members, a control system for said drive motors to provide for separate operation of any of said motors and simultaneous operation of a plurality of said motors and comprising, in combination, switch means for closing an operating circuit to each of said drive motors independently of the other motors, a pair of self-synchronizing motors operatively connected with each of said drive motors, means providing a driving connection between a plurality of said pairs of self-synchronizing motors, a further self-synchronizing motor operatively connected with one of said pairs of self-synchronizing motors, and means responsive to said further self-synchronizing motor effective to maintain said connected pairs of self-synchronizing motors in properly synchronized ratio in accordance with said driving connection therebetween.

35. In a machine of the character described having a base and a forming tool carried by said base, a support mounted for movement relative to said base in a plane, a platen mounted for movement relative to said base in a plane parallel with the plane of movement of said support and in position to support a work piece in cooperating relationship with said forming tool, driving mechanism carried by said support and operatively connected to impart movement to said platen in said plane, clamping apparatus arranged to clamp said platen relative to said base to maintain it and its work piece in fixed position relative to said forming tool while said support and said driving mechanism are being adjusted for movement of said platen along a predetermined path in said plane, and clamping apparatus arranged to clamp said support relative to said base in adjusted position while said platen is unclamped and caused to move with its work piece along said predetermined path relative to said forming tool.

36. In a machine of the character described having a base, a support mounted for movement in a plane relative to said base, clamping mechanism selectively engageable to clamp said support relative to said base, a member rotatably connected with said support, a platen mounted for movement relative to said base in a plane parallel with the plane of movement of said support, clamping mechanism selectively engageable to clamp said platen relative to said base, an actuator mounted on said rotatable member for adjustment radially thereof, and means interconnecting said actuator with said platen, the arrangement being such that said platen may be clamped relative to said base in fixed position while said support and said actuator are adjusted to provide for subsequent movement of said platen along a predetermined path in said plane, said support then being clamped relative to said base and said platen unclamped for movement along said predetermined path.

37. In a machine of the character described, a base, a support movably mounted on said base, a table movably mounted relative to said support, a clamp disposed to clamp said support relative to said base, a second clamp disposed to clamp said table relative to said base, and selective control means arranged to energize said clamps selectively to hold either said carriage or said table stationary relative to said base while the other is moved.

38. In a machine of the character described, a base, a support movably mounted on said base, a table movably mounted relative to said support, a clamp disposed to clamp said support relative to said base, a second clamp disposed to clamp said table relative to said base, and selective control means arranged to energize said clamps alternatively and time delay means arranged to maintain energization of either clamp until after the other clamp has been energized to hold either said support or said table stationary relative to said base while the other is moved.

39. In mechanism for generating arcs of large radii, a carriage having a guide, an arm pivotally mounted on said carriage and having a similar guide, said arm being angularly adjustable for positioning said guides in alignment with or at selected angles to each other, guided members disposed to engage said two guides, respectively, means for causing relative movement of said guides and guided members to cause a point on said carriage to move along an arc of radius determined by the angular relationship of said guides, means for limiting said angular adjustability of said guides to a predetermined angular range providing a finite minimum radius for said arcuate movement of said point, and additional means for causing movement of said point along an arc of a selected radius in the range from zero to said minimum radius.

40. In mechanism for generating arcs of large radius, a carriage having a guide, an arm pivotally mounted on said carriage and having a similar guide, said arm being angularly adjustable for positioning said guides in alignment with or at selected angles to each other, guided members disposed in guided relation with said two guides, respectively, means for causing relative movement of said guides and guided members to cause the point of intersection of said guides on said carriage to move along an arcuate path of radius determined by the angular relationship of said guides, and selectively operable means for moving said guides and guiding members in unison to determine and control the direction of said path.

41. In a mechanism for generating arcs of large radii, a carriage having two guides arranged thereon for relative angular adjustment, guided members disposed in movable guided relation with said two guides respectively, means for causing relative movement of said guided members and said guides to cause the point of intersection of said two guides on said carriage to generate an arc of radius determined by the angular relationship of said guides, a table supported for translational movement, and a pivotal connection between said table and said carriage coaxial with said point for causing said table to follow the same said arc as said point.

42. In mechanism for generating arcs of large radii, a carriage having two guides arranged thereon for adjustment from a position of alignment to positions of selected angular relationship, a frame having guided members disposed in guided relationship with said two guides respectively, means for causing relative movement of said guided members and said guides to cause the point of intersection of said guides on said carriage to move relative to said frame along an arcuate path of radius determined by the angular relationship of said guides, and means for rotating said frame to determine the direction of said path.

43. In a machine of the character described, a base, a table mounted for translational movement relative to said base in any direction in a plane, a carriage pivotally connected to said table, said carriage having a guide, a member pivotally mounted on said carriage coaxially with said pivotal connection and having another guide disposed to be adjusted about said common pivot axis into angular relationship with said guide on said carriage, a frame, guided members carried by said frame and disposed in guided relation with said guides respectively, mechanism arranged to cause relative movement of said guided members and said guides to cause said table to move in an arcuate path upon a radius determined by the angular relationship between said two guides, and means for rotating said frame in said base to determine the direction of said arcuate path.

44. In a mechanism for generating arcs of any radius, the combination with a rotatably mounted driving member presenting a shoe disposed concentric with the axis of rotation of said member and another shoe spaced from said axis of rotation, of a driven member carried by said driving member and having a guide disposed to engage one of said shoes, an element adjustably carried by said driven member and having a second guide disposed to engage the other of said shoes, said element and driving member being relatively adjustable to position said second guide in alignment with or at a predetermined angle to said first named guide, mechanism for causing relative movement of said guides and said shoes to cause the point of intersection of said guides on said driven member to move along an arc of large radius determined by the angular relationship of said guides, and mechanism for rotating said driving member to cause said point of intersection of said guides on said driven member to move along an arc of small radius determined by the adjusted position of said guides with respect to said shoes.

45. In a mechanism for generating arcs of any radius, the combination with a first member presenting a guide and a second member presenting a similar guide disposed for adjustment into alignment with or into predetermined angular relationship with said guide on said first member, of a rotatably mounted frame, a shoe mounted on said frame concentric with its axis of rotation and disposed for linear movement in guided relation with one of said guides, a second shoe mounted on said frame in spaced relationship with said first shoe and disposed for linear movement in guided relation with the other of said guides, mechanism connected to effect relative movement of said shoes and guides when actuated to thereby move the point of intersection of said guides on said first member through an arc of large radius determined by the angular relationship of said guides, and mechanism connected to rotate said first member to thereby move said point through an arc of small radius determined by the relative positions of said concentric shoe and said guide therefor.

46. In mechanism adapted to generate arcs of any radius, a driven member having an element defining a point for movement along a selected arc and having a guide extending along a line intersecting said point, a member mounted for angular adjustment on said driven member and having a guide extending along a line likewise intersecting said point and disposed to be adjusted about said point into alignment with or into selected angular relationship with said guide on said driven member, a rotatably mounted driving member, a shoe carried by said driving member concentric with its axis of rotation and in movable guided engagement with one of said guides to provide for adjustment of said point outwardly with respect to a position of concentricity with said shoe, a second shoe carried by said driving member eccentrically of its axis of rotation and in movable guided engagement with the other of said guides, means for rotating said driving member to cause said point on said driven member to describe an arc in accordance with the adjusted position of said point with respect to said concentric shoe of any radius from zero with said point concentric with said axis of rotation to the maximum provided by said outward adjustment of said concentric shoe, and means for causing movement of said shoes along said guides to describe an arc of any other radius in accordance with the angular relationship of said guides up to and including an arc of infinite radius with said guides disposed in alignment.

47. In a machine tool having a base, a support mounted on said base for translational movement in any direction in a plane, a frame rotatably mounted on said support, a guide shoe carried by said frame concentric with its axis of rotation, a second guide shoe carried by said frame in spaced relationship with said first guide shoe, a carriage having a guide disposed to cooperate with one of said guide shoes, an arm pivotally mounted on said carriage and having a second guide disposed to cooperate with the other of said guide shoes, a platen mounted for translational movement in any direction in a plane parallel to said plane of movement of said support, a pivot carried by said carriage concentric with the pivot axis of said arm and in position to be disposed concentric with the axis of rotation of said frame in one relative position of said frame and carriage, said pivot being pivotally connected with said platen for transmitting motion to said platen mechanism operatively connected to move said arm for adjusting the angular relationship between said guides, and other mechanism operatively connected to effect relative movement of said guide shoes and said guides for adjusting the radial position of said pivot relative to said axis of rotation of said frame to provide for movement of said platen along an arc of corresponding radius when said frame is turned on its axis and for effecting movement of said platen along an arc of greater radius when said guide shoes move relative to said guides depending upon the angular relationship between said guides.

48. In a machine tool having a base, a support mounted on said base for translational movement in any direction in a plane, a frame rotatably mounted on said support, a guide shoe carried by said frame concentric with its axis of rotation, a second guide shoe carried by said frame in spaced relationship with said first guide shoe, a carriage having a guide disposed to cooperate with one of said guide shoes, an arm pivotally mounted on said carriage and having a second guide disposed to cooperate with the other of said guide shoes, a platen mounted for translational movement relative to said base in any direction in a plane parallel to said plane of movement of said support, a pivot carried by said carriage concentric with the pivot axis of said arm and in position to be disposed concentric with the axis of rotation of said frame in one relative position of said frame and carriage, said pivot being pivotally connected with said platen for transmitting motion to said platen, an electric motor operatively connected to move said arm for adjusting the angular relationship between said guides, another electric motor operatively connected to effect relative movement of said guide shoes and said guides for adjusting the radial position of said pivot relative to said axis of rotation of said frame to provide for movement of said platen along an arc of large radius depending upon the angular relationship between said guides, a third electric motor adapted to cause rotation of said frame relative to said base to provide for movement of said platen along an arc of small radius corresponding with the relative positions of said pivot and said axis of rotation, and an electric control system including control apparatus mounted on said base and operatively connected to said electric motors.

49. In a machine tool having a base, a support mounted on said base for translational movement in any direction in a plane, a frame rotatably mounted on said support, a guide shoe carried by said frame concentric with its axis of rotation, a second guide shoe carried by said frame in spaced relationship with said first guide shoe, a carriage having a guide disposed to cooperate with one of said guide shoes, an arm pivotally mounted on said carriage and having a second guide disposed to cooperate with the other of said guide shoes, a platen mounted for translational movement relative to said base in any direction in a plane parallel to said plane of movement of said support, a pivot carried by said carriage concentric with the pivot axis of said arm and in position to be disposed concentric with the axis of rotation of said frame in one relative position of said frame and carriage, said pivot being pivotally connected with said platen for transmitting motion to said platen, a hydraulic motor operatively connected to move said arm for adjusting the angular relationship between said guides, another hydraulic motor operatively connected to effect relative movement of said guide shoes and said guides for adjusting the radial position of said pivot relative to said axis of rotation of said frame to provide for movement of said platen along an arc of large radius depending upon the angular relationship between said guides, a third hydraulic motor adapted to cause rotation of said frame relative to said base to provide for movement of said platen along an arc of small radius corresponding with the relative positions of said pivot and said axis of rotation, and a hydraulic control system including control apparatus mounted on said base and operatively connected to said hydraulic motors.

50. In a machine tool having a base, a support mounted on said base for translational movement in any direction in a plane, a frame rotatably mounted on said support, a guide shoe carried by said frame concentric with its axis of rotation, a second guide shoe carried by said frame in spaced relationship with said first guide shoe, a carriage having a guide disposed to cooperate with one of said guide shoes, an arm pivotally mounted on said carriage and having a second guide disposed to cooperate with the other of said guide shoes, a platen mounted for translational movement relative to said base in any direction in a plane parallel to said plane of movement of said support, a pivot carried by said carriage concentric with the pivot axis of said arm and in position to be disposed concentric with the axis of rotation of said frame in one relative position of said frame and carriage, said pivot being pivotally connected with said platen for transmitting motion to said platen, manually operable means for moving said arm to adjust the angular relationship between said guides, manually operable means for effecting relative movement of said guide shoes and said guides to adjust the radial position of said pivot relative to said axis of rotation of said frame to provide for movement of said platen along an arc of large radius depending upon the angular relationship between said guides, and manually operable means for causing rotation of said frame relative to said base to provide for movement of said platen along an arc of small radius corresponding with the relative positions of said pivot and said axis of rotation.

WILLIAM S. TOUCHMAN.

REFERENCES CITED

The following references are of record in the file of this patent:

UNITED STATES PATENTS

| Number | Name | Date |
|---|---|---|
| 935,345 | Wiebke | Sept. 28, 1909 |
| 940,179 | Meyer | Nov. 16, 1909 |
| 1,092,170 | Reinhardt | Apr. 7, 1914 |
| 1,983,090 | Kolsch | Dec. 4, 1934 |
| 2,069,299 | Bartholomew | Feb. 2, 1937 |
| 2,075,489 | Warner et al. | Mar. 30, 1937 |
| 2,196,231 | Ridgway | Apr. 9, 1940 |
| 2,252,627 | Gorton | Aug. 12, 1941 |
| 2,305,055 | Ashmore et al. | Dec. 15, 1942 |
| 2,321,789 | Atherholt et al. | June 15, 1943 |
| 2,369,422 | Williams | Feb. 13, 1945 |
| 2,379,405 | Armitage | July 3, 1945 |
| 2,422,933 | Small | June 24, 1947 |
| 2,430,924 | Fowle et al. | Nov. 18, 1947 |

FOREIGN PATENTS

| Number | Country | Date |
|---|---|---|
| 608,453 | France | Apr. 23, 1926 |